(12) United States Patent
Shigeta

(10) Patent No.: US 12,494,110 B2
(45) Date of Patent: Dec. 9, 2025

(54) MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 349 days.

(21) Appl. No.: 18/104,428

(22) Filed: Feb. 1, 2023

(65) Prior Publication Data

US 2023/0245526 A1 Aug. 3, 2023

(30) Foreign Application Priority Data

Feb. 1, 2022 (JP) .................................. 2022-014290

(51) Int. Cl.
*G07F 17/32* (2006.01)
*G06K 7/10* (2006.01)

(52) U.S. Cl.
CPC ..... *G07F 17/3248* (2013.01); *G06K 7/10366* (2013.01); *G07F 17/322* (2013.01); *G07F 17/3234* (2013.01); *G07F 17/3241* (2013.01); *G07F 17/3276* (2013.01)

(58) Field of Classification Search
None
See application file for complete search history.

(56) References Cited

U.S. PATENT DOCUMENTS

| 10,643,429 B2 | 5/2020 | Moore et al. |
| 2016/0346669 A1 | 12/2016 | Yamaguchi |
| 2017/0039807 A1 | 2/2017 | Shigeta |
| 2018/0357850 A1 | 12/2018 | Moore et al. |
| 2021/0335082 A1* | 10/2021 | Shigeta ............... G07F 17/3223 |
| 2022/0036698 A1* | 2/2022 | Shigeta ............... G06F 16/2365 |
| 2022/0139148 A1 | 5/2022 | Shigeta |
| 2022/0172552 A1* | 6/2022 | Moore ................ G07F 17/3223 |

(Continued)

FOREIGN PATENT DOCUMENTS

| AU | 2020203247 A1 | 12/2020 |
| EP | 3796273 A1 | 3/2021 |
| JP | 2014225046 A | 12/2014 |

(Continued)

OTHER PUBLICATIONS

Australian Examination Report No. 1 dated Jun. 15, 2023 issued in AU Application 2023200512.

(Continued)

*Primary Examiner* — Ronald Laneau
(74) *Attorney, Agent, or Firm* — NORTON ROSE FULBRIGHT US LLP

(57) ABSTRACT

A management system is a management system at a game table for performing a game using a gaming chip including a built-in RFID tag. The game table includes: a chip tray configured to accommodate the gaming chip of a dealer; a bet area on which the gaming chip to be bet in the game is to be placed; a collection area and a payout area different from the bet area and the chip tray; a collection reading antenna configured to read at the collection area the RFID tag of the gaming chip collected due to losing in the game; and a payout reading antenna configured to read at the payout area the RFID tag of the gaming chip to be paid out to a player who wins the game.

20 Claims, 56 Drawing Sheets

(56) References Cited

U.S. PATENT DOCUMENTS

2022/0198876 A1    6/2022   Shigeta
2023/0297790 A1    9/2023   Shigeta

FOREIGN PATENT DOCUMENTS

| JP | 2017064386 A | 4/2017 |
| --- | --- | --- |
| WO | 2020158039 A1 | 8/2020 |
| WO | 2020158177 A1 | 8/2020 |
| WO | 2021251391 A1 | 12/2021 |

OTHER PUBLICATIONS

European Search Report dated Jul. 3, 2023 issued in EP Application 23154175.6.
Japanese Office Action dated Mar. 5, 2024 issued in JP Application No. 2023-013098.
The extended European Search Report dated Jun. 11, 2025, issued in EP Patent Application No. 23749753.2.

\* cited by examiner

|       601       |       602      |       603       |      604      |     605    |
|:---------------:|:--------------:|:---------------:|:-------------:|:----------:|
|     CHIP ID     |     IN/OUT     |      FROM       |      TO       |    TIME    |
|      24825      |      OUT       |    MAIN BANK    |               |            | ~H61
|      24825      |      IN        |    MAIN BANK    |   F/C BANK    |            | ~H62

FIG.6

|       601       |       602      |       603       |      604      |     605    |
|:---------------:|:--------------:|:---------------:|:-------------:|:----------:|
|     CHIP ID     |     IN/OUT     |      FROM       |      TO       |    TIME    |
|      24825      |      OUT       |     TABLE-4     |   F/C BANK    |            | ~H71
|      24825      |      IN        |                 |   F/C BANK    |            | ~H72

FIG.7

|     601    |    602    |     606     |    605    |
|:----------:|:---------:|:-----------:|:---------:|
|   CHIP ID  |  IN/OUT   |  LOCATION   |   TIME    |
|    24825   |    OUT    |    VAULT    |           | ~H81
|    24825   |    IN     |  MAIN BANK  |           | ~H82

FIG.8

|     601    |     606     |    605    |
|:----------:|:-----------:|:---------:|
|   CHIP ID  |  LOCATION   |   TIME    |
|    24825   |    VAULT    |           | ~H91
|    24825   |  MAIN BANK  |           | ~H92

FIG.9

| CHIP ID | IN/OUT | LOCATION | TIME | |
|---------|--------|----------|------|---|
| 24825 | OUT | CASHIER-2 | | ~H101 |
| 24825 | IN | PLAYER-5 | | ~H102 |
| 24825 | OUT | PLAYER-5 | | ~H103 |
| 24825 | IN | CASHIER-3 | | ~H104 |

601 = CHIP ID; 602 = IN/OUT; 606 = LOCATION; 605 = TIME

FIG.10

| CHIP ID | FACE VALUE | OWNER | STATUS |
|---|---|---|---|
| 923047 | $10 | Mr. A | Valid |
| 898433 | $10 | Mr. A | Valid |
| 743623 | $10 | Mr. A | Valid |
| 833234 | $100 | Mr. B | Valid |
| ⋮ | ⋮ | ⋮ | ⋮ |

FIG.15

MANAGEMENT SYSTEM

CROSS-REFERENCE OF RELATED APPLICATIONS

This application claims the benefit of JP Pat. App. No. 2022-014290 filed Feb. 1, 2022, the contents of which are incorporated herein by reference.

FIELD

The present invention relates to a management system configured to manage a gaming chip at a game table.

BACKGROUND

At a game table, a game is performed using a gaming chip. A player bets by placing the gaming chip on a bet area of the game table. The player who wins the game receive a payout of the gaming chip from a dealer, and the player who loses the game has the gaming chip collected by the dealer. A chip tray is provided in front of the dealer. The dealer pays out the gaming chip from the chip tray to the player who wins the game, and accommodates the gaming chip collected from the player who loses the game in the chip tray.

It is attempted to electronically grasp a transaction of the gaming chip at the game table. For this purpose, an RFID tag configured to store information which can identify a value of the gaming chip is built in the gaming chip, and RFID antennas configured to read the RFID tag are provided in the bet area and the chip tray. A bet amount, a collection amount, a payout amount or the like is grasped by reading the RFID tag of the gaming chip with these antennas. Furthermore, it is possible, by cooperating with a means configured to judge a game result (for example, it is possible to judge the game result by reading a rank of a card distributed by a shoe in baccarat), to judge whether an amount which should be collected is collected or an amount which should be paid out is paid out to detect an illicitness or a mistake in the collection or the payout.

Furthermore, it is possible to trace the gaming chip by storing a chip ID in the RFID tag and associating the chip ID with information of its owner (casino, player ID) in the database. In the tracing, the owner associated with the chip ID in the database is updated at each time at which the owner of the gaming chip is changed.

It is also possible to detect the above illicitness or mistake by imaging the gaming chip with a camera and recognizing a type (value) of gaming chip in the bet area or the chip tray with image recognition using a neural network or the like. It is also possible to realize traceability by marking the chip ID on the side surface of the gaming chip and recognizing the chip ID with image recognition.

Furthermore, nowadays, it is possible, by performing pose tracking and facial recognition of the player who operates the gaming chip to play the game at the game table, to associate the player, the gaming chip, and a betting activity with each other.

A conventional system is disclosed in Japanese Patent Application Publication No. 2017-064386.

SUMMARY

The object of the present invention is to provide a management system configured to help to electronically grasp a transaction of a gaming chip within a casino, in particular at a game table.

A management system according to an aspect of the present invention is a management system at a game table for performing a game using a gaming chip including a built-in RFID tag and has a configuration wherein the game table includes a chip tray configured to accommodate the gaming chip of a dealer, a bet area on which the gaming chip to be bet in the game is to be placed, and a collection area and a payout area different from the bet area and the chip tray, the management system comprises: a collection reading unit configured to read at the collection area the RFID tag of the gaming chip collected due to losing in the game; and a payout reading unit configured to read at the payout area the RFID tag of the gaming chip to be paid out to a player who wins the game.

In the above management system, the collection area and the payout area may be arranged between the bet area and the chip tray, the collection reading unit may be configured to read the RFID tag of the gaming chip before collected from the bet area and placed in the chip tray, and the payout reading unit may be configured to read the RFID tag of the gaming chip before taken out from the chip tray and paid out to the bet area.

The above management system may further comprise a collection judging unit configured to judge whether or not the gaming chip which should be collected from the bet area is collected from the bet area and read by the collection reading unit.

In the above management system, the RFID tag may be configured to store information for identifying an amount of gaming chip, the management system may further comprise: a bet judging unit provided in the game table and configured to judge a bet target and a bet amount of the gaming chip bet in the game; and a game result judging unit configured to judge a game result, and the collection judging unit may be configured to judge whether an amount of gaming chip read by the collection reading unit matches with a collection amount determined based on the bet target and the bet amount judged by the bet judging unit, and the game result judged by the game result judging unit.

In the above management system, the collection reading unit may be configured to read at the collection area the RFID tag of the gaming chip to be collected for each bet lost in the game, and the collection judging unit may be configured to judge whether or not an amount of gaming chip read by the collection reading unit for each bet lost in the game matches with the bet amount of a player.

In the above management system, the collection judging unit may be configured to judge whether or not a total amount of gaming chips read by the collection reading unit for a plurality of bet lost in the game matches with a total bet amount of a plurality of players.

In the above management system, the RFID tag may be configured to store information for identifying an amount of gaming chip, and the management system may further comprise a payout judging unit configured to judge whether or not an amount of gaming chip which should be paid out is read by the payout reading unit.

The above management system may further comprise: a bet judging unit provided in the game table and configured to judge a bet target and a bet amount of the gaming chip bet in the game; and a game result judging unit configured to judge a game result, and the payout judging unit may be configured to judge whether or not an amount of gaming chip read by the payout reading unit matches with a payout amount determined based on the bet target and the bet amount judged by the bet judging unit, and the game result judged by the game result judging unit.

The above management system may further comprise an exchange judging unit configured to judge that exchanging is performed based on that the RFID tags of the gaming chips are read by the collection reading unit and the payout reading unit.

In the above management system, the exchange judging unit may be configured to judge that the exchanging is performed when judging that there are gaming chips in the collection area and the payout area at the same time based on timings at which the RFID tags of the gaming chips are read by the collection reading unit and the payout reading unit.

In the above management system, the RFID tag may be configured to store information for identifying an amount of gaming chip, and the exchange judging unit may be configured to judge whether or not a total amount of gaming chips read by the collection reading unit matches with a total amount of gaming chips read by the payout reading unit when judging that the exchanging is performed.

In the above management system, the exchange judging unit may be configured to judge whether or not the gaming chips read by the collection reading unit and the payout reading unit, respectively, are the gaming chip offered by a player and the gaming chip paid out from the chip tray when judging the exchanging is performed.

The above management system may further comprise an alert device configured to, when judging that the total amount of gaming chips read by the collection reading unit does not match with the total amount of gaming chips read by the payout reading unit, output an alert indicating it.

The above management system may further comprise an alert device configured to, when the gaming chips read by the collection reading unit and the payout reading unit, respectively, are not the gaming chip offered by the player and the gaming chip paid out from the chip tray, output an alert indicating it.

In the above management system, the collection reading unit may comprise a collection antenna arranged in the collection area and a collection reading device configured to control the collection antenna and decode a signal received by the collection antenna, and the payout reading unit may comprise a payout antenna arranged in the payout area and a payout reading device configured to control the payout antenna and decode a signal received by the payout antenna.

In the above management system, the collection reading device and the payout reading device may be configured to perform reading, respectively, at independent times.

In the above management system, the collection reading device and the payout reading device may be the same device.

In the above management system, the same device may be configured to use alternately the collection antenna and the payout antenna to perform alternately readings of the collection area and the payout area.

The above management system may further comprise a jamming antenna configured to restrict the collection antenna from reading the RFID tag of the gaming chip at the payout area and/or a jamming antenna configured to restrict the payout antenna from reading the RFID tag of the gaming chip at the collection area.

In the above management system, the collection area and the payout area may be arranged at a distance apart from each other such that the collection reading unit does not read the RFID tag of the gaming chip at the payout area and/or the payout reading unit does not read the RFID tag of the gaming chip at the collection area.

The aspect of the present invention can provide a management system configured to help to electronically grasp a transaction of a gaming chip.

BRIEF DESCRIPTION OF DRAWINGS

FIG. 6 is a view showing an example of data in a chip management database to be updated by a first method of a movement management of the gaming chip according to the first embodiment of the present invention.

FIG. 7 is a view showing an example of data in the chip management database to be updated by a second method of the movement management of the gaming chip according to the first embodiment of the present invention.

FIG. 8 is a view showing an example of data in the chip management database to be updated by a fourth method of the movement management of the gaming chip according to the first embodiment of the present invention.

FIG. 9 is a view showing an example of data in the chip management database to be updated by a fifth method of the movement management of the gaming chip according to the first embodiment of the present invention.

FIG. 10 is a view showing an example of data in the chip management database to be updated by the fourth method of the movement management of the gaming chip according to the first embodiment of the present invention.

FIG. 15 is a table showing an example of data stored in a database according to the second embodiment of the present invention.

DESCRIPTION OF EMBODIMENTS

Figure 1:
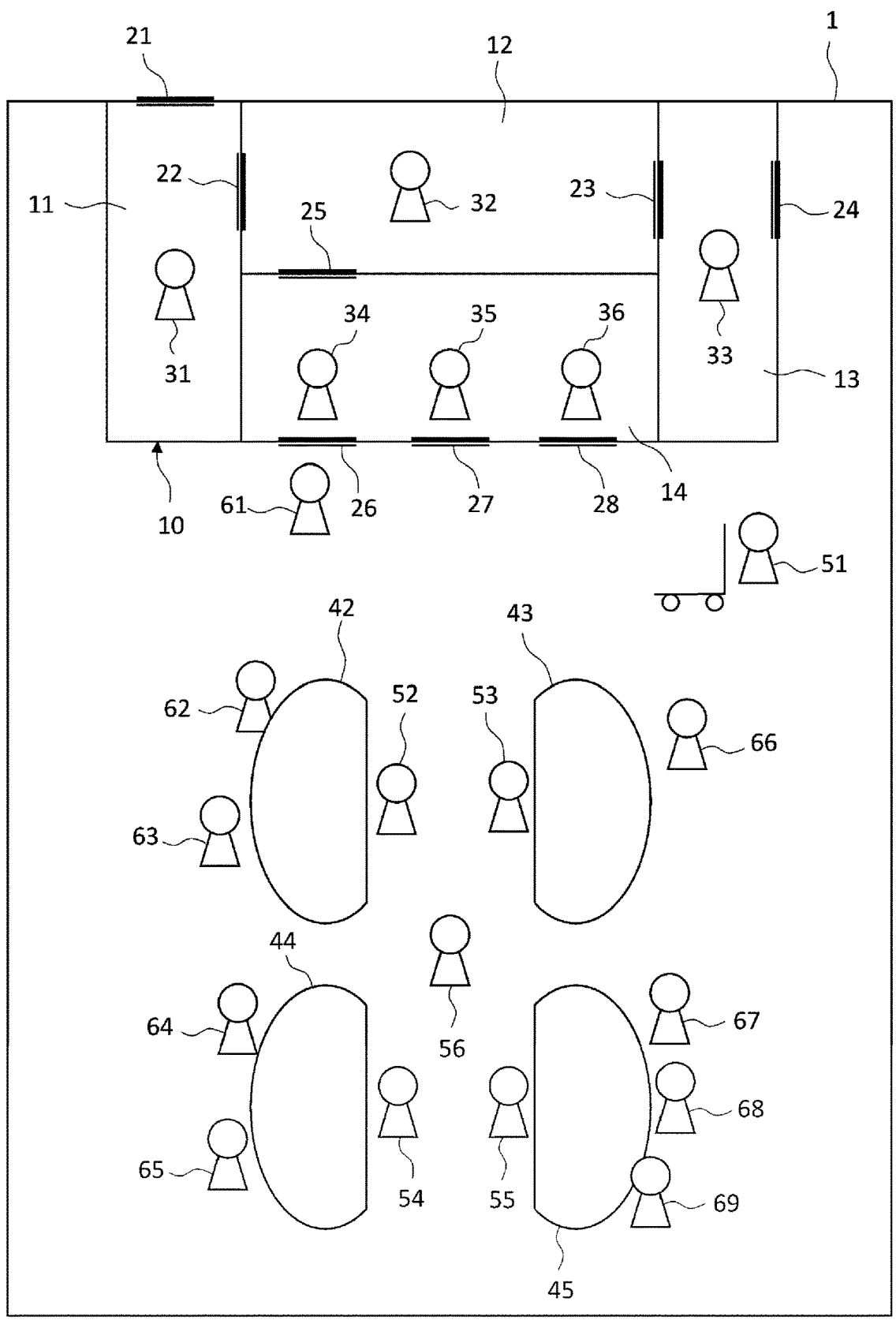
FIG. 1 is a schematic diagram showing an overall configuration of a casino according to a first embodiment of the present invention.

A gaming chip is brought into a casino through a cage inside the casino, and a gaming chip to be disposed of is also brought out from the cage. A conventional gaming chip tracing system is not necessarily capable of monitoring all gaming chip movements within the casino, including movement of gaming chips inside the cage and between the cage and each location in the casino.

Therefore, this embodiment explains a cage system configured to monitor the movement of gaming chips in the cage and between the cage and each location in the casino, and a gaming chip management system including this and configured to manage the gaming chips in the casino.

A cage system according to the present embodiment is a cage system configured to manage movement of a gaming chip within a cage in a casino hall and has a configuration wherein the cage is divided into a plurality of locations including a cashier, the gaming chip includes an RFID tag configured to store a chip ID, the cage system comprises: a first reading unit configured to read the chip ID from the RFID tag of the gaming chip moving between the plurality of locations; a second reading unit configured to read the chip ID from the RFID tag of the gaming chip exiting the cage to the casino hall; and a recording unit configured to record the chip ID read by the first reading unit and the second reading unit as movement history of the gaming chip. By this configuration, it is possible to manage the movement of the gaming chip in the cage.

In the above cage system, the recording unit may record a movement destination and/or a movement source together with the chip ID in the movement history. By this configuration, it is possible to grasp whether the movement is being performed accurately.

The above cage system may further comprise a management unit configured to judge whether or not the move is appropriate based on the move history. By this configuration, it is possible to detect an inappropriate move.

In the above cage system, the management unit may record that there is an illicitness or a suspected illicitness in the recording unit with respect to the gaming chip having the movement history not matching with a predetermined movement history possibility.

The above cage system may further comprise a third reading unit configured to read the chip ID from the RFID tag of the gaming chip entering the cage from the casino hall. By this configuration, it is possible to completely control the gaming chips in the cage.

In the above cage system, the management unit may emit an alert or record when the movement destination is recorded in the movement history of the gaming chip exiting to the casino hall and the gaming chip is not received at the movement destination. By this configuration, it is possible to detect that the movement from the cage to the predetermined location in the casino hall is not completed normally.

In the above cage system, the management unit may emit an alert or record when the gaming chip is not received at the movement destination within a predetermined time. By this configuration, it is possible to judge that there is an abnormality when the movement is not completed within the predetermined time.

A gaming chip management system according to the present embodiment includes a configuration comprising: any one of the above cage systems; and a fourth reading unit arranged at a game table and configured to read the chip ID from the RFID tag of the gaming chip. By this configuration, it is possible to manage the gaming chips in the casino hall including the cages.

In the above gaming chip management system, the management unit may calculate the total amount of gaming chips possessed by a player in the casino hall. By this configuration, it is possible to determine total debt of the casino in real time.

In the above gaming chip management system, the management unit may record date and time information in the movement history. By this configuration, it is possible to record the movement history in more detail.

In the above gaming chip management system, the management unit may detect suspicious movement of the gaming chip based on the date and time information. By this configuration, it is possible to detect various suspicious movements.

In the above gaming chip management system, the management unit may record information on a staff involved in the movement in the move history. By this configuration, it is possible to identify the staff involved in an inappropriate move when the inappropriate move occurs.

The following is a detailed description of a cage system and a gaming chip management system according to the present embodiment with reference to the drawings.

FIG. 1 is a schematic view showing an overall configuration of a casino. A casino hall 1 includes a cage 10 and a plurality of game tables 42-45. A floor provided with the game tables 42-45 may be divided into a VIP floor and amass floor. The cage 10 is a room which only security staff can enter. The cage 10 is divided into a vault 11, a main bank room 12, a f/c bank room 13, and a cashier room 14.

A gate 21 leading to the outside of the cage 10 is provided in the vault 11 includes, a gate 22 is provided between the vault 11 and the main bank room 12, a gate 23 is provided between the main bank room 12 and the F/C bank room 13, a gate 25 is provided between the main bank room 12 and the cashier room 14, and a gate 24 leading to the casino hall 1 in which the game tables 42-45 are located are provided in the F/C bank room 13. Gates (windows) 26-28 leading to the casino hall 1 are provided in the cashier room 14. In each gate 21-25, traffic of people and gaming chips may be allowed, or only gaming chips may pass through and a door for people to enter and exit may be provided separately from the gate. The windows 26-28 opens enough to allow exchange between the gaming chips and cash.

A vault staff 31 is located in the vault 11, a main bank staff 32 is located in the main bank room 12, a f/c bank staff 33 is located in the f/c bank room 13, and cashier staffs 34-36 are located in the cashier room 14 corresponding to the windows 26-28.

The game tables 42-45 are provided in the casino hall 1, respective one dealer 52-55 is located at each game table 42-45. Although only four game tables are shown in an example in FIG. 1, more game tables are actually provided in the casino hall 1. In addition, a pit manager 56 is located for several adjacent game tables 42.

In the example in FIG. 1, there are players 61-69 inside the casino hall 1. Players inside the casino hall 1, like a player 61 shown in FIG. 1, can purchase or cash the gaming chips through one of the windows 26-28. The player who purchases the gaming chips in the cage 10 can bet the gaming chips and enjoy a game at the game tables 42-45. When the player loses the game, the dealer collects the gaming chips, and when the player wins the game, the player receives a payout from the dealer in accordance with rules of the game and a bet amount. In this way, the gaming chips possessed by the player increase or decrease depending on the game. When the gaming chips runs out, the player can purchase gaming chips again at the cage 10 (buy-in). When finishing the play, the player can also cash the gaming chips at the cage 10 (buy out).

At the game tables 42-45, the gaming chips are collected from the player who lose the game and the gaming chips are paid out to the player who wins the game. As a result, the amount of gaming chips possessed by the dealer (casino) at the game tables increases or decreases. When the gaming chips run short at the game tables, a gaming chip carrying staff 51 receives the gaming chips from the gate 24 of the F/C bank room 13, carries them to the game table, and supplies the game table. Supplying the gaming chips to the game tables in this manner is also referred to as "fill." When the gaming chips excess at the game tables, the gaming chip carrying staff 51 carries the gaming chips from the game tables to the cage 10, and the gaming chips are stored in the F/C bank room 13 through the gate 24. Returning the gaming chips from the game tables to the cage 10 in this manner is also referred to as "credit."

When managing a movement history of the gaming chip in the casino hall 1, a movement source, a movement destination, and possible positions between them are referred to as locations in the following. In the case of the example in FIG. 1, for example, each room and each game table in the cage 10 are each referred to as a location.

Figure 2:
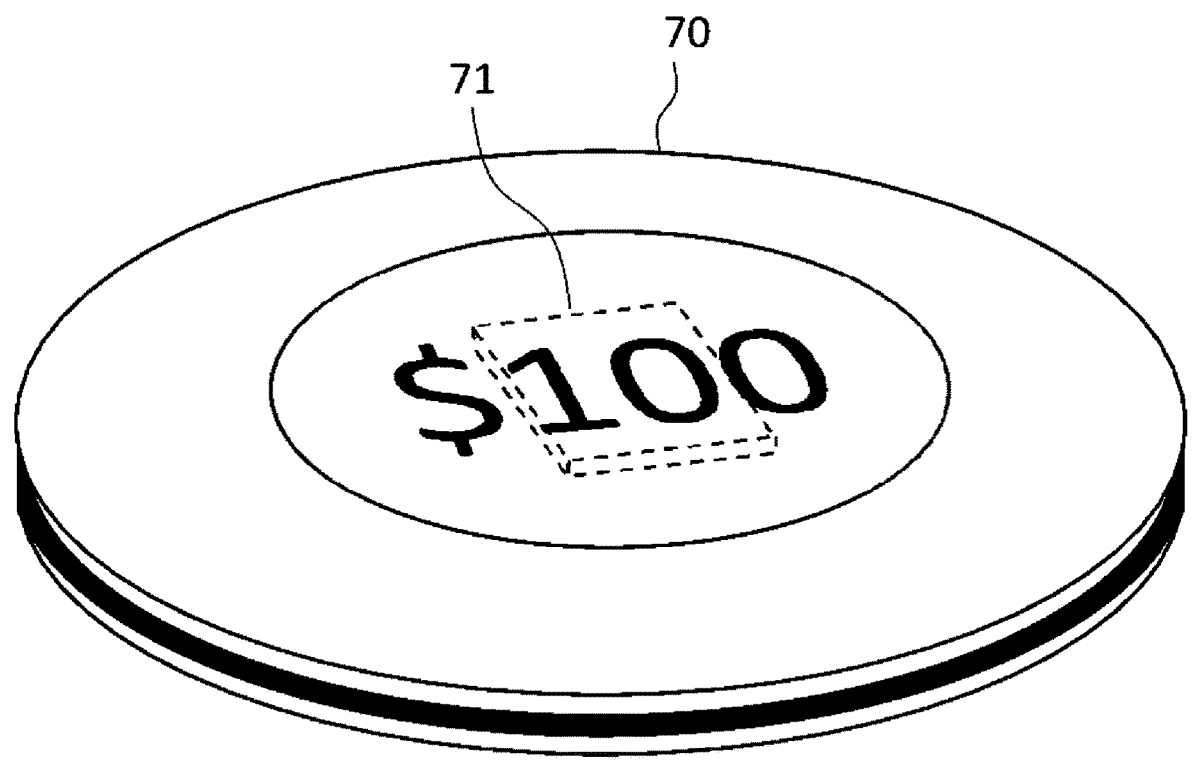
FIG. 2 is a perspective view showing a gaming chip according to the first embodiment of the present invention.

FIG. 2 is a perspective view showing a gaming chip according to the first embodiment of the present invention. FIG. 2 shows a $100 gaming chip. The gaming chip 70 includes a disc-shape and a face value ("$100" in the case of FIG. 1) is shown on both surfaces. A plurality of layers is laminated in the order of a white layer, a colored layer, and a white layer in the direction of thickness, and a stripe pattern with the colored layer sandwiched by the white layer is provided on the side surface. A color of the colored layer differs according to the face value, and thus the face value of the chip can be judged by distinguishing the color of the colored layer.

An RFID tag 71 is built in the inside of the gaming chip 70. Information of a chip ID and the face value of the chip is recorded in the RFID tag 71. The RFID tag 71 may be writable, and, in this case, information on a current location and possessor of the gaming chip may be stored in the RFID tag 71, and a past location and possessor history may be also recorded. The gaming chip 70 may be formed by crimping a plurality of plate members, or may be formed by resin molding.

Figure 3:
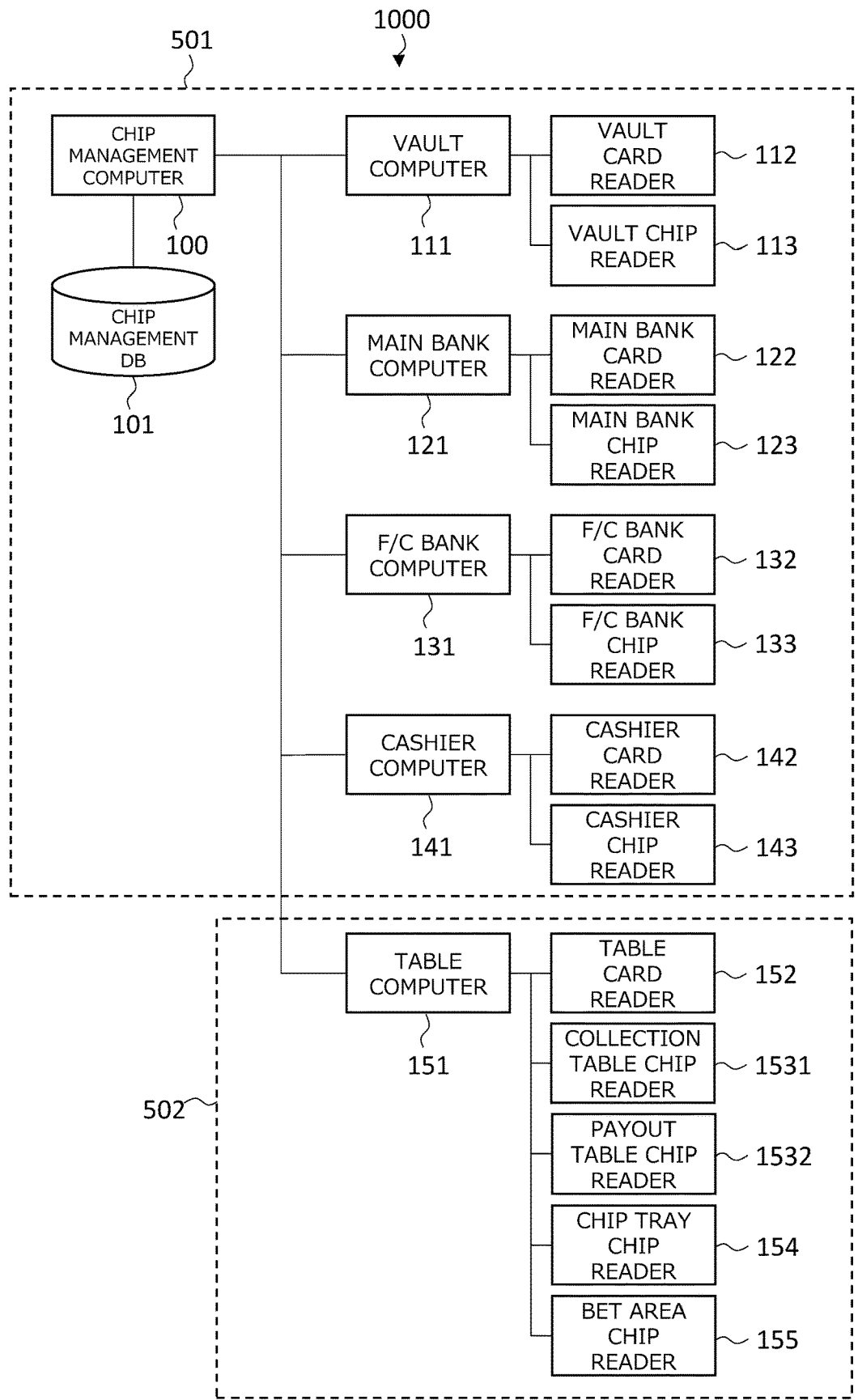
FIG. 3 is a block diagram showing a gaming chip management system according to the first embodiment of the present invention.

FIG. 3 is a block diagram showing a gaming chip management system according to the first embodiment of the present invention. A chip management system 1000 includes a cage system 501 and a plurality of table systems 502. The table system 502 is provided at each game table. The cage system 501 includes a chip management computer 100 and a chip management database 101 configured to integrally manage the chips in the cage 10 and in the casino hall 1.

The cage system 501 also includes a vault computer 111 provided in the vault 11, and a vault card reader 112 and a vault chip reader 113 connected thereto. The cage system 501 also includes a main bank computer 121 provided in the main bank room 12, and a main bank card reader 122 and a main bank chip reader 123 connected thereto. The cage system 501 also includes an F/C bank computer 131 provided in the F/C bank room 13, and an F/C bank card reader 132 and an F/C bank chip reader 133 connected thereto. The cage system 501 also includes a cashier computer 141 provided corresponding to each of the windows 26-28 in the cashier room 14, and a cashier card reader 142 and a cashier chip reader 143 connected thereto.

The table system 502 includes a table computer 151, and a table card reader 152, a collection table chip reader 1531, a payout table chip reader 1532, a chip tray chip reader 154, and a plurality of bet area chip readers 155 connected thereto. Although only one table system 502 is shown in FIG. 3, a plurality of table systems 502 is provided corresponding to a plurality of game tables. The above "reader" is a configuration including an antenna and a reading device configured to control the antenna to transmit a radio wave to the RFID tag and decodes a signal received by the antenna to obtain information of the RFID tag.

The vault computer 111, the main bank computer 121, the F/C bank computer 131, the cashier computer 141, the table computer 151, and the chip management database 101 are connected to the chip management computer 100, respectively. The chip management computer 100, and the other computer and the chip management database 101 may be connected to each other through wire or wireless via a local network. Alternatively, the chip management computer 100 and the chip management database 101 may be located on a wide area network (e.g., the Internet) and connected to the other computer via the wide area network. That is, the chip management computer 100 and chip management database 101 may be located in the cloud rather than in the casino.

An input device not shown is connected to each computer 100, 111, 121, 131, 141, 151, which is configured to receive operational input by the corresponding staff. The input device is, for example, a keyboard, a mouse, a button, a touch pad, a touch panel, or a voice input device. While exiting only this input device and a communication device at the corresponding location, the functions of each computer may be integrated in the chip management computer 100. In this case, various signals (e.g., input signals input to the input devices, signals read by the chip readers or the like) may be directly transmitted between the input device, the card reader, and the chip reader at each location and the chip management computer 100.

The card reader 112, 122, 132, 142, 152 at each location reads a staff ID or a player ID from an ID card possessed by the staff or the player. Specifically, the vault card reader 112, the main bank card reader 122, and the F/C bank card reader 132 read the staff ID from the ID card of the corresponding staff respectively, the cashier card reader 142 reads the staff ID from the ID card of the cashier staff and also reads the player ID of the player who purchases or cashes the gaming chips at the cashier. The table card reader 152 reads the staff ID of the corresponding dealer and reads the player ID of the player who plays.

The chip reader 113, 123, 123, 133, 143, 153, 155 at each location reads the information from and write the information to the RFID tag 71 of the gaming chip 70. In particular, each chip reader 113, 123, 133, 143, 153 reads the information from the RFID tag 71 of the gaming chip 70 when the gaming chip 70 moves to the location from the other location, and when the gaming chip moves from the location to the other location (that is, when the gaming chip 70 exits the location).

Figure 4:
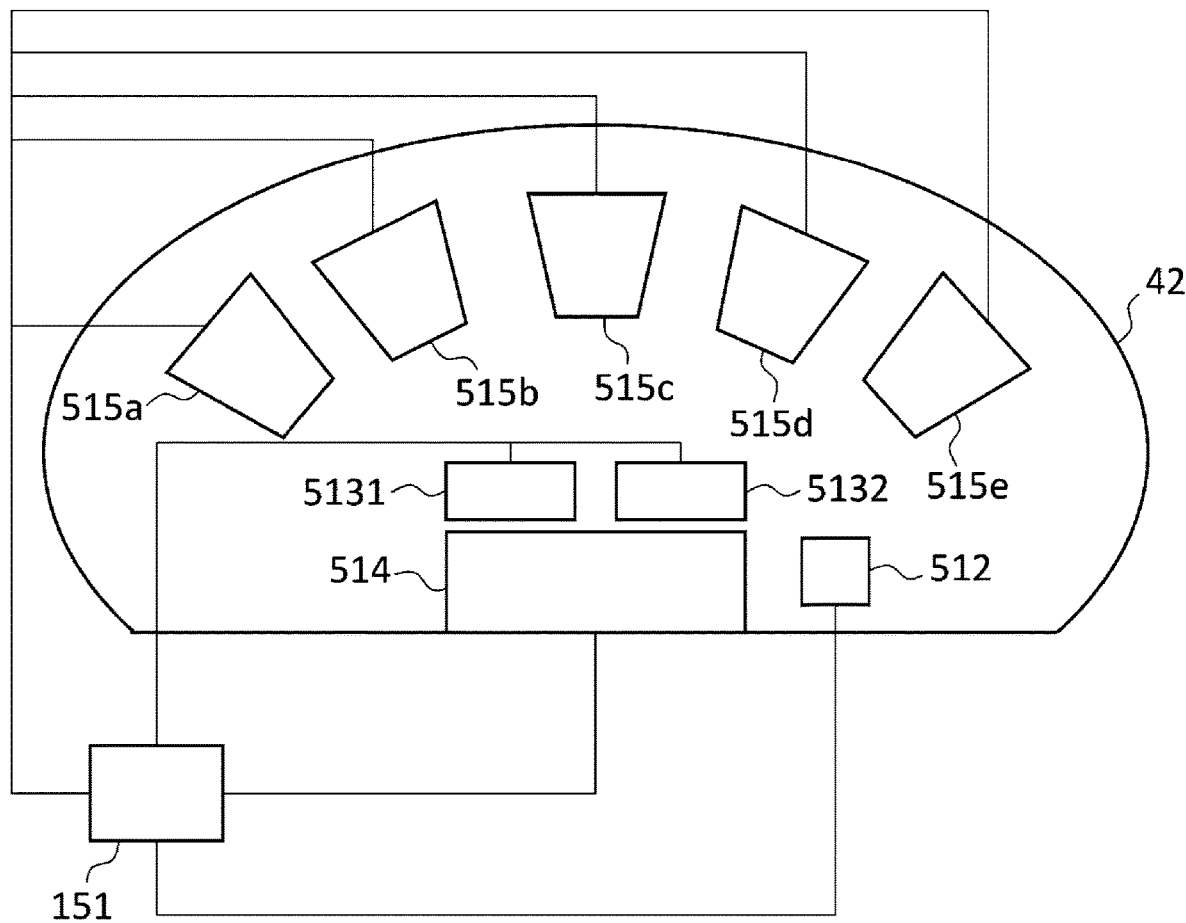
FIG. 4 is a schematic diagram showing a configuration of a game table according to the first embodiment of the present invention.

FIG. 4 is a schematic diagram showing a configuration of a game table according to the first embodiment of the present invention. In FIG. 4, the game table 42 is shown as an example. A plurality of playing positions is provided at the game table 42. The game table 42 includes on the table surface a plurality of bet areas corresponding to the plurality of playing positions, a chip tray configured to accommodate the chips of the dealer, a dealer area configured to read and write the information to and from the RFID tag 71 of the gaming chip 70, and an ID card area configured to read the ID cards of the dealer and the player.

A chip tray antenna 514 is provided at the chip tray, which is configured to read the RFID tags 71 of the gaming chips 70 accommodated therein. Bet area antenna 515a-515e is provided inside a table surface at each of the multiple bet areas, respectively, which is configured to read the RFID tags 71 of the gaming chips 70 placed therein. A collection dealer antenna 5131 and a payout dealer antenna 5132 are provided inside the table surface at the dealer area, which is configured to read the RFID tags 71 of the gaming chips 70 placed therein. An ID card antenna 512 is provided inside the table surface at the ID card area, which is configured to read the RFID tags 71 of the gaming chips 70 placed therein.

Each of the antennas 512-515 is connected to the table computer 151 and transmits the read signals to the table computer 151. The table computer 151 decodes the signals from each antenna to obtain the various information stored in the RFID tags 71 and the ID cards.

The staff stationed in each location has own card ID read by the corresponding card reader, and then, starts work. The computer at each location transmits the read staff ID and its date and time to the chip management computer 100. The chip management computer 100 stores the staff ID read by the card reader at each location together with the information of the location, and the date and time in the chip management database 101.

A player table, a chip table, a game table, a staff table, and a movement history table are stored in the chip management database 101. Registration information of the player is stored in the player table. The player ID and various player attributes, as well as a player status such as VIP, suspect, blacklist or the like are stored for each player in the player table. The chip ID, the face value, type, and manufacturing information, as well as a chip status such as valid, missing, stolen, invalid or the like are recorded in the chip table. A table ID, a game type or the like are recorded in the game table. The staff ID, various staff attribute or the like are recorded in the staff table. The history of the location and the possessor of the gaming chip 70 in the movement history table.

Figure 5:
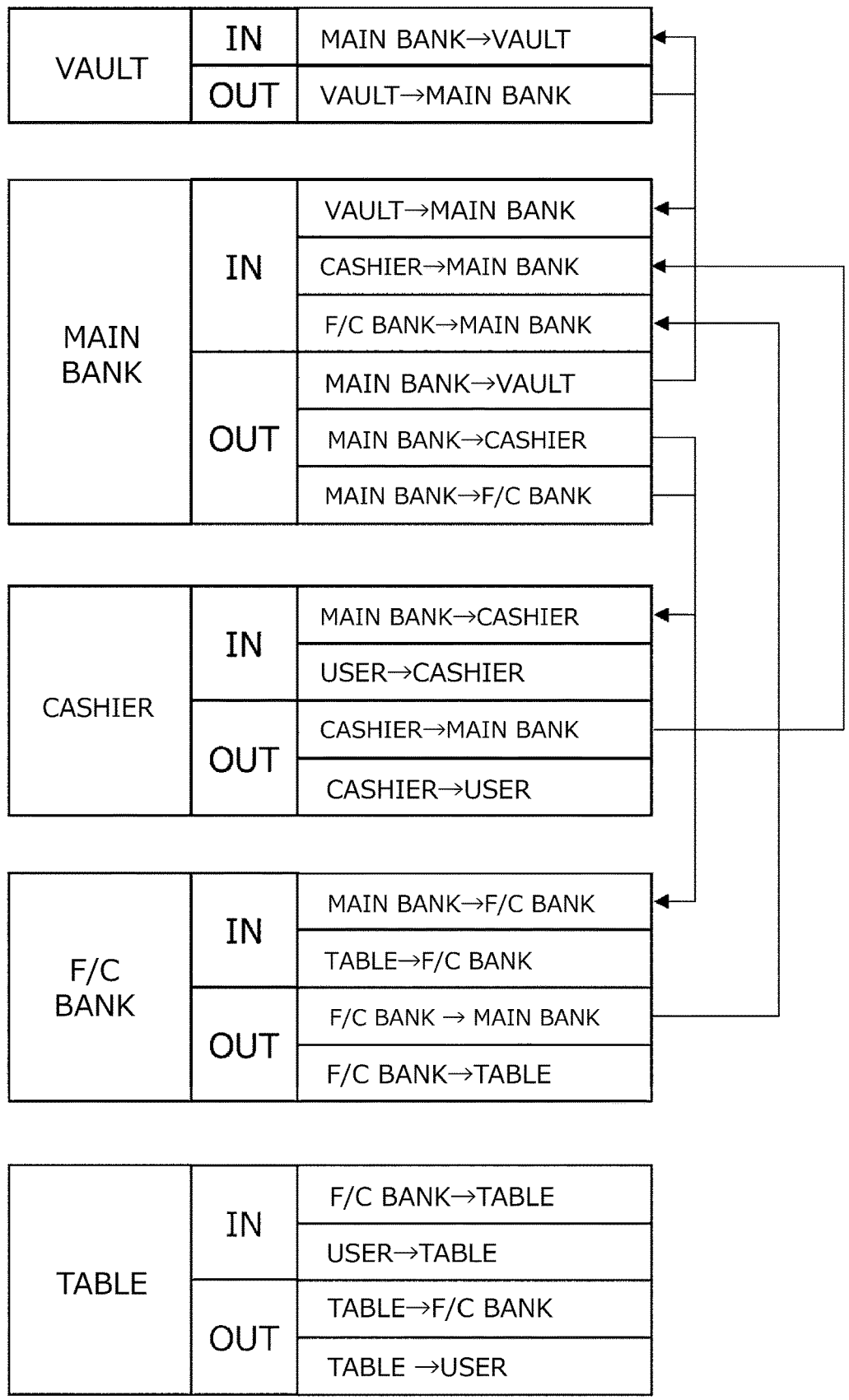
FIG. 5 is a view showing a situation of a movement of the gaming chip according to the first embodiment of the present invention.

FIG. 5 is a view showing a situation of a movement of the gaming chip according to the first embodiment of the present invention. As shown in FIG. 5, there is a possibility of a movement from the plurality of sources when the gaming chips enter and a possibility of a movement to the plurality destinations when the gaming chips exit for each location except for the vault. The chip management system according to the present embodiment recognizes these movements. To do so, the following several methods can be used.

In a first method, in the computer at each location, when the gaming chip 70 enters, the movement source thereof is designated at the computer at the location, and the designation together with the chip ID of the entering gaming chip 70 are reported to the chip management computer 100, and when the gaming chip 70 exits each location, the location, that is, the movement source, and the chip ID of the gaming chip 70 are reported to the chip management computer 100.

For example, when the gaming chip 70 moves from the main bank room 12 to the F/C bank room 13, the main bank computer 121 reads the chip ID of the gaming chip 70 with the main bank chip reader 123 and reports the exiting from the main bank room 12 together with the read chip ID to the chip management computer 100. The chip management computer 100 updates the chip management database 101 in response to this report.

In the F/C bank room 13 that receives the gaming chip 70 from the main bank room 12, the F/C bank staff 33 operates the input device of the F/C bank computer 131 to input designation that the gaming chip 70 is the gaming chip 70 come from the main bank room 12 (the movement source), and reads the chip ID of the gaming chip 70 with the F/C chip bank reader. The F/C bank computer 131 reports to the chip management computer 100 the designation that the movement source is the main bank room 12 together with the read chip ID. The chip management computer 100 updates the chip management database 101 in response to this report.

FIG. 6 is a view showing an example of data in a chip management database to be updated by a first method of a movement management of the gaming chip according to the first embodiment of the present invention. The example in FIG. 6 shows the movement history of the gaming chip 70 whose chip ID is "24825." The chip management database 101 stores as the information of the movement history of the gaming chip 70 the chip ID 601 of the gaming chip 70, entering and exiting information 602, movement source information 603, movement destination information 604, and date and time 605.

According to the first method, as shown in FIG. 6, for the gaming chips 70 exiting the location, information of the movement source (history H61) is obtained, and for the gaming chip 70 entering the location, information of the movement source and the movement destination (history H62) is obtained, thereby confirming that the gaming chips 70 indeed exits the main bank room 12 and is received in the F/C bank room 13 on the basis of the history H61 and the history H62.

In a second method, in the computer at each location, when the gaming chip 70 exits, the movement destination thereof is designated at the computer at the location, and the designation together with the chip ID of the exiting gaming chip 70 is reported to the chip management computer 100, and when the gaming chip 70 enters each location, the location, that is, the movement destination and the chip ID of the gaming chip 70 are reported to the chip management computer 100.

For example, when the gaming chip 70 is moved from table-4 to the F/C bank room 13 (credit), the dealer reads the chip ID of the gaming chip 70 with the table chip reader 153 of the game table and operates the input device of the table computer 151 to designate the F/C bank room 13 as the movement destination (designate the credit). The table computer 151 reports this chip ID, the F/C bank room 13 as the movement destination, and the table ID of the table-4 as the movement source to the chip management computer 100. The chip management computer 100 updates the chip management database 101 in response to this report.

At the F/C bank room 13 as the movement destination, when the gaming chip 70 is received, the F/C bank staff 33 reads the chip ID of the gaming chip 70 with the F/C bank chip reader 133. The F/C bank computer 131 reports the read chip ID and the entering the F/C bank room 13 to the chip management computer 100. The chip management computer 100 updates the chip management database 101 in response to this report.

FIG. 7 is a view showing an example of data in the chip management database to be updated by a second method of the movement management of the gaming chip according to the first embodiment of the present invention. The example in FIG. 7 also shows the movement history of the gaming chip 70 whose chip ID is "24825." The chip management database 101 stores as the information on the movement history of the gaming chip 70 the chip ID 601 of the gaming chip, the entering and exiting information 602, the movement source information 603, the movement destination information 604, and the date and time 605.

According to the second method, as shown in FIG. 7, for the gaming chip 70 exiting the location, information on the movement source and the movement destination is obtained (history H71), and for the gaming chips 70 entering the location, information on the movement destination is obtained (history H72), thereby confirming that the gaming chip 70 indeed exit table-4 and is received in the F/C bank room 13 base on the history H71 and the history H72.

A third method is a combination of the first method and the second method. That is, in the computer at each location, when the gaming chips 70 enters, the movement source is designated, and when the gaming chip 70 exits, the movement destination is designated.

In a fourth method, the staff at each location designates whether the gaming chip 70 exits or enters using the input device of the computer at each location, and then reports the designation together with the chip ID of the gaming chip 70 read by the chip reader to the chip management computer 100. The chip management computer 100 updates the exiting/entering information and the location information in the chip management database 101 based on this report.

FIG. 8 is a view showing an example of data in the chip management database to be updated by a fourth method of the movement management of the gaming chip according to the first embodiment of the present invention. The chip management database 101 stores as the information of the movement history of the gaming chip 70 the chip ID 601 of the gaming chip, the entering and exiting information 602, the location information 606, and the date and time 605.

According to the fourth method, as shown in FIG. 8, the exiting and entering information 602 and the location information 606 are recorded, thereby confirming that the gaming chip 70 indeed exits the vault 11 and is received in the main bank room 12 based on the history H81 and the history H82.

In the fifth method, only location information is recorded. That is, the staff at each location reads the chip ID of the gaming chip 70 at the chip reader at the location when the gaming chip 70 is at the location, and reports to the chip management computer 100. The chip management computer 100 updates the chip management database 101 in response to this report. The staff at each location may read the chip ID at a timing when the gaming chip 70 moves to the location, may read the chip ID at a timing when the gaming chip 70 moves out of the location, or may read the chip ID at any timing.

FIG. 9 is a view showing an example of data in the chip management database to be updated by a fifth method of the movement management of the gaming chip according to the first embodiment of the present invention. The chip management database 101 stores as the information of the movement history of the gaming chip 70 the chip ID 601 of the gaming chip, location information 606, and the date and time 605.

In the fifth method, as shown in FIG. 9, the location information 606 is recorded, thereby confirming that the gaming chip 70 indeed exits the vault 11 and is received in the main bank room 12 based on the history H91 and the history H92.

It may be decided which of the above first or fifth methods is used for each combination of the movement source and the movement destination. For example, the fourth or fifth method may be used for the movement of gaming chip 70 within the cage 10, the second method where the movement destination is designated at the movement source may be used for the movement from F/C bank room 13 to the game table, and the first method where the movement source is designated at the movement destination may be used for the movement from the game table to the F/C bank room 13.

When the gaming chip 70 is moved from the cashier room 14 to the player (the player purchases the gaming chip 70 at the cashier), the cashier computer 141 reads the chip ID of the gaming chips 70 with the cashier chip reader 143, reads the player ID from the ID card of the player with the cashier card reader 142 and reports the designation of the player as the movement destination together with the read chip ID to the chip management computer 100. The chip management computer 100 updates the chip management database 101 in response to this report.

When the gaming chip 70 is moved from the player to the cashier room 14 (the player cashes the gaming chip 70 at the cashier), the cashier computer 141 reads the chip ID of the gaming chip 70 with the cashier chip reader 143, reads the player ID from the ID card of the player with the cashier card reader 142, and reports the designation of the player as the movement source together with the read chip ID to the chip management computer 100. The chip management computer 100 updates the chip management database 101 in response to this report.

FIG. 10 is a view showing an example of data in the chip management database to be updated by the fourth method of the movement management of the gaming chip according to the first embodiment of the present invention. In the example in FIG. 10, a player-5 purchases 70 the gaming chip at a cashier-2 (history H101, H102), and then the player-5 cashes the gaming chip 70 at a cashier-3 (history H103, H104). In the case of the first to third methods, only the information of the movement source (cashier) and the movement destination (player) may be recorded with the exiting/entering information 602 as N/A.

For example, at the cashier, the cashier staff may read the chip ID of the gaming chip 70 using the cashier chip reader 143 upon designation of receiving when receiving the gaming chip 70 from the player, and read the chip ID of the gaming chip 70 using the casher chip reader 143 upon designation of handing when handing the gaming chip 70 to the player.

Thereby, it is possible to clearly identify whether the gaming chip 70 whose chip ID is read by the chip reader enters or exits the location. Also, in the case of exchanging the chip, it is possible to identify the chip ID using the chip reader while clearly distinguish between the gaming chip 70 received from the player and the gaming chip 70 handed to the player.

The Player who purchases the gaming chip 70 can play the game at the game table. In this time, in the game table, the ID card of the player is first read with the table card reader 152 including the ID card antenna 512. When reading the ID card of the player with the table card reader 152, the playing position of the player is designated. Thereby, it is possible to recognize which player is in which bet area. The bet area antennas 515a-515e may be one or more antennas configured to read the gaming chip 70 placed in one bet area wherein the plurality of bet areas is grouped together as one bet area without distinguishing each player position. There may be no antenna in the bet area.

When the player loses the game at the game table, the bet gaming chip 70 is collected. In this case, the chip tray antenna 514 reads the chip ID of the gaming chip 70 in the chip tray before collection and also reads the chip ID of the gaming chip 70 in the chip tray after the collection. The table computer 151 compares the chip IDs of the chip tray before and after the collection to recognize the chip ID of the gaming chip 70 newly brought into the chip tray (that is, collected from the player).

The table computer 151 reports the chip ID read by the chip tray antenna 514 together with the designation of moving to the chip tray of the game table to the chip management computer 100 with respect to the gaming chip 70 collected from the player. The chip management computer 100 updates the chip management database 101 in response to this report.

In the case where the table computer 151 can judge whether or not each bet gaming chip 70 should be collected by recognizing the chip ID of the bet gaming chip 70 using the bet area antennas 515a-515e and recognizing a game result, when judging that it should be collected, the movement history of exiting the player and moving to the game table may be updated with respect to the gaming chip 70 in the chip management database 101 in response to the judgement. By this update and a subsequent update of being received in the chip, it is possible to confirm whether the gaming chip 70 which should be collected is indeed collected in the chip tray. That is, the movement history wherein the exiting/entering information 602 is "OUT" and the location information 606 is any player is recorded as it should be collected, but no subsequent movement history of being received in the chip tray is recorded, and then, it becomes apparent that the gaming chips 70 which should be collected is not collected rightly.

In the present embodiment, although comparing the chip IDs read from the chip tray before and after the collection to grasp the chip ID newly brought into the chip tray by the collection, instead of this, the chip ID of the collected gaming chip 70 may be grasped by specially providing a collection chip area configured to temporarily accommodate the collected chip in the chip tray and providing an antenna independent of the other chip tray portion in the collection chip area.

Alternatively, for the gaming chip 70 to be collected, the chip ID of the gaming chip 70 to be collected may be identified by reading the RFID tag 71 with the collection dealer antenna 5131 in the collection area on the way of moving from the bet area to the chip tray.

When the player wins the game, the player receives a payout of the gaming chip 70. For the gaming chip 70 to be paid out to the player from the chip tray, the dealer first places it in the payout area of the game table. At this time, the payout dealer antenna 5132 reads the chip ID from the RFID tag 71 of the gaming chip 70 in the payout area. Since the table computer 151 grasps which player plays in each bet area, it is possible to link the gaming chip 70 to be paid out with the player who it to receive the payout (make the location information of the gaming chip 70 to be paid out the player).

The method of identifying the chip ID of the gaming chip 70 to be paid out and linking it with the player is not limited to the above, and, for example, the table computer 151 may read the chip ID of the gaming chip 70 stored in the chip tray before and after the payout to identify the chip ID of the gaming chip 70 to be paid out and link it with the player who receives the payout.

When the gaming chip 70 to be paid out is placed in the bet area, the chip ID of the gaming chip 70 may be read by the bet area antenna 515 of the bet area. In this case, the chip ID of the bet gaming chip 70 (linked with the player) together with the chip ID of the gaming chip 70 to be paid out (linked with the dealer or casino) are also read, the chip management computer 100 links the chip ID of the gaming chip 70 to be paid out to the player linked to the chip ID of the bet gaming chip 70.

An antenna and a reading area for reading the RFID tag 71 of the gaming chip 70 to be paid out may be provided at each player position. These antenna and reading area may be arranged between the bet area and the dealer at each player position. In this case, since perceiving which player is in each player position, it is still possible to link the gaming chip 70 to be paid out with the player IDs. In this case, the dealer may first place the gaming chip 70 to be paid out in the reading area of the relevant player position and read it with the antenna there, and then move the gaming chip 70 in a position adjacent to the betting chip at the bet area, or the relevant player takes the gaming chip 70 to be paid out placed by the dealer.

The table computer 151 reports a combination of the chip ID of the gaming chips 70 to be paid out and the player ID of the player receiving the payout to the chip management computer 100. The chip management computer 100 updates the movement history that the gaming chip 70 at the game table moves to the player in the chip management database 101 in response to this report.

During the payout too, the chip ID of the gaming chip 70 to be paid out may be identified by reading the RFID tag 71 with the payout dealer antenna 5132 once for the gaming chip 70 taken out from the chip tray.

In the above examples in FIGS. 6 to 10, in each movement history of each gaming chi 70, not only the location information but also the staff ID of the staff involved in the movement at that location may be recorded. Moreover, when the location information is the player ID or the casino, the location information may also be owner information. In each movement history, status of "Valid," "Invalid," "Missing," "Suspicious," "Not cashable," "Not playable" or the like may be recorded as status information of the gaming chip 70. It may also be indicated by a flag whether it is valid or invalid. Furthermore, in the above examples in FIGS. 6 to 10, each movement history record may also include the information on the face value of each gaming chip 70 together with the chip ID thereof.

As described above, it is possible to record the movement history of each gaming chip 70 in the chip management database 101 by reading the chip ID at each location. Thereby, the chip management computer 100 can perform various functions described below.

In this function, the chip management computer 100 monitors movement of the gaming chip 70 between the F/C bank room 13 and the game table, and emit an alert when there is a problem. That is, the chip management computer 100 starts timing when it receives a report from the F/C bank computer 131 that a certain gaming chip 70 exits the F/C bank room 13 with its movement destination is any one of the game tables. Then, when the chip management computer 100 does not receive a report receiving the gaming chip 70 within a predetermined time (e.g., 5 minutes) from the table computer 151 at the game table of the movement destination, it may emit an alert. This alert may be sent to the dealer of the relevant game table, the pit manager managing the relevant game table or the like. At this time, the chip management computer 100 may update the status of the gaming chip 70 to "Missing," "Not cashable," "Not playable" or the like in the chip management database 101.

Moreover, when the chip management computer 100 receives a report from the F/C bank computer 131 that a certain gaming chip 70 exits the F/C bank room 13 with designating any one of the game tables as the movement destination, and receives a report receiving the gaming chip 70 from a game table other than the game table designated as the movement destination, it may also emit an alert. In this case, the chip management computer 100 may update the status of the gaming chip 70 to "Destination mistake," "Not cashable," "Not playable" or the like in the chip management database 101.

In this function, the chip management computer 100 refers the chip management database 101 to emit an alert when there is an inappropriate movement of the gaming chip 70. The movement of the gaming chip 70 is limited to patterns shown in FIG. 5, and any other movement pattern other than these is the inappropriate movement. Therefore, at each time updating the chip management database 101, the chip management computer 100 judges whether the movement related to that update is appropriate.

For example, in the case where the cage 10 has the configuration shown in FIG. 1, the gaming chip 70 do not move directly from the vault 11 to the cashier room 14, and for example, the gaming chip 70 that did not move from the cashier room 14 to the player is not collected at the game table, and when these movement histories are discovered, the chip management computer 100 judges an inappropriate movement. When the gaming chip 70 which should be possessed by one player is cashed at the cashier by the other player, a possibility of money laundering is suspected. In this way, the chip management computer 100 detects the inappropriate movement and emits the alert.

In this function, the chip management computer 100 refers to the chip management database 101, extracts only the gaming chips 70 possessed by any of the players in the most recent information in the movement history, and calculates the total amount of those chips to calculate how much all players possesses the gaming chips 70 as the total amount at this point of time, this is, the total debt amount casino at this point of time.

The total amount player chips may be calculated as an amount which the total amount of all gaming chips managed in the chip management database 101 minus the total amount of all gaming chips 70 in the cage 10 and the total amount of all gaming chips 70 at the game table is.

In this function, the chip management computer 100 refers to the chip management database 101 to extract the gaming chips 70 in each game table and detects the number of chips for each face value. When the gaming chips 70 of a certain face value are insufficient in number, a notification may be emitted to the F/C bank computer 131 in the F/C bank room 13 and the table computer 151 at that game table to supply (fill) the gaming chips 70 of that face value. In this notice, the number of gaming chips 70 which should be supplied for each face value or the total amount of gaming chips 70 which should be supplied for each face value are specified.

The chip management computer 100 refers to the chip management database 101 to extract for each game table the gaming chips 70 at that game table, and detect the total number of gaming chips 70 at that game table. When the total number is more than a predetermined number that is close to the maximum number of chips accommodable in the game table, a notice may be emitted to the F/C bank computer 131 in the F/C bank room 13 and the table computer 151 at that game table so as to collect (credit) the gaming chips 70 from that table. In the notice, the number of gaming chips 70 to be supplied for each face value or the total amount of gaming chips 70 to be supplied for each face value are specified.

Moreover, a notice may also be emitted in the same manner for the movement of gaming chips 70 within the cage 10. For example, when the number of gaming chips 70 becomes a low number in a certain window of the cashier room 14, a notice encouraging to supply the gaming chips 70 to the cashier room 14 may be emitted to the cashier computer 141 and the main bank computer 121.

In the above, the notice encouraging to move is emitted to both the movement destination and the movement source, but alternatively, the notice may be emitted to only one of the movement destination and the movement source. At the location that receives the notice encouraging to move, the staff may indicate to the computer at that location through the input device whether or not to accept the proposal of the movement, and when one location of the movement destination and the movement source accepts the proposal, the computer at that location may notice an order of the movement to the other location.

The above describes the method of performing the movement management by updating the movement history in the chip management database 101 for each gaming chip 70, but when a plurality of gaming chips 70 are moved between the locations, it may be to manage whether this plurality of gaming chips 70 was moved without excess or deficiency.

The following describes an example of moving the plurality of gaming chips 70 from F/C bank room 13 to the game table (fill). When the gaming chips 70 are moved from the F/C bank room 13 to a certain game table, the F/C bank staff 33 reads the chip IDs of the gaming chips 70 to be moved with the bank chip reader 133 of the F/C bank room 13. The F/C bank computer 131 reports the read chip ID to the chip management computer 100. The chip management computer 100 stores the chip IDs of the plurality of gaming chips 70 for the fill (movement source chip IDs), refers to the chip management database 101 based on the report to obtain the face values of those chip IDs to grasp the total amount of gaming chips 70 for the fill (the (a movement source total amount). Thereby, the chip management computer 100 grasps the movement source chip ID, and the total number of gaming chips 70 related to the fill (a movement source total number), and the movement source total amount based on the information from the F/C bank computer 131.

When the gaming chips 70 are carried to the game table, the dealer reads the chip IDs of the carried gaming chips 70 with the table chip reader of the game table, and the table computer 151 reports the read plurality of chip IDs to the chip management computer 100. The chip management computer 100 stores this plurality of chip IDs (movement destination chip IDs) and refers to the chip management database 101 based on the report to obtain the face values of those chip IDs to grasp the total amount of gaming chips 70 related to the fill (a movement destination total amount). Thereby, the chip management computer 100 grasps the movement destination chip IDs, the total number of gaming chips 70 related to the fill (a movement destination total number), and the movement destination total amount based on the information from the table computer 151.

The chip management computer 100 compares the movement source chip IDs and the movement destination chip IDs to judge whether they completely match with each other. The chip management computer 100 also compares the movement source total amount and the movement destination total amount to judge whether or not they match with each other. Furthermore, the chip management computer 100 compares the total number at the movement source and the total number at the movement destination to judge whether or not they match with each other. When there is a discrepancy in any of the above comparisons, the chip management computer 100 judges that the movement is not performed correctly to emit an alert.

The following is when the plurality of gaming chips 70 is moved from the game table to the F/C bank room 13 (credit). When gaming chips 70 are moved from the game table to the F/C bank room 13, the dealer reads the chip ID of the gaming chips 70 to be moved using the payout table chip reader 1532 at the game table. The table computer 151 reports the read chip ID to the chip management computer 100. The chip management computer 100 stores the chip IDs of the plurality (movement source chip IDs) and refers to the chip management database 101 based on the report to obtain the face values of those chip IDs to grasp the total amount of gaming chips 70 related to the credit (a movement source total amount). Thereby, the chip management computer 100 grasps the movement source chip IDs, the total number of gaming chips 70 related to the credit (a movement source total number), and the movement source total amount based on the information from the table computer 151.

When the gaming chips 70 are carried to the F/C bank room 13, the F/C bank staff 33 reads the chip IDs of the gaming chips 70 carried with the F/C bank chip reader 133, and the F/C bank computer 131 reports the read plurality of chip IDs to the chip management computer 100. The chip management computer 100 stores this plurality of chip IDs (movement destination chip IDs) and refers to the chip management database 101 based on the report to obtain the face values of those chip IDs to judge the total amount of gaming chips 70 related to the credit (a movement destination total amount). Thereby, the chip management computer 100 grasps the movement destination chip IDs, the total number of gaming chips 70 related to the credit (a movement destination total number), and the movement destination total amount based on the information from the F/C bank computer 131.

The chip management computer 100 compares the movement source chip ID and the movement destination chip ID to judge whether or not they completely match with each other. The chip management computer 100 also compares the movement source total amount and the movement destination total amount to judge whether or not they match with each other. Furthermore, the chip management computer 100 compares the movement source total number and the movement destination total number to judge whether or not they match with each other. When there is a discrepancy in any of the above comparisons, the chip management computer 100 judges that the movement is not performed correctly to emit an alert.

In the above, the chip ID, the total amount, and the total number are all compared, but only one of them may be compared to judge whether or not the movement is performed correctly. The total amount and the total number may also be calculated and compared for each face value of the gaming chips 70. For example, the movement source total amount and the movement destination total amount may be calculated as "$10 chips $600, $100 chips $400."

In the case where the notice encouraging the movement is emitted to the movement destination or movement source from the chip management computer 100, it may be judged whether or not the movement is performed correctly by performing at least one comparison of a comparison between the notification and the movement source total amount, a comparison between the notification and the movement destination total amount, a comparison between the notification and the movement source total number, and a comparison between the notification and the movement destination total number.

When the gaming chips 70 are carried from the F/C bank room 13 to the game table and supplied to the game table (the fill), the chip IDs of the gaming chips 70 carried towards the game table are read at the F/C bank chip reader 133 and these chip IDs are reported to the chip management computer 100 from the F/C bank computer 131. The chip management computer 100 refers to the chip management database 101 to calculate the total amount of gaming chips 70 reported (a fill total amount).

The chip management computer 100 refers to the chip management database 101 to extract the gaming chips 70 at the game table before the fill and calculate the total amount thereof (an existing total amount). Then, the chip management computer 100 calculates the theoretical total amount of gaming chips 70 at the game table after the fill (a theoretical after-fill total amount) by adding the fill total amount to the calculated existing total amount.

At the game table, when the gaming chips 70 are carried from the F/C bank room 13, the chip IDs of the carried gaming chips 70 is read by the collection table chip reader 1531 of the game table and reported to the chip management computer 100 by the table computer 151. The chip management computer 100 refers to the chip management database 101 to obtain the face values for the reported chip IDs to calculate the actual total amount of gaming chips 70 in the chip tray (an actual after-fill total amount).

In the case where a cabinet is provided in the game table or the chip tray is double, that is, there is a place to store chips other than the chip tray at the game table, the table computer 151 calculates the total amount of gaming chips 70 at the whole game table in which such storage place is also added to the chip tray (but not including the gaming chips of the player placed in the bet area) as the actual after-fill total amount.

The chip management computer 100 compares the theoretical after-fill total amount and the actual after-fill total amount, and emit an alert when both of them two do not match with each other. By this configuration, it is possible to confirm whether the gaming chips 70 are correctly increased in the amount at the game table by the fill.

Moreover, the chip IDs of all gaming chips 70 which exit the F/C bank room 13 are grasped in the F/C bank room 13, and the chip IDs of all gaming chips 70 which are moved from the F/C bank room 13 are detected in the game table, and so, when the theoretical after-fill total amount and the actual after-fill total amount does not match with each other, it is possible to grasp the chip ID of the gaming chip 70 that causes the discrepancy. The chip management computer 100 changes the status of the gaming chip 70 that cause the discrepancy to "Invalid," "Not cashable," "Not playable," or the like In the above, the theoretical after-fill total amount and the actual after-fill total amount are compared, but in addition to or instead of the amount of gaming chips 70 (total amount), the number (total number) may be used to compare the theoretical total number of gaming chips 70 after the fill in the game table (a theoretical after-fill total number) and the actual total number of gaming chips 70 after the fill in the game table (an actual after-fill total number) with each other to judge whether or not the fill is completed without excess or deficiency.

When the gaming chips 70 that excesses at the game table are carried from the game table to the F/C bank room 13 (the credit), the chip IDs of the gaming chips 70 that are carried towards the F/C bank room 13 are read at the payout table chip reader 1532, and those chip IDs are reported to the chip management computer 100 from the table computer 151. The chip management computer 100 refers to the chip management database 101 to calculate the total amount of gaming chips 70 reported (a credit total amount).

The chip management computer 100 refers to the chip management database 101 to extract the gaming chips 70 at the game table before the credit to calculate the total amount (an existing total amount). Then, the chip management computer 100 calculates the theoretical total amount of gaming chips 70 at the game table after the credit (a theoretical after-credit total amount) by subtracting the credit total amount from the calculated existing total amount.

At the game table, when the gaming chips 70 are carried toward the F/C bank room 13, the chip IDs of the gaming chips 70 stored at the game table are read by the chip tray chip reader 154 at the game table and reported to the chip management computer 100 by the table computer 151. The chip management computer 100 refers to the chip management database 101 to obtain the face values for the reported gaming chips 70 to calculate the actual total amount of gaming chips 70 in the chip tray (an actual after-credit total amount).

In the case where the cabinet is provided in the game table or the chip tray is double, that is, there is a place to store the chips other than the chip tray in the game table, the table computer 151 calculates the total amount of gaming chips 70 in the whole game table in which such storage place is also added to the chip tray (but not including the gaming chips placed in the bet area) as the an actual after-credit total amount.

The chip management computer 100 compares the theoretical after-credit total amount and the actual after-credit total amount to emit an alert when both of them do not match with each other. By this configuration, it is possible to confirm whether the gaming chips 70 are correctly decreased at the game table by the credit.

The chip IDs of all the gaming chips 70 that are carried from the game table to the F/C bank room 13 are grasped at the game table, and the chip IDs of all the gaming chips 70 that are moved from the game table are detected at the F/C bank room 13, and so, when the theoretical after-credit total amount and the actual after-credit total amount do not match with each other, it is possible to grasp the chip ID of the gaming chip 70 that causes the discrepancy. The chip management computer 100 changes the status of the gaming chip 70 that causes the discrepancy to "Invalid," "Not cashable," "Not playable," or the like In the above, the theoretical after-credit total amount and the actual after-credit total amount are compared, but in addition to or instead of the amount of gaming chips 70 (total amount) and using the number (total number), the theoretical total number of gaming chips 70 after the credit at the game table (theoretical after-credit total number) and the actual total number of gaming chips 70 after the credit at the game table (actual after-credit total number) may be compared to judge whether the credit is completed without excess or deficiency.

In the above, the gaming chips 70 that are carried to the F/C bank room 13 are read by the payout table chip reader 1532 to grasp the credit total amount, and calculate the theoretical after-credit total number by subtracting the credit total amount from the existing total amount (the total amount of gaming chips 70 in the game table before performing the credit), the following may be instead. In the case where the chip management computer 100 emits the notice encouraging the credit to the game table, and the game table performs the credit in response to the notice, the theoretical after-credit total amount may be calculated by making the total amount or total number of gaming chips 70 related to the credit specified in the notice (any of which may be specified for each face value) as the credit total amount and subtracting this credit total amount from the existing total amount. Once the chip management computer 100 calculates the theoretical credit total amount, it compares this theoretical after-credit total amount and the actual after-credit total amount (the actual total amount of gaming chips 70 after the credit at the game table) in the same manner as above to confirm whether or not the specified amount or number of gaming chips 70 exited the game table for the credit.

In the cage 10, a door is locked to prevent a person from arbitrary entering, and the staff can enter and exit the room by meeting a security term. The same entering/exiting room security is also performed between the rooms in the cage 10, respectively. The staff working in the cage 10 are required to an authentication when entering or exiting the cage 10 or the room of a staff's post. When authenticating that the staff exits, the chip management computer 100 verifies whether there is no inappropriate movement of gaming chip 70 since the staff entered the room until then. The chip management computer 100 is conjunction with a locking system, and do not allow the staff to exit the room where there is an inappropriate movement of the gaming chip 70.

In the same manner at the game table, when the dealer leaves the game table, the dealer makes the ID card read by the table card reader 152 after designating the end of the shift. At this time, the chip management computer 100 verifies whether there is no inappropriate movement of gaming chip 70 since the dealer arrived at the game table until then, and emit an alert when there is an inappropriate movement. In addition, in a change of the dealers, the chip management computer 100 verifies that there is indeed gaming chip 70 which should be at the game table after the dealer leaved the table and before the next dealer takes over the table, that is, the dealer leaving the table brought out the gaming chip 70 from the game table, and emits an alert when there is a problem.

The gaming chips 70 may be stored in a location other than the chip tray at the game table. For example, the chip tray may be double and the gaming chip 70 for supplying may be stored in the lower chip tray, and the gaming chip 70 for supplying may be stored in the cabinet provided at the game table. In these cases, the game table also includes an antenna configured to read the RFID tag 71 of the gaming chip 70 so stored, and it is desired that the table computer 151 can always read the RFID tags 71 of all gaming chips 70 in the game table.

In this function, the chip management computer 100 verifies the history of purchase and cashing of the gaming chips for each player, and emits an alert when there is a suspicious action. For example, when there is a purchase of gaming chips 70 above a predetermined amount and a cashing of gaming chips 70 above a predetermined amount within a predetermined time period, an alert is emitted as such action is a suspicious action. Also, when the gaming chips 70 are about to be cashed without being used at the game table after the gaming chips 70 was purchased, and the amount is greater than a predetermined amount, an alert is emitted as such action is a suspicious action. Alternatively, an alert is emitted for a player who purchase the gaming chips 70 whose amount is equal to or more than a predetermined amount within a predetermined time period as such action is a suspicious action.

The gaming chip 70 may be validated within the cage 10. Thereby, when the gaming chips 70 are stolen after manufactured and until carried into the cage 10, such gaming chip 70 cannot be used since they are not validated, and security is ensured. For this purpose, the chip management database 101 includes a table that stores the chip ID of the valid gaming chip 70, and the chip management computer 100 refers to the table to verify whether or not the chip ID is valid at each time at which the chip ID of the gaming chip 70 is read by the chip reader of the cashier or the game table.

Also, when disposing of the gaming chip 70, invalidation is performed inside the cage 10, and then, the gaming chip 70 is brought out outside the cage 10. Thereby, even when the gaming chip 70 brought out outside the cage 10 for the disposal is stolen, since such gaming chip 70 cannot be used at the cashier or the game table, security is ensured.

Even unregistered player can purchase the gaming chip 70 and play the game at the game table using the gaming chip 70. For the unregistered player, a common anonymous player ID is used. Thereby, even when the gaming chip 70 moves to the unregistered player during passing through each location from exiting the cage 10 to returning to the cage 10, it is possible to uninterruptedly trace the gaming chip 70.

A display device may be provided in the window of the cashier, which is configured to show the total amount of gaming chips 70 and the confirmation result of the validation. The cashier staff places the gaming chip 70 to be given to or received from the player on the cashier chip reader 143. The cashier chip reader 143 reads the face values and the statuses stored on the RFID tags 71 of the gaming chips 70 (which are usually multiple). The cashier computer 141 displays the sum amount of face values read by the cashier chip reader 143 on the display device. In addition to the sum amount, how many the number of gaming chips 70 of each face value is may be displayed.

The cashier computer 141 displays an error on the display device when there is a gaming chip 70 whose status is invalid in the read RFID tags 71, and displays a pass or nothing on the display device when the statuses of all gaming chips 70 are valid. In addition to the status, it may be displayed whether there is no inappropriate movement history until then. Thereby, it is possible to give and receive the gaming chips upon agreeing with that the gaming chips to be given to or received from the player are valid and the total amount of gaming chips 70 thereof between the cashier staff and the player.

In the above embodiment, when the RFID tag 71 of the gaming chip 70 is read by the chip reader at each location, the chip management computer 100 may verify that the read chip ID is that of the valid chip to confirm the validity of the chip ID, and emit an alert when there is a problem. For this purpose, the table of the valid chip IDs is recorded in the chip management database 101, and the chip management computer 100 refers to this table to verify whether the chip ID read at each location is valid. The chip ID may be encrypted.

In the above embodiment, in addition to or instead of emitting the alert, the chip management computer 100 may set a flag indicating an abnormality in a relevant player, gaming chip 70, or movement history record, and record that time.

The configuration of the rooms in the cage 10 is not limited to those described above, and the number of rooms and room arrangements may be arbitrary. The game table may be a table for performing baccarat, blackjack, or other card games, and may include locations for performing other games such as roulette and the like in addition to the game table.

Each of the above computers includes a processor and memory, and the processor performs the above operations by executing computer programs stored in the memory. The program may be provided to the computers by means of a non-transient storage medium or may be provided to the computers in the form of a download. Communication between the computers may be wired or wireless. In the above embodiment, the staff and the players are identified at each location by reading the ID cards with each card reader, but instead of the ID cards, the staff and the players may be identified by biometric identification such as fingerprints, face images, iris, voice prints or the like In the above embodiment, it is explained to manage the movement between the locations taking each room in the cage 10 and the game table as examples of the locations, but the examples of the locations are not limited to these, for example, the chip tray where the dealer accommodates the collection chip in and pays out the payout chips from at the game table, the cabinet in which the gaming chips are stored at the table, and the respective upper and lower chip trays in the case where the chip tray is formed of two stages may be the location in the above embodiments respectively, and the same management as above can be performed for the movement of the gaming chips 70 between the respective locations.

For example, when chip IDs, the total amount, and/or the total number of gaming chips 70 removed from the cabinet of a certain game table are grasped, and the chip IDs, the total amount, and/or the total number thereof are not moved to the chip tray of the same game table within a predetermined time, an alert may be emitted. For example, in a certain double chip tray, it may be to confirm that the gaming chips 70 removed from the lower chip tray is moved to the upper chip tray, or the gaming chips 70 removed from the upper chip tray is moved to the lower chip tray.

When the fill is performed, the gaming chips 70 carried from the F/C bank room 13 to the game table are read using the dealer antenna 513, the bet area antenna 515, or the chip tray antenna 514. A button by which the start and the end of the fill operation is recognized are provided at the chip tray, and the gaming chips 70 in the chip tray before the fill and the gaming chips 70 in the chip tray after the fill are compared to recognize the gaming chips 70 increased by the fill as filled gaming chips 70.

When the credit is performed, the gaming chips 70 to be carried to the F/C bank room 13 are read by the dealer antenna 5131, the payout dealer antenna 5132, the bet area antenna 515, or the chip tray antenna 514. A button by which the start and the end of the credit operation can be recognized is provided in the chip tray, and the gaming chips 70 in the chip tray before the credit and the gaming chips 70 in the chip tray after the credit are compared to recognize the gaming chips 70 reduced by the credit as the gaming chips 70 to be credited.

The chip management computer 100 may be capable of outputting a chip stock (chip IDs) for each location (the cage, the chip tray or the like). The chip management computer 100 may be capable of specifying a past point of time and outputting the stock at that point of time.

It may also to emit an alert when a suspicious gaming chip (a flagged gaming chip) is about to be cashed at the cashier.

The chip management database 101 may also be capable of storing a cashing history of each player. The chip management computer 100 may also be capable of outputting the chip ID which should be possessed by in the player.

Information such as a chip set, casino information, location information, cashing-ability or the like may be written in the RFID tag 71. Alternatively, such information may be associated with the chip ID and stored in the chip management database 101. When the gaming chip 70 is read at a certain location, the chip management computer 100 or the computer at each location may inspect whether it is the gaming chip 70 which should be at that location based on that information.

The set of gaming chips 70 (chip set) and a type of gaming chip which are usable may be set in each area. For example, when RFID tags 71 is read at a certain game table, the table computer 151 or the chip management computer 100 inspects whether those are the chip set which should be used at that game table.

The gaming chip 70 for which a certain number of years are passed since the start of use may be flagged in association with the chip ID. It is possible to identify its location and collect it for the gaming chips 70 for which a certain number of years are passed since the start of use. When a player possesses the gaming chip 70 for which a certain number of years are passed since the start of use, a signal is output when the chip ID is detected at the cashier or the game table.

When a player that possesses a gaming chip 70 which there is a possibility that was stolen, the table computer 151 or the chip management computer may emit a warning to the staff (supervisor). The cashier computer 141 or the chip management computer 100 detects a chip that is cashed without being played after purchase in order to prevent money laundering.

In the cashier, when cashing or chip purchase whose amount is above the threshold, a photo of the player is associated with the chip ID. The anonymous player (the player who does not possess the member card) are also given a unique ID to trace the chip. For the anonymous player, it may be to image the face thereof at a time of chip purchase, and link the player ID with the face image to register those in the chip management database 101, and identify the player ID through facial recognition at each location (the table, the cashier or the like) after then. The chip management computer 100 may make all statuses of the chips associated with blacklisted player invalid.

When a player who does not possess the member card bets the gaming chip 70 at the game table, the chip management computer 100 records the play in the chip management database 101, linking it to the unique ID issued on the spot and/or the player ID associated with the gaming chip 70. At this time, the face image or the ID based on facial recognition may be linked with the play. When the member card is recognized later, the play record may be retroactively recoded linking with the member card ID.

Figure 11:
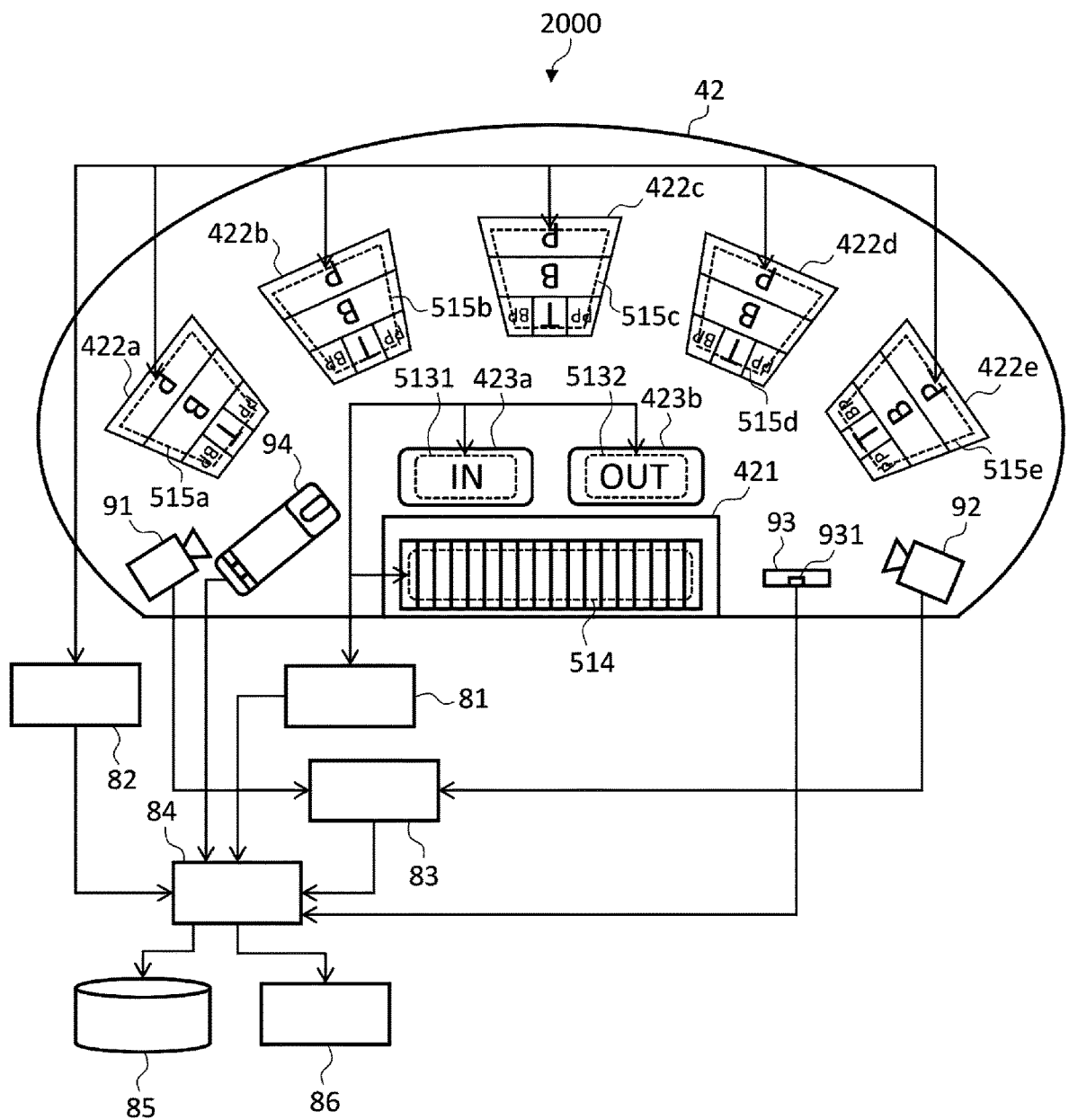
FIG. 11 is a view showing a configuration of a management system according to the second embodiment of the present invention.

FIG. 11 is a view showing a configuration of a management system according to the second embodiment of the present invention. A management system 2000 is a system configured to manage a gaming chip 70 at a game table 42 for performing a game using the gaming chip 70 including a built-in RFID tag 71. The game table 42 includes a chip tray 421 configured to accommodate the gaming chip of a dealer, a bet area 422a-422e on which the gaming chip to be bet in the game is to be placed, a collection area 423a and a payout area 423b different from the bet area 422a-422e and the chip tray 421. The collection area 423a and the payout area 423b are both located between the bet areas 422a-422e and the chip tray 421.

A collection dealer antenna 5131 is embedded in the collection area 423a, which is configured to read in the collection area 423a the RFID tag 71 of the gaming chip 70 to be collected due to losing in the game. A payout dealer antenna 5132 is embedded in the payout area 423b, which is configured to read in the payout area 423b the RFID tag 71 of the gaming chip 70 to be paid out to the player who wins the game. The dealer antenna 5131 reads the RFID tag 71 of the gaming chip 70 before collected from the bet areas 422a-422e to be placed in the chip tray 421. The payout dealer antenna 5132 reads the RFID tag 71 of the gaming chip 70 before removed from the chip tray 421 to be paid out into the bet areas 422a-422e.

A chip tray antenna 514 is provided in the chip tray 421, which is configured to reads the RFID tag 71 of the gaming chip 70 accommodated in the chip tray 421. The collection dealer antenna 5131, the payout dealer antenna 5132, and the chip tray antenna 514 are connected to a first reading device 81, respectively.

The first reading device 81 controls the collection dealer antenna 5131, the payout dealer antenna 5132, and the chip tray antenna 514, respectively, to transmit a radio wave to the RFID tag 71 and decode a signal received by each antenna to obtain information of the RFID tag 71. In the present embodiment, since the collection dealer antenna 5131, the payout dealer antenna 5132, and the chip tray antenna 514 are connected to the same first reading device 81, the first reading device 81 controls with time-sharing the collection dealer antenna 5131, the payout dealer antenna 5132, and the chip tray antenna 514, respectively, to perform the reading.

The collection dealer antenna 5131, the payout dealer antenna 5132, and the chip tray antenna 514 may be connected to different reading devices, respectively. In this case, the readings at the collection dealer antenna 5131, the payout dealer antenna 5132, and the chip tray antenna 514 may be independently performed, and each antenna can read at any arbitrary timing.

Bet area antennas 515a-515e are embedded in the bet areas 422a-422e, respectively. The bet area antennas 515a-515e read the RFID tag 71 of the gaming chip 70 placed in the bet areas 422a-422e, respectively. The bet area antennas 515a-515e are connected to a second reading device 82, respectively.

Camera 91, 92 are installed in the game table 42. The cameras 91 and 92 images the gaming chip 70 placed on the bet areas 422a-422e from different angles, respectively, to generate images. The cameras 91, 92 image a table surface of the game table 42 from diagonally above. The cameras 91, 92 also image the player participating in the game, respectively. The cameras 91, 92 are connected to an image recognizing device 83, respectively.

The image recognizing device 83 performs image recognition processing on the images generated by the cameras 91 and 92 to recognize the position, type, and number of gaming chips 70 placed in the bet areas 422a-422e. The image recognizing device 83 further performs image recognition processing on the images generated by the cameras 91 and 92 to generate a skeletal model of the player participating in the game. The image recognizing device 83 for recognizing the gaming chip 70 and the image recognizing device 83 configured to generate the skeletal model of the player may be different devices. The camera configured to generate the image for recognizing the gaming chip 70 and the camera configured to generate the skeletal model of the player may be different cameras.

An electronic shoe 94 as a card distribution device and a game result judging device is provided in the game table 42. The electronic shoe 94 includes a mechanism by which playing cards are drawn out one by one by an operation of the dealer. The electronic shoe 94 reads a rank of the playing card being drawn. For this purpose, the playing card is marked with a code mark indicating this rank, and an optical sensor is provided in the electronic shoe 94, which is configured to read this code mark. Alternatively, the electronic shoe 94 may include a camera configured to image the rank mark on the playing card being drawn to generate an image, and an image recognizing device configured to perform image recognition on this image to recognize the rank mark.

A processor is provided in the electronic shoe 94, which is configured to judge a game result according to rules of baccarat game based on the rank of the playing card being drawn. A button for the dealer to operate is provided in the electronic shoe 94. The baccarat game judges the game result, that is, player win, banker win, tie, player pair, banker pair, lucky six or the like based solely on the ranks of the playing cards drawn in turn from the electronic shoe 94. The electronic shoe 94 recognizes to a button operation to recognize the start or the end of the game, and recognizes the ranks of the playing cards drawn in one game and an order of the drawing.

A cash insert port 93 is further provided in the game table 42, into which cash is inserted. A cash sensor 931 is provided in the cash insert port 93, which is configured to detect the cash passing therethrough. When the player purchases the gaming chips 70 at the game table 42, the dealer receives the cash from the player and puts it into the cash insert port 93, and pays out the same amount of gaming chips to the player from the chip tray 421.

The management system 2000 further comprises a management device 84. The management device 84 is connected to the first reading device 81, the second reading device 82, the image recognizing device 83, and the electronic shoe 94. The management device 84 obtains the reading result of the RFID tag 71 of the gaming chip 70 in the first reading device 81 and the second reading device 82, the image recognition result in the image recognizing device 83, and the game result in the electronic shoe 94, and manage movement of the gaming chip 70 in the game table 42 based on these results.

The management device 84 judges whether the gaming chip 70 which should be collected from the bet areas 422a-422e is collected from the bet areas 422a-422e and read by the collection dealer antenna 5131, as a collection judging unit. Specifically, the management device 84 judges whether the amount of gaming chips 70 read by the collection dealer antenna 5131 matches the amount which should be collected. The management device 84 judges the amount which should be collected based on a bet target and a bet amount, and the game result.

For this purpose, the management system 2000 recognizes the bet target and the bet amount. The bet target and the bet amount are recognized using the cameras 91, 92 and the image recognizing device 83. The image recognizing device 83 judges the bet target and the bet amount of the gaming chip 70 bet on the bet areas 422a-422e, as a bet judging unit. A player (P), a banker (B), a tie (T), a player pair (PP), and a banker pair (BP) are provided in the bet area 422a-422e for each player position, as the bet targets.

Figure 12:
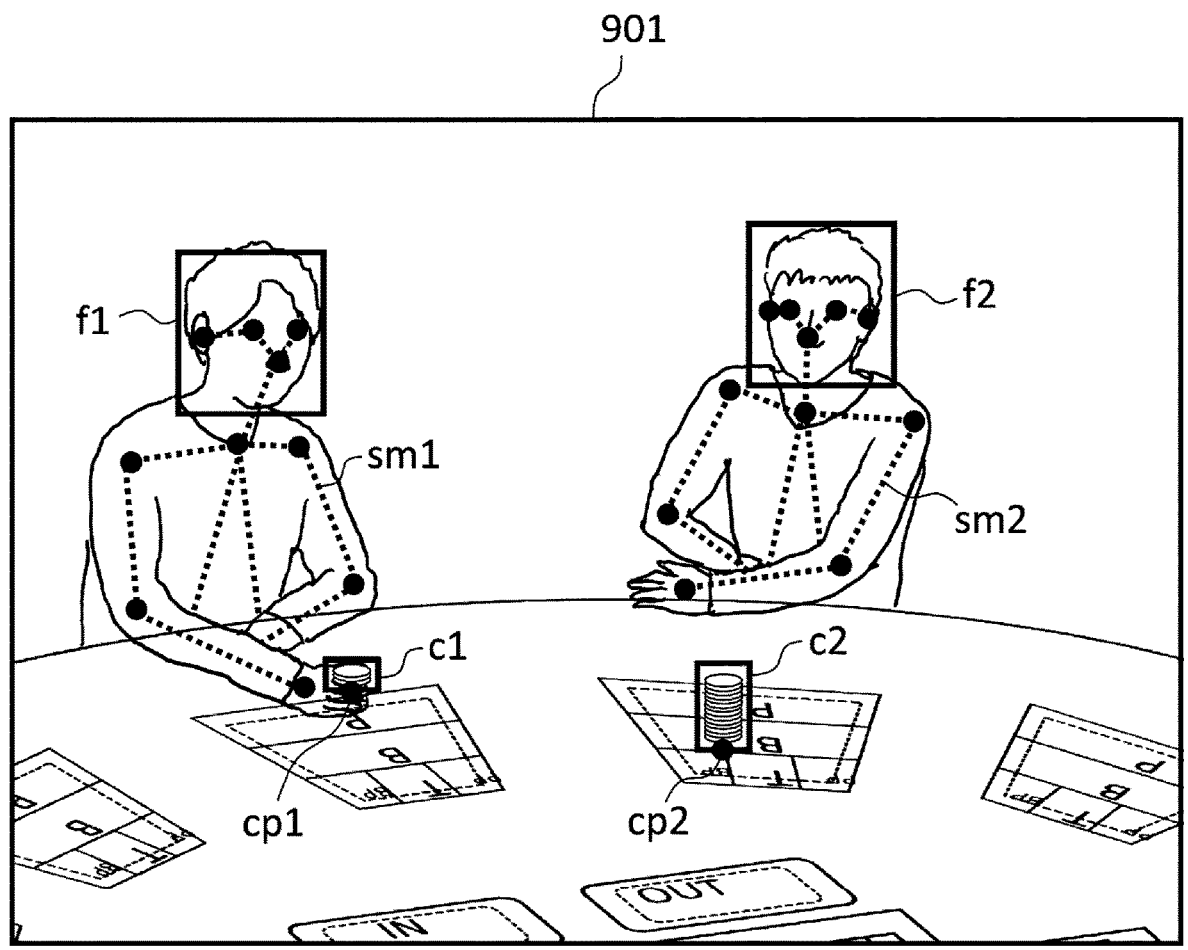
FIG. 12 is a view explaining image recognition in an image imaged by a camera according to the second embodiment of the present invention.

FIG. 12 is a view explaining image recognition in an image imaged by a camera according to the second embodiment of the present invention. The example in FIG. 12 is an image imaged by the camera 91. Bet areas, gaming chips placed in the bet areas, and players are shown in the image 901. The image recognizing device 83 performs an image recognition processing for detecting the gaming chips on the image 901 to detect the gaming chips from the image 901. A neural network can be used for this image recognition processing. The detected stacks of gaming chips are enclosed by rectangular frames c1 and c2.

The image recognizing device 83 further performs skeletal detection to generate skeletal models sm1, sm2 of the players. The image recognizing device 83 further performs face detection of the players to extract face regions f1, f2. Neural networks can also be used for these skeletal detection and face detection, respectively.

The image recognizing device 83 recognizes a position on which the stack of gaming chips is placed, that is, the bet target on which the stack of gaming chips is bet based on a position of the center cp1, cp2 of the bottom edge of the rectangular frame c1, c2 of the detected stack of gaming chips in the image. As shown in FIG. 12, since the gaming chip that is being held with the hand and moved by the player is also recognized, the image recognition system 83 may receive from the electronic shoe 94 a signal indicating that the first playing card of the game is drawn and detect the gaming chip from the image at that time. At the timing at which the first playing card is drawn, the player is not permitted from touching the betting gaming chip, and the position of the gaming chip is fixed. It may be to perform segmentation to identify a region of the stack of gaming chips as the image recognition processing, and in this case, the image recognizing device 83 may recognize the bet target on which the stack of gaming chips is bet based on the position of the lowest point of the identified region of the stack of gaming chips in the image.

The image recognizing device 83 may further recognize a type of each gaming chip forming the stack by image recognition. As shown in FIG. 12, since a colored layer indicating a face value (the type) is provided on the side surface of the gaming chip 70, it is possible to further detect this colored layer from the detected rectangular frame c1, c2 of the stack to recognize the type and the number of gaming chips 70 included in the stack.

Moreover, the type and the number of gaming chips in each bet area 422a-422e may be recognized by the bet area antennas 515a-515e and the second reading device 82. That is, the position of the gaming chip bet on the bet area 422a-422e (bet target) may be recognized by the camera 91, 92 and the image recognizing device 83, the type and the number may be recognized by the bet area antennas 515a-515e and the second reading device 82.

In the case where the chip ID is marked on the side surface of the gaming chip 70, the chip ID may be recognized by recognizing the image generated by the camera 91, 92 with the image recognizing device 83.

Figure 13A:
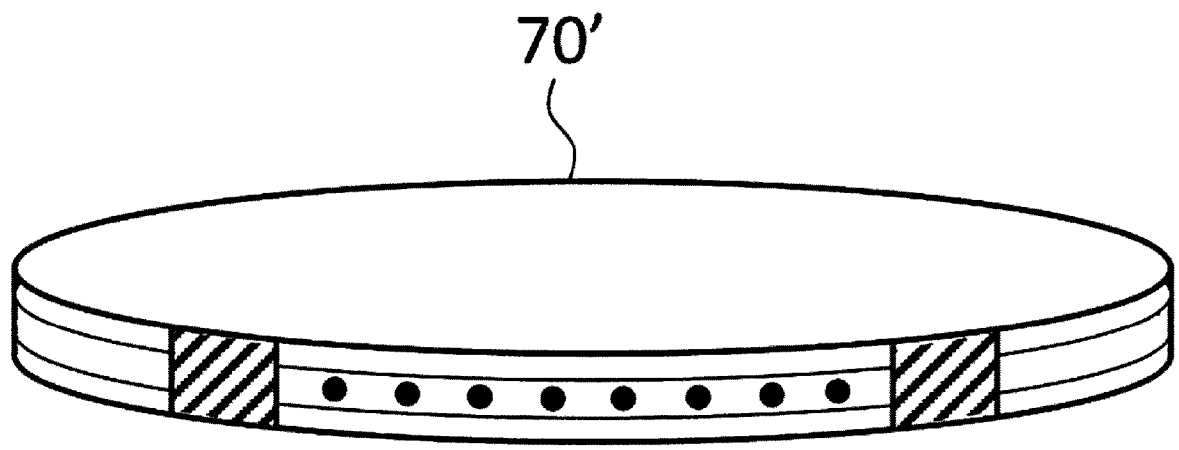
FIG. 13A is a view showing another example of the gaming chip according to the second embodiment of the present invention.
Figure 13B:
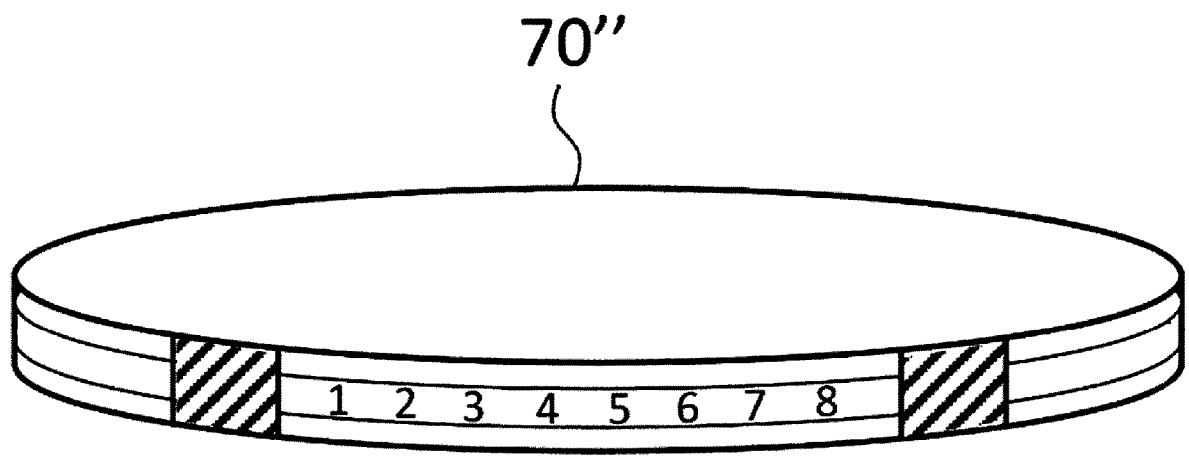
FIG. 13B is a view showing further another example of the gaming chip according to the second embodiment of the present invention.

FIG. 13A is a view showing another example of the gaming chip according to the second embodiment of the present invention, and FIG. 13B is a view showing further another example of the gaming chip according to the second embodiment of the present invention. As shown in FIGS. 13a and 13b, in the gaming chip 70', 70", a side ID as identification information is marked on the side surface. In the example shown in FIG. 13A, the side ID is expressed by presence or absence of a plurality of dots (dot pattern). In this example, since the side ID is expressed by presence or absence of dots in a dot row composed of eight dots, information of the eighth power of 2 pattern can be expressed. In the example shown in FIG. 13B, the side ID is expressed by a sequence of numbers. In this example, since the side ID is expressed by an 8-digit number, information of the eighth power of 10 can be expressed. The side ID may also be expressed as a matrix pattern, a bar code, or a sequence of characters. The side ID is represented within ⅙ or less range of the side surface of the gaming chip in the circumferential direction. A plurality of side IDs is marked on the side surface of the gaming chip apart from at a predetermined interval in the circumferential direction.

The side ID may be a unique ID uniquely identifying each gaming chip, or it may be information indicating a group to which each gaming chip belongs (e.g., value), that is, information capable of overlapping with the other gaming chip. In particular, when the side ID is expressed as the sequence of numbers, the side ID may be a unique ID, and when the side ID is expressed as the dot pattern (sequence of dots), the side ID may be information of the belonging group.

The side surface of the gaming chip 70', 70" is divided into three layers in the thickness direction. In the present embodiment, a first layer and a third layer are a color which is different depending on the value of the gaming chip, and a center second layer (centerline) is a color which is common to the gaming chips of any value, regardless of the values of the gaming chip (e.g., black). The side ID can be marked by printing or laser engraving.

The RFID tag is built in the gaming chip 70', 70." At least the unique ID uniquely identifying the gaming chip and the information of the group to which the gaming chip belongs (e.g., value) are recorded in the RFID tag. In the present embodiment, the unique ID stored in the RFID tag and the unique ID expressed as the side ID are the same ID, but they may be different IDs from each other, and these two IDs given to the same gaming chip may be associated with each other in the database.

A capsule is built in the gaming chip 70', 70," and the RFID tag is accommodated in the capsule. A decal is stuck to the outside of the capsule, in which information of the value of the gaming chip and information of the casino in which it to be used are marked. The capsule is printed with a unique ID uniquely identifying the gaming chip. The unique ID printed on the capsule may be the same as or different from the unique ID stored in the RFID tag. When the unique ID printed on the capsule and the unique ID stored in the RFID tag are different, they may be associated and stored in the database. The unique ID may be printed on the surface of the chip under the decal. The unique ID may be printed on the surface of the chip by an invisible ink such as UV ink, infrared absorbing ink and the like.

Figure 14:
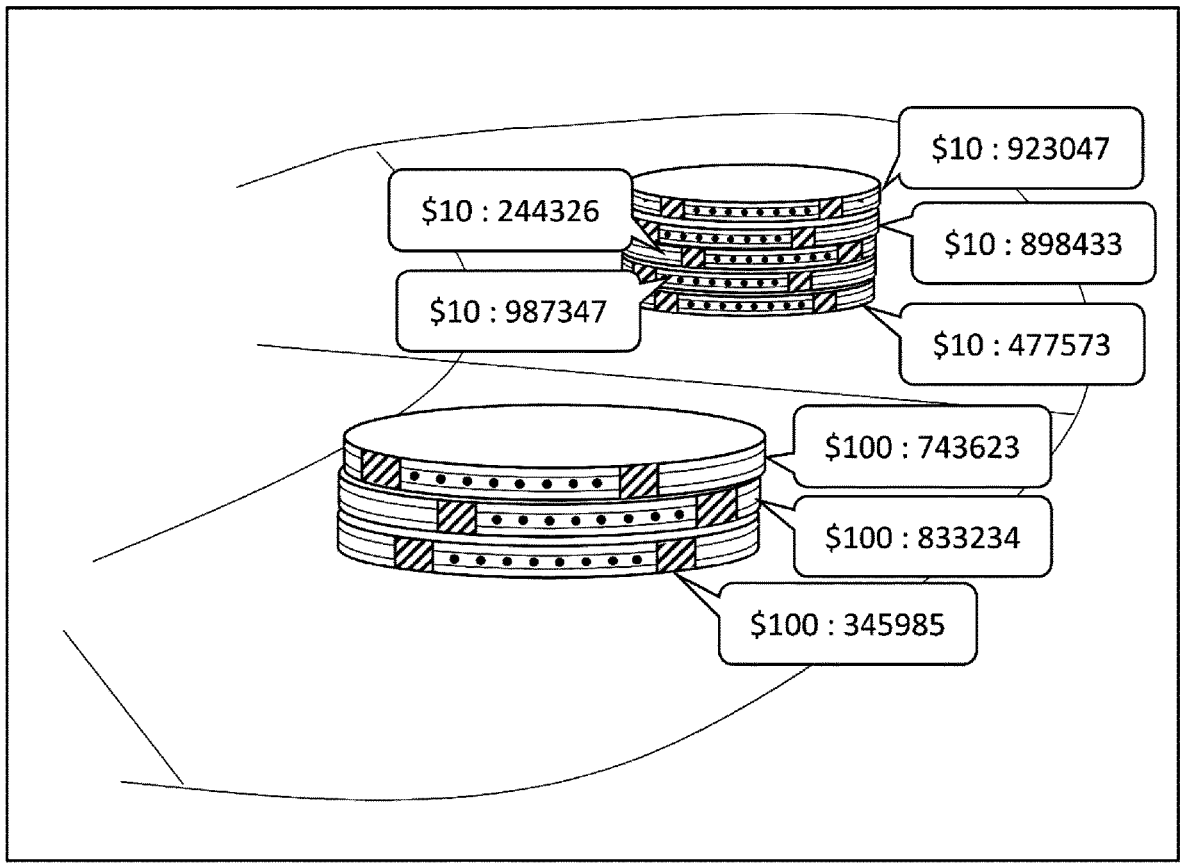
FIG. 14 is a view showing an example of an image imaged by the camera according to the second embodiment of the present invention.

FIG. 14 is a view showing an example of an image imaged by the camera according to the second embodiment of the present invention. The example in FIG. 14 shows the plurality of stacks of gaming chips placed in the plurality of bet areas. The side surfaces of the chips can be observed in the image of the camera 91, 92.

The image recognizing device 83 receives images generated at the camera 91 and camera 92, and performs image recognition on them to recognize at least the location, the type, and the side ID information of each of the plurality of gaming chips. The image recognizing device 83 performs image recognition at least partially using a neural network image recognition engine.

Since the stack of gaming chips is in the random location in the image captured by the camera 91, 92, the image recognizing device 83 first extracts the stack of gaming chips (or the single gaming chip) from the imaged image using a neural network. The image recognizing device 83 extracts the colored layer (centerline) of each of the plurality gaming chips from the extracted portion of the stack using another neural network.

The image recognizing device 83 further judges the value of each gaming chip based on the color above and below the extracted centerline. The image recognizing device 83 further reads the side ID from the centerline portion and, in the case of FIG. 13A, obtains the side ID information by decoding the dot pattern, and in the case of FIG. 13B, obtains the side ID information by decrypting the numbers.

FIG. 15 is a table showing an example of data stored in a database according to the second embodiment of the present invention. As shown in FIG. 15, information on the face value (type), an owner, and a status for each chip ID represented by the side ID is stored in the database 85. The face value is, for example, $10, $50, $100, $500 or the like. When the gaming chip 70 is possessed by the player, the player ID is stored as the information of the owner, and when owned by the casino, information that the owner is the casino is stored. Information such as valid, invalid, suspicious or the like is stored as the status.

The management device 84 can know the face value, the owner, and the status of each gaming chip 70 by referring to the database 85 based on the side ID (that is, chip ID) recognized by the image recognizing device 83.

The management device 84 calculates the total amount of gaming chips bet on each bet target, that is, the bet amount based on the values and the number of gaming chips recognized as described above. In the above embodiment, the management device 84 calculates the amount of gaming chips bet on each bet target using the cameras 91, 92 and the image recognizing device 83, or recognizes the position of the gaming chips 70 using the cameras 91, 92 and the image recognizing device 83 and recognize the bet amount of each bet area 422a-422e using the bet area antennas 515a-515e and the second reading device 82, but alternatively, the location, the type, and the number of gaming chips 70 can be recognized using the bet area antennas 515a-515e and the second reading device 82.

That is, in the case where the different antennas are provided for the bet targets in the bet areas 422a-422e, respectively, and the RFID tags 71 of gaming chips 70 can be read distinctly for each bet target, the location, the type, and the number of chips can be recognized not using the cameras 91, 92 and the image recognizing device 83. In this case, the management device 84 also recognizes the bet target and the bet amount in each bet area 422a-422e based on the position, the type and the number obtained from the second reading device 82.

The management device 84 judges whether the stack of gaming chips 70 bet on each bet area 422a-422e win or lost in the game based on the information of the bet target and the bet amount recognized as described above and the information of the game result obtained from the electronic shoe 94, and judges that the stack should be collected for the losing stack of gaming chips 70 is, and determine the amount of gaming chips 70 to be paid out based on a payout rate defined for that bet target for the winning stack of gaming chips 70.

When the game result is decided, the dealer first collects the losing gaming chip (that is, losing bet) from each player. At this time, the stack of gaming chips 70 collected from one player (the losing bet stack) is placed in the collection area 423*a* and read by the collection dealer antenna 5131. The stack of gaming chips 70 is then accommodated in the chip tray 421. Another losing stack of gaming chips 70 (losing bet stack) is then collected and placed in the collection area 423*a*, read by the collection dealer antenna 5131, and accommodated in the chip tray 421. This is done for all losing stacks of gaming chips 70 (losing bet stacks). At this time, the dealer collects the losing gaming chips 70 in order of the player positions (e.g., in order of smaller player position numbers).

At this time, the management device 84 functions as a collection judging method and judges whether or not the amount and the chip IDs of the gaming chips 70 read by the collection dealer antenna 5131 in the collection area 423*a* for each bet lost in the game matches the amount and the chip IDs of the losing bet stack bet in any of the bet areas 422*a*-422*e*. The management device 84 makes the amount of gaming chips 70 which should be collected and determined based on the bet target, the bet amount, and the game result as described above the amount of losing bet stack. Alternatively, the management device 84 may make the amount of gaming chips 70 that are no longer read from the bet areas 422*a*-422*e* the amount and the chips ID of the losing bet stack, and judge whether the amount and the chips ID matches the amount and chip IDs read in the collection area 423*a*.

Once the collections of all losing bet stacks is completed, the management device 84 judges whether the increased amount of gaming chips 70 in chip tray 421 read using the chip tray antenna 514 matches the total amount and the chip IDs of the losing bet stacks, that is, the total amount and the chip IDs of the amount which should be collected. The management device 84 also judges whether the increased amount and the added chip IDs of gaming chips 70 in chip tray 421 read using the chip tray antenna 514 match the total amount and the chip IDs for all collections of the amount of gaming chips and the chip IDs read by the collection dealer antenna 5131 in the collection area 423*a* at each time of collecting losing bet stack. For this purpose, the management device 84 obtains the total amount and the chip IDs of gaming chips 70 in the chip tray 421 read by the chip tray antenna 514 before starting the collection, and obtains again the total amount and the chip IDs of gaming chips 70 in the chip tray 421 read by the chip tray antenna 514 after all collections are completed, and determines the difference between them to calculate the increased amount and the added chip IDs.

The collection operation by the dealer may not be the manner in which each stack is read at the collection area 423*a* and accommodated in the chip tray 421 as described above. For example, each stack may be moved to the collection area 423*a* in turn, and after all losing bet stacks are collected in the collection area 423*a*, they may be accommodated in the chip tray 421. In this case, the management device 84 may obtain added information as information of newly collected gaming chips 70 based on information read by the collection dealer antenna 5131 at each time at which a gaming chip 70 which is to be newly collected is added to the collection area 423*a*.

When there is a plurality of losing bet stacks, since the order of collection is known as described above, the total amount and the chip IDs of stack of gaming chips which should be read at the collection area 423*a* at each time at which the losing bet stack is collected is also known to the management device 84. The management device 84 compares this known total amount and chip IDs of gaming chips 70 which should be collected (read by the collection dealer antenna 5131) and the total amount and the chip IDs of gaming chips 70 actually read by the collection dealer antenna 5131 to judge whether the collection is correctly performed. The management device 84 judges whether the collection was correctly performed. When the collection was not correctly performed, the management device 84 outputs or records the player position or information of the player of the bet stack related to such illicit collection.

Once the collection is finished, the dealer pays out for the winning gaming chips 70. At this time, the dealer places the stack of gaming chips 70 to be paid out from the chip tray 421 in the payout area 423*b* and read it with the payout dealer antenna 5132, and then place the gaming chips 70 to be paid out next to the wining gaming chips, that is, in the bet area 422*a*-422*e*. The player who wins the game receives the gaming chips 70 placed in the bet areas 422*a*-422*e* as such, together with the gaming chips 70 bet by own.

At this time, the management device 84 functions as a payout judging unit and judges whether or not the amount of gaming chips 70 which should be paid out is read by the payout dealer antenna 5132 for each bet wining in the game. The management device 84 makes the bet amount of the winning gaming chips and the payout amount calculated from the payout rate defined for the bet target the amount to be paid out, and judges whether this amount and the amount of gaming chips 70 read by the payout dealer antenna 5132 in payout area 423*b* match with each other. In the payout, when there is a plurality of winning bet stacks, the dealer also pays out the gaming chips 70 in order of the player positions (e.g., in order of smaller player position numbers). Therefore, for management device 84, the total amount of stack of gaming chips 70 to be paid out, that is, to be read by the payout dealer antenna 5132 is known. Therefore, the management device 84 compares this known total amount and the total amount of gaming chips 70 actually read by the payout dealer antenna 5132 and when there is a discrepancy, identify and output or record the player position or the player related to the discrepancy, at each time at which the stack of gaming chips 70 to be paid out is read by the payout dealer antenna 5132.

The management device 84 may further judge whether the amount of gaming chips added to the bet areas 422*a*-422*e* and the amount of gaming chips 70 read by the payout dealer antenna 5132 at payout area 423*b* match with each other. By this judgement, it is possible to confirm that the gaming chips 70 placed in the payout area 423*b* are paid to the correct player position.

Once the payouts to all winning bet stacks are completed, the management device 84 judges whether the reduced amount of gaming chips 70 in chip tray 421 read using the chip tray antenna 514 matches with the total amount to be paid out. The management device 84 also judges that the reduced amount of gaming chips in chip tray 421 read using the chip tray antenna 514 matches with the total amount for all payouts of the amount of gaming chips 70 read by the payout dealer antenna 5132 in the payout area 423*b* for each payout on the winning bet stack. For this purpose, the management device 84 obtains the total amount of gaming chips 70 in the chip tray 421 read by the chip tray antenna 514 after the completion of all collections and before starting the payouts, and again obtains the total amount of gaming chips 70 in the chip tray 421 read by the chip tray antenna 514 after all payouts are completed, and determines the difference between them to calculate the decrease amount.

In the above embodiment, it is judged that the increase amount in the chip tray 421 is correct when all collections are completed, and it is judged that the decrease amount in chip tray is correct when all payouts is completed, but alternatively, it is judged that the increase or decrease amount of gaming chips in the chip tray 421 due to all collections and payouts is correct after all collections and payouts are complete. In this case, the management device 84 may also judge whether the increase or decrease amount calculated from the bet target, the bet amount, and the game result and the actual increase or decrease amount in the chip tray 421 match with each other, or add or subtract the total amount of gaming chips 70 read by the collection dealer antenna 5131 in the collection area 423a and the total amount of gaming chips 70 read by the payout dealer antenna 5132 in the payout area 423b to determine the increase or decrease amount, and judge whether the increase or decrease amount thus obtained and the actual increase or decrease amount in the chip tray 421 match with each other.

As described above, during the collection, the management device 84 identifies the gaming chips 70 to be collected based on the bet target, the bet amount, and the game result, and judges whether the amount and/or the chip ID of gaming chips 70 read by the collection dealer antenna 5131 in the collection area 423A are the amount and the chip IDs to be collected. During the collection, the management device 84 also judges whether the amount and/or the chip IDs of gaming chips 70 which are no longer read by the bet area antenna 515a-515e in the bet area 422a matches with the amount and/or the chip IDs of gaming chips 70 read by the collection dealer antenna 5131 in the collection area 423a. In addition, during the collection, the management device 84 judges whether the amount and/or the chip IDs of gaming chips 70 read by the collection dealer antenna 5131 in the collection area 423a matches with the amount and/or the chip IDs of gaming chips 70 added to the chip tray 421.

Moreover, for the payout, the management device 84 identifies the amount of gaming chips 70 to be paid out based on the bet target, the bet amount and the game result, and judges whether the amount of gaming chips 70 read by the payout dealer antenna 5132 in the payout area 423b matches with the amount which should be paid out. During the payout, the management device 84 also judges whether or not the decreased amount and/or the chip IDs of gaming chips 70 which are paid out from the chip tray 421 matches with the amount and/or the chip IDs of gaming chips 70 read by the payout dealer antenna 5132. Furthermore, during the payout, the management device 84 judges whether or not the amount and/or the chip IDs of gaming chips 70 read by the payout dealer antenna 5132 in the payout area 423b matches with the amount and/or the chip IDs of gaming chips 70 added to the bet area 422a-422e and read by the bet area antenna 515a-515e.

The management device 84 judges whether an exchange, that is, an equivalent exchange between the gaming chips offered by the player and the gaming chips offered by the dealer is performed correctly. For this purpose, when the exchange is performed, the management device 84 recognizes that an exchange transaction is performed.

The exchange transaction is stated when the player places own gaming chip 70 for which the player requests the exchange in the collection area 423a, and informs the dealer of the intention of exchanging it. The dealer places in the payout area 423b the gaming chips 70 which are equivalent to (but different in the face value (type) from) the gaming chips offered by the player and placed in the collection area 423a. That is, in the exchange transaction, the gaming chips 70 offered by the player are in the collection area 423a, while the gaming chips 70 offered by the dealer are in the payout area 423b.

The management device 84 judges that the exchange transaction is performed and activates an exchange mode when the collection dealer antenna 5131 in the collection area 423a and the payout dealer antenna 5132 in the payout area 423b detect the gaming chips 70 simultaneously or simultaneously within a predetermined time interval. In the exchange mode, when judging that the exchange transaction is performed, the management device 84 compares the total amount of gaming chips 70 read in the collection area 423A and the total amount of gaming chips 70 read in the payout area 423B, and judges that the exchange is performed correctly by judging whether the two are equal.

In the exchange mode, the management device 84 may judge whether the number of gaming chips 70 read in the collection area 423a and the number of gaming chips 70 read in the payout area 423b are different from each other, and so activates the exchange mode or judges whether the exchange is performed correctly. The management device 84 may also refer to the database 85 for the gaming chips 70 read at the collection area 423a to identify the owner of the gaming chips 70 and confirm that it is one of the player IDs, and refer to the database 85 for the gaming chips 70 read in the payout area 423B to identify its owner and confirm that it is the casino, and so activate the exchange mode or judges that the exchange is performed correctly.

In the above embodiment, the area on which the gaming chips 70 offered by the player should be placed during the exchange is the collection area 423a, and the area where the gaming chips 70 offered by the dealer should be placed is the payout area 423b, but the operation of the exchange is not limited to this. For example, the area where the gaming chips 70 offered by the player should be placed may be the payout area 423b, and the area where the gaming chips 70 offered by the dealer should be placed may be the collection area 423a. Alternatively, when the gaming chips 70 offered by the player are placed in the collection area 423a, the gaming chips 70 offered by the dealer are to be placed in the payout area 423b, and when the gaming chips 70 offered by the player are placed in the payout area 423b, the gaming chips 70 offered by the dealer may be placed in the collection area 423a. That is, without fixing the location where the gaming chips 70 offered by the player and the gaming chips 70 offered by the dealer should be placed, one may be placed in one of the collection area 423a and the payout area 423b, and the other may be placed in the other of the collection area 423a and the payout area 423b.

In this case, the management device 84 may also activate the exchange mode when detecting that the gaming chips 70 are present in the collection area 423a and the payout area 423b at the same time. Alternatively, it may be to activate the exchange mode or judge that the exchange is performed correctly when comparing the total amount of gaming chips 70 placed in the collection area 423a and the total amount of gaming chips 70 placed in the payout area 423b and the two are equal, and/or comparing the number of gaming chips 70 placed in the collection area 423*a* and the number of gaming chips 70 placed in the payout area 423*b* and the two are equal.

In the exchange mode, the management device 84 compares the total amount of gaming chips 70 placed in the collection area 423*a* and the total amount of gaming chips 70 placed in the payout area 423*b*, and controls the alert device 86 to output an alert when the two do not match. The management device 84 also judges whether the owner of the gaming chips 70 read in one of the collection area 423*a* and the payout area 423*b* is any of the player IDs and the owner of the gaming chips 70 read in the other of the collection area 423*a* or the payout area 423*b* is the casino, and when not so, for example, the owners of both of the gaming chips 70 are the casino or the owners of both of the gaming chips 70 are any player ID, controls the alert device 86 to output an alert. In this case, the alert device 86 alerts in particular that the exchange is not between the player and the casino.

The alert device 86 may include an audio output device and output the alert by sound, includes a lamp and output the alert by lighting the lamp, or includes a display device and output the alert by a display screen.

In the above embodiment, the management device 84 activates the exchange mode when detecting that the gaming chips 70 are present in the collection area 423A and the payout area 423B at the same time, but the management device 84 may activate the exchange mode when detecting that the gaming chip 70 that were in the chip tray 421 and the gaming chip 70 that were not in the chip tray 421 are placed in the collection area 423A and the payout area 423B. The management device may also activate the exchange mode when detecting that the gaming chip 70 whose owner is a player and the gaming chip 70 whose owner is not a player are placed in the collection area 423*a* and the payout area 423*b*.

When the gaming chips 70 stocked in the chip tray 421 of the game table 42 become low, the gaming chips 70 are supplied in the chip tray 421 from the outside of the game table 42 (fill transaction). When the gaming chips 70 stocked in the chip tray 421 of the game table 42 become excessive, the gaming chips 70 are moved from the chip tray 421 to the outside of the game table (credit transaction).

In the fill transaction, as in the first embodiment, the chip IDs of all gaming chips 70 exiting the F/C bank room 13 are grasped in the F/C bank room 13, and the chip IDs of all gaming chips 70 moving from the F/C bank room 13 are detected in the game table 42. Thereby, the theoretical chip IDs and the total amounts of all gaming chips 70 to be filled and the chip IDs and the total amounts of all gaming chips 70 actually filled are compared with each other.

The dealer reads the RFID tags 71 of the gaming chips 70 to be filled and moved from the F/C bank room 13 to the game table 42 with the collection dealer antenna 5131 in the collection area 423*a*, and then stores in the chip tray 421. The dealer reads the RFID tags 71 of the gaming chips 70 accommodated in the chip tray 421 after the fill with the chip tray antenna 514 of the chip tray 421.

The management device 84 obtains the chip IDs and the total amount of all gaming chips 70 exiting the F/C bank room 13 and compares these and the chip IDs and the total amount of gaming chips 70 read by the collection dealer antenna 5131. In the fill transaction, the management device 84 also compares the chip IDs and the total amount of the RFID tags 71 of the gaming chips 70 placed in the collection area 423*a* and read by the collection dealer antenna 5131 and the chip IDs and the total amount of gaming chips 70 newly added to the chip tray 421 by accommodating those gaming chips 70 in the chip tray 421.

When judging that there is a discrepancy in any of these comparisons, the management device 84 controls the alert device 86 to output an alert. In this case, the alert device 86 in particular alerts in particular that the fill transaction is not performed correctly.

In the credit transaction, as in the first embodiment, the chip IDs of all gaming chips 70 entering the F/C bank room 13 are grasped in the F/C bank room 13, and the chip IDs of all gaming chips 70 which moves into the F/C bank room 13 are detected in the game table 42. Thereby, the theoretical chip IDs and the total amount of all gaming chips 70 to be credited and the chip IDs and the total amount of all gaming chips 70 that are actually credited are compares.

The management device 84 obtains the chip IDs and the total amount of all gaming chips 70 entering the F/C bank room 13, and compares these and the chip IDs and the total amount of gaming chips 70 read by the payout dealer antenna 5132. In the credit transaction, the management device 84 also compares the chip IDs and the total amount of the RFID tags 71 of the gaming chips 70 placed in the payout area 423*b* and read by the payout dealer antenna 5132 and the chip IDs and the total amount of gaming chips 70 decreased from the chip tray 421 by removing those gaming chips 70 from the chip tray 421.

When judging that there is a discrepancy in any of these comparisons, the management device 84 controls the alert device 86 to output an alert. In this case, the alert device 86 alerts in particular that the credit transaction is not performed correctly.

These fill transaction and credit transaction may only be performed when the game is not being played. In this case, the management device 84 recognizes an inter-game period during which the fill transaction and the credit transaction can be performed as a period after the game result is decided and all settlements are completed and before a first playing card for a next game is drawn from the electronic shoe 94. When the RFID tag 71 of the gaming chip 70 is read during this inter-game period at the collection dealer antenna 5131 in the collection area 423A during this period, and the above conditions for the exchange are not met and below conditions for a chip buy-in are not met, the management device 84 recognize that it is the fill transaction, and activate a fill mode. Similarly, when the RFID tag 71 of the gaming chip 70 is read by the payout dealer antenna 5132 in the payout area 423*b* during the inter-game period, and the above conditions for the exchange are not met and below conditions for a chip buy-in are not met, the management device 84 recognize that it is the credit transaction, and activates a credit mode.

In the fill transaction and the credit transaction, the amount of gaming chips 70 to be filled or credited may be designated to the management device 84 by manually inputting the amount by the operator. In this case, the management device 84 judges whether the total amount of gaming chips 70 read at the collection area 423A or the payout area 423B is the designated amount.

The player can purchase the gaming chip 70 at the cashier as described in the first embodiment, and also purchase the gaming chip 70 from the dealer at the game table 42. The dealer receives cash from the player and puts it into the cash insert port 93, and then hands the player the gaming chips 70 equivalent to the cash. At this time, the dealer places the gaming chips 70 to be paid out to the player in the payout area 423*b*, and the payout dealer antenna 5132 reads the RFID tags 71 on these gaming chips 70.

A cash sensor 931 is provided at the cash insert port 93, and when detecting the cash, notifies the management device 84 of this. The management device 84 receives the notice of the cash detection from the cash sensor 931 to activate a chip buy-in mode.

In the chip buy-in mode, the management device 84 judges the chip IDs and the total amount of gaming chips 70 read by the payout dealer antenna 5132. Management device 84 further compares the chip IDs and the total amount of gaming chips 70 removed from the chip tray 421 by this chip buy-in and the chip IDs and the total amount of gaming chips 70 read by the payout dealer antenna 5132, and when there is a discrepancy, controls the alert device 86 to output an alert.

The cash sensor 931 only detects the presence of cash in the cash insert port 93, but instead of this cash sensor 931, may have a function of judging a money type (amount) and authenticity of the cash. In this case, the management device 84 may judge whether the total amount of cash detected by this cash sensor 931 matches with the total amount of gaming chips 70 placed in the payout area 423*b*, and when there is a discrepancy, control the alert device 86 to output an alert. The cash offered by the player in the chip buy-in may be recognized by the cameras 91 and 92 and the image recognizing device 83. In this case, the management device 84 may also compare the total amount of this recognized cash and the total amount of gaming chips 70 read at the payout area 423*b* to judge whether the chip buy-in is correctly performed.

During the chip buy-in, the cash may be placed in the collection area 423A, and the cash placed in the collection area 423A may be imaged by the cameras 91 and 92, and the amount of this cash may be recognized by the image recognizing device 83. In this case, the management device 84 may compare the amount of cash recognized by the image recognizing device 83 and the total amount of gaming chips 70 paid out in the payout area 423B and read by the payout dealer antenna 5132 to judge whether the chip buy-in is correctly performed.

In the above second embodiment, the collection area 423*a* and the payout area 423*b* are provided next to each other, and these collection area and payout area 423*a* and 423*b* are located between the chip tray 421 and the bet areas 422*a*-422*e*. Depending on a relationship between the distance between these areas and strengths of electromagnetic waves output from the antennas in those areas, there is a possibility that each antenna may read the RFID tag 71 of the gaming chip 70 in the area other than its corresponding area. For example, the dealer antenna 5131 may read the RFID tag 71 of the gaming chip 70 placed in the payout area 423*b*, or the payout dealer antenna 5132 may read the RFID tag 71 of the gaming chip 70 placed in the collection area 423*a*.

In order to prevent such interference or false reading between the areas, a jamming antenna may be provided in each area, which blocks or deforms the electromagnetic waves from the antennas in the other areas. Alternatively, a shielding material may be provided between the areas, respectively, which blocks the electromagnetic waves from the other areas. The reading may be performed with the reading timing being staggered between the adjacent areas. Even though the jamming antenna and the shielding member are not provided, the above plurality of antennas may be provided apart from at an interval that do not cause the interference or the false readings.

In the above second embodiment, the first reader 81 reads using the chip tray antenna 514, the collection dealer antenna 5131, and the payout dealer antenna 5132, and the second reading device 82 reads using the plurality of bet areas 422*a*-422*e*, but the combinations of the antenna and the reader are not limited to this. For example, a reading device may be provided for each antenna, and all antennas may be controlled by a single reading device.

In particular, when the collection dealer antenna 5131 and the payout dealer antenna 5132 are controlled by the same reading device, the reading device may use alternately the collection dealer antenna 5131 and the payout dealer antenna 5132 to perform alternately the readings of the collection area 423A and the payout area 423B. When the collection dealer antenna 5131 and the payout dealer antenna 5132 are controlled by the different reading devices, each reader may use the collection dealer antenna 5131 and the payout dealer antenna 5132 at independent timings to perform the readings of the collection area 423*a* and the payout area 423*b* at independent timings, respectively.

In the above embodiments, the gaming chips 70 are placed in the collection area 423A and the payout area 423B, and the collection dealer antenna 5131 and the payout dealer antenna 5132 read the RFID tags 71 of the gaming chips 70 placed in the collection area 423A and the payout area 423B, but the collection dealer antenna 5131 and the payout dealer antenna 5132 may also read the RFID tags 71 of the gaming chips 70 passing through the collection area 423*a* and the payout area 423*b*. In this case, for example, the dealer may position the gaming chips 70 to be removed from the chip tray 421 and paid out to players in the payout area 423*b* while holding them in the hand, make the payout dealer antenna 5132 read them, and move them directly to the bet area 422*a*-422*e*. For example, the dealer may also position the gaming chips 70 to be collected from the bet area 422*a*-422*e* in the collection area 423*a* while holding them in the hand, make the collection dealer antenna 5131 read them, and move them directly to the chip tray 421.

In the above embodiments, the management device 84 automatically recognize that the exchange, the fill transaction, the credit transaction, or the chip buy-in is performed, but alternatively, the management device 84 may receive an operational input from an operator (e.g., receive an operation to a switch or a button) and recognize that the money exchange or the like are performed in accordance with this.

The present embodiment relates to a system configured to detect an illicit action in a game at a game park, or an error or an illicit action when betting or settling the gaming chip. The third embodiment can be used in combination with the second embodiment.

An illicitness detecting system according to the present embodiment is an illicitness detecting system in a game park including a plurality of game tables, including: a game recording device configured to record a state of a game performed at the game table as an image by a camera; an image analyzing device configured to perform an image analysis on the recorded image of the state of the game; a win/loss result judging device configured to judge a win/loss result of each game performed at the game table; and a control device configured to detect an illicit action at the game table using an image analysis result by the image analyzing device and the win/loss result judged by the win/loss result judging device, wherein the control device is configured to grasp positions, types, and a number of chips wagered by each player through the image analyzing device, grasp a total amount of chips in a chip tray of a dealer at the game table, add/subtract an increase/decrease amount of chips in the game calculated from the positions, the types, and the number of chips wagered by all players in the game and the win/loss result of the game obtained by the win/loss result judging device to/from a total amount of chips in the chip tray before a settlement of each game, compare a total amount of chips which should be in the chip tray after the settlement at an end of the game and an actual total amount of chips in the chip tray at the end of the game obtained through the image analyzing device, and judge whether or not there is a difference between the total amount which should be and the actual total amount.

In the above illicitness detecting system, the control device may be configured to grasp the positions, the types and the number of chips wagered by each player through the image analyzing device, grasp an actual total amount of chips in the chip tray when a collection of all losing chips wagered by each player is finished, compare a total amount of chips which should be in the chip tray by adding an increase amount in the chip tray for the game based on the positions, the types and the number of chips wagered by a losing player to the actual total amount of chips in the chip tray before the settlement of each game and the actual total amount of chips in the chip tray, and judge whether or not there is a difference between the total amount which should be and the actual total amount.

In the above illicitness detecting system, the control device may be configured to judge a payment error to generate a payment error signal to inform of the payment error when comparing the total amount of chips which should be in the chip tray by adding the increase amount in the chip tray for the game based on the positions, the types and the number of chips wagered by the losing player to the actual total amount of chips in the chip tray before the settlement of each game and the actual total amount of chips in the chip tray to judge that there is no difference between the total amount which should be and the actual total amount, and comparing the total amount of chips which should be in the chip tray after the settlement at the end of the game and the actual total amount of chips in the chip tray at the end of the game obtained through the image analyzing device to judge that there is the difference between the total amount which should be and the actual total amount.

In the above illicitness detecting system, a collection chip tray configured to collect and temporarily store the chips wagered by the losing player may be provided in the chip tray, and the image analyzing device and the control device may compare an amount of chips which should be in the collection chip tray calculated from the positions, the types and the number of chips wagered by the losing players and an actual total amount of chips in the collection chip tray, and judge whether or not there is a difference between the total amount which should be in the collection tray and the actual total amount.

In the above illicitness detecting system, obtaining the actual total amount of chips in the chip tray after the settlement at the end of the game through the image analyzing device may be at any of the following timings: 1) when payout for winning chips is finished; 2) when cards used in the game are collected and disposed of in a disposal area of the table; 3) when a certain button attached to the win/loss result judging device is pushed; and 4) when a marker indicating a win/ross is restored to its original position.

In the above illicitness detecting system, it may have a configuration wherein, when the control device judges a difference that the actual total amount of chips grasped in the chip tray of the dealer of the game table does not correspond to the increase/decrease amount of chips calculated from amounts of chips wagered by all players and the win/lose result of the game, the game recording device is configured to give an index or a time to an obtained image, or identify and play a collection scene or a payment scene of chips so that a record of the game where the difference occurred can be analyzed by the game recording device.

In the above illicitness detecting system, the image analyzing device or the control device may have a configuration capable of obtaining information of the types, the number and the locations of chips wagered even when a plurality of chips placed on the game table is partially or entirely hidden by a blind spot of the camera.

In the above illicitness detecting system, the control device may have a configuration capable of the following: 1) grasping the positions, the types, and the number of chips wagered at each playing position on the game table, and comparing a win/loss history of each player and a gained amount of chips from the win/loss result of each game with statistical data of past games to extract it as a peculiar situation, or 2) extracting a situation in which an amount of chips wagered when losing is less than an amount of chips wagered when winning at a playing position of the game table as a peculiar situation in comparison with statistical data of past games.

In the above illicitness detecting system, the control device may be capable of comparing and judging whether or not the amount of chips grasped in the chip tray of the dealer at the game table increases or decreases in accordance with a payment amount of chips corresponding to exchanged bills or a payment amount of bills corresponding to exchanged chips after exchange between the chips and the bills are performed.

In the above illicitness detecting system, the control device may further include a database configured to keep a history of the exchanges between the bills and the chips, and may refer to the database at a regular time interval or on a daily basis to compare and judge whether or not the amount of chips grasped in the chip tray of the dealer at the game table increases or decreases in accordance with the payment amount of chips corresponding to the exchanged bills or the payment amount of bills corresponding to the exchanged chips after the exchange between the chips and the bills are performed.

In the above illicitness detecting system, the control device may be capable of identifying a player of the difference or in the playing position extracted as the peculiar situation through the image analyzing device.

In the above illicitness detecting system, the control device may have an alert function of informing other game table of the presence of the identified player when the identified player leaves a seat and arrives at the other game table.

In the above illicitness detecting system, the control device may further have a function judging at least one of the following: 1) in each game, whether there is a chip movement during after a card draw is started or a game start operation is performed by the dealer before the win/loss result of the game is displayed by a card distribution device displays; 2) at the end of each game, whether a loser takes any chip while the dealer is collecting the chips wagered by the loser among game participants; 3) at the end of each game, whether an addition of the chips is performed while the dealer is collecting the chips wagered by the losers among the game participants; 4) at the end of each game, whether the dealer paid to a position of the chips wagered by winner among the game participants; and 5) at the end of each game, whether the winner among the game participants takes the wagered chips and paid chips.

In the above illicitness detecting system, the win/loss result judging device may be the card distributing device configured to distribute cards at the game table, or a control device configured to judge the win/loss result of each game based on information from the image analyzing device configured to read the cards distributed at the game table with the camera.

By the illicitness detecting system according to the present embodiment, it is possible to detect an illicitness in a collection and a payment of chips according to a win/loss result of the game.

By the system according to the present embodiment, even when a card is bent due to squeezing by a player, which is often done in baccarat and other games, a rank and a suit of the card can be judged by image analysis, and a total amount of chips in a blind spot or overlapping can also be judged together with their positions. It is also possible to detect an illicitness when exchanging between bills and chips.

Figure 16:
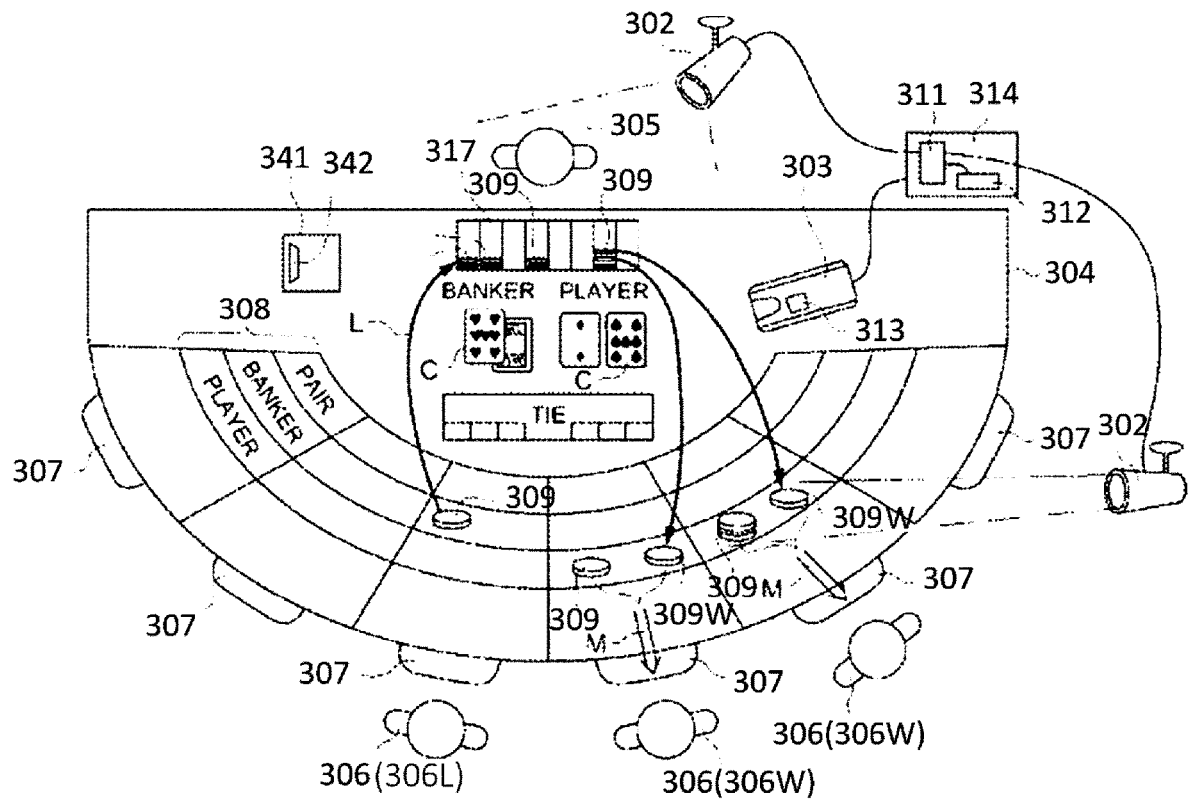
FIG. 16 is a view showing an overall outline of an illicitness detecting system in a game park including a plurality of game tables according to the third embodiment of the present invention.

The overall outline of an illicitness detecting system in a game park including a plurality of game tables is described in more detail below. FIG. 16 is a view showing the overall outline of the system, and the illicitness detecting system in the game park including the plurality of game tables 304 includes a game recording device 312 configured to record as an image a progress of a game performed on the game table 304 including a player 306 and a dealer 305 through a plurality of cameras 302, and an image analyzing device 312 configured to perform image analysis on the image of the progress situation of the game on the game table 304, and further includes a card distributing device 303 configured to judge and display a win/loss result of each game at the game table 304. The card distribution device 303 is a so-called electronic shoe, which is already used by those skilled in the art, and configured to be programmed with a game rule in advance, and read information of a distributed card C to judge the win/loss result of the game. For example, in a baccarat game, a banker's win, a player's win, and a tie (draw) are basically judged by ranks of 2-3 cards, and a judgment result (win/loss result) is displayed by a result displaying lamp 313.

The present illicitness detecting system further includes a control device 314 configured to compare actual card ranks based on an image analysis result by the image analyzing device 312 and the win/loss result judged by the card distribution device 303, and detects an illicit action performed at the game table 304 (such as a discrepancy between the sum of the ranks of the distributed cards and the win/loss result or the like). The card distribution device 303 is configured to be capable of reading the rank (A, 2-10, J, Q, K) and the suit (hearts, spades or the like) of the cards C manually distributed by the dealer 305, and the control device 314 is configured to be capable of checking information of the ranks and the suits obtained by the image analyzing device 312 (using artificial intelligence) from the image of each card distributed at the game table 304 (imaged using the camera 302) and information of the cards and the suits read by the card distribution device 303 to judge a match or a mismatch therebetween. The image analyzing device 312 and the control device 314 in the present illicitness detecting system is configured to multiply include a computer, a program, and a memory which are formed of an integrated component or a plurality of components.

Figure 18:
FIG. 18 is an enlarged view of a mark explaining a stain of a card grasped in the third embodiment of the present invention.

The image analyzing device 312 and the control device 314 includes an artificial intelligence active-using type or deep learning configuration configured to be capable of obtaining information of the card rank even when the card C was distributed at the table 304 and bent or soiled by a player 306. In the dirty card C, as shown in FIG. 18, a situation appears in which it is difficult to distinguish between club and spade. Even in such a case, it is possible to distinguish the suit by analyzing and judging the image using an artificial intelligence active-using type computer or control system, and a deep learning (configuration) technology. Even when the card is bent due to squeezing by the player, which is often done in baccarat and other games, it is possible to recognize the suit and the rank which the card includes before being bent utilizing self-learning of many variant examples of images by an artificial intelligence active-using type computer or control system, and a deep learning (configuration) technology. Since the artificial intelligence active-using type computer or control system, and the deep learning (configuration) technology are already known and available to those skilled in the art, a detailed explanation is omitted.

The control device 314 which has the artificial intelligence active-using type or deep learning configuration is capable of grasping which position in a bet area 308 (player, banker, or pair) each player 306 places chips 309, the type of chips 309 wagered (the chip 309 is assigned different value for each color) and the number of chips 309 through the camera 302 and the image analyzing device 312. The chips 309 may be stacked such that they are not aligned vertically and shifted. In this case, when the camera 302 is positioned so as to image the stacked chips from the side surface (or when the direction of the chips 309 is relatively blind spot), it is expected that the chips 309 is invisible (in a blind spot). In the artificial intelligence active-using type computer or control system, and the deep learning (configuration) technology, hiding or the like of chips 309 due to the blind spot (when a part of a single chip is hidden, or when the entire chip is hidden) are recognized, and the number of chips or the like are accurately judged using the self-learning function or the like. In this way, since it is possible to grasp which position in the bet area 308 (the player, the banker, or the pair) the chips 309 are wagered on, the type of chips 309 wagered (the chip 309 is assigned different value for each color) and the number of chips, the control device 314 is configured to judge whether a collection of losing chips wagered by each player 306 (indicated by the arrow L) and a payment to the winning player 306W for the winning chips (309W) are properly made in accordance with the win/loss result of the game judged by the card distributing device 303 in each game, by analyzing the image of the progress state of the game through the image analyzing device 312.

The control device 314 is capable of analyzing and grasping the total amount of chips 309 in a chip tray 317 of the dealer 305 in the game table 304 using the image analyzing device 312, and comparing and calculating in accordance with the win/loss result of the game whether the total amount of chips 309 in the chip tray 317 increases/decreases depending on the amount of the collection of the losing chips 309 bet by each player 306 and the payment 309W for the winning chips of the winning player 306W after the game is finished and settled. Even though the total amount of chips 309 in the chip tray 317 is always grasped by RFID or other means, the control device 314 judges whether or not the increase/decrease amount is correct by analyzing the image of the progress state of the game through the image analyzing device 312. These also utilize the artificial intelligence active-using type or deep learning configuration.

In this example, since an illicitness or a mistake is detected based on the win/less result of the game, information of which types of chips 309, which position in the bet area 308 (the player, the banker, or the pair) the chips 309, and how many chips 309 are wagered, and the increase/decrease amount of the chips 309 in the chip tray 317 after the collection of losing chips and the payment for the winning chips 309 is completed, it is possible to detect the illicitness or the mistake without grasping a movement of the chips 309 after the end of the game, that is, whether the wagered chips 309 move to the player side or move to the dealer side.

Here, for example, in the case of baccarat, the win/loss result of the game can be judged in accordance with a rule of baccarat by reading the ranks of the cards C distributed in the game at the card distribution device 303. The win/loss result of the game can also be judged by imaging the game table 304 with the camera 302, analyzing the image with the image analyzing device 312, and checking a result of the analysis and the rule of the game with the control device 314. In this case, the win/loss result judging device is formed of the camera 302, the image analyzing device 312, and the control device 314. Information of the player at each playing position 307, and which types of chips 309, which position in the bet area 308 (the player, the banker, or the pair) the chips 309, and how many chips 309 are wagered by imaging the chips 309 placed in the bet area 308 with the camera 302 and analyzing the image for each playing position 307 with the image analyzing device 312.

The increase/decrease amount of chips 309 in the chip tray 317 before and after the collection of the losing chips 309 and the payout for the winning chips 309 are performed can be calculated by comparing the total amount of chips 309 in the chip tray 317 before the collection of the losing chips 309 and the payout for the winning chips 309 are performed and the total amount of chips 309 in the chip tray 317 after the collection of the losing chips 309 and the payout for the winning chips 309 are performed. The total amount of chips 309 in the chip tray 317 before the collection of the losing chips 309 and the payout for winning chips 309 are performed and the total amount of chips 309 in the chip tray 317 after the collection of the losing chips 309 and the payout for winning chips 309 are performed can be calculated, respectively, by imaging the chip tray 317 accommodating the chips 309 with the camera 302 and analyzing the image with the image analyzing device 312. Moreover, it may be that an RFID configured to indicate the amount is embedded in the chip 309, and an RFID reader is provided in the chip tray 317, thereby detecting the total amount of chips 309 accommodated in chip trays 317.

Figure 17A:
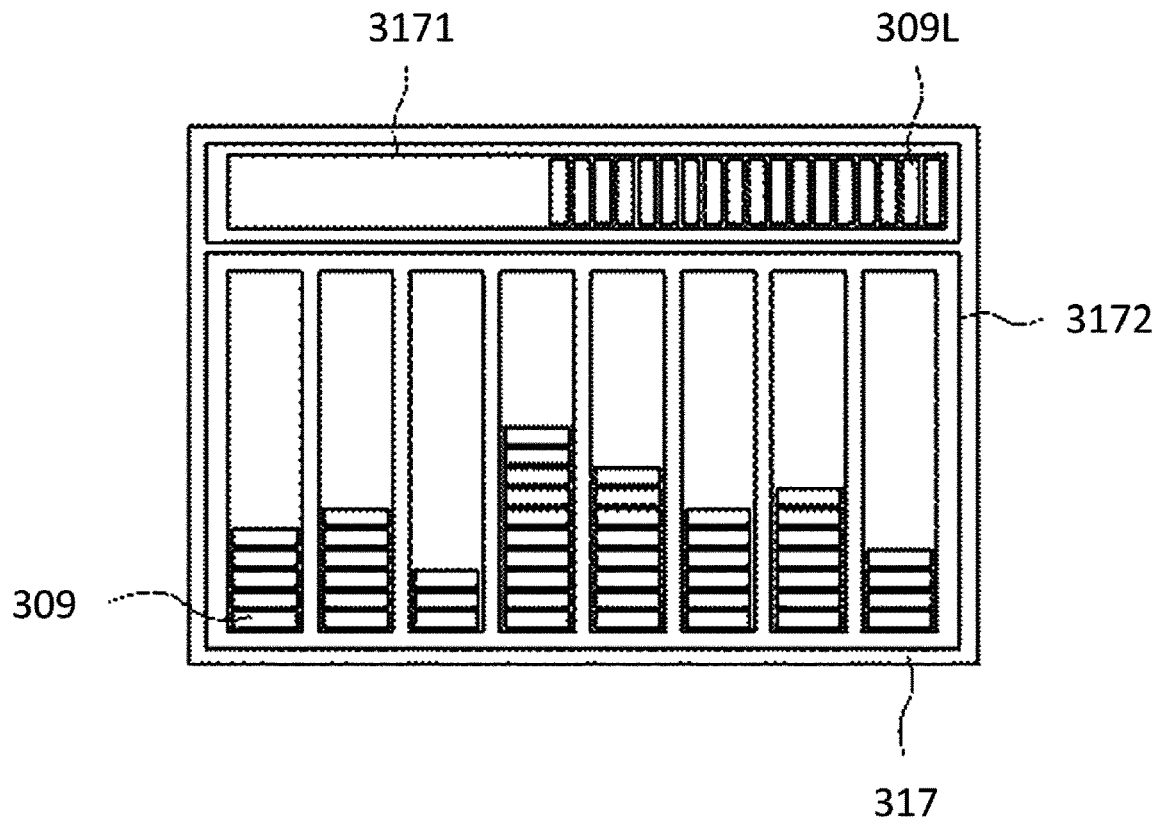
FIG. 17A is a view showing a detail of a chip tray according to the third embodiment of the present invention.
Figure 17B:
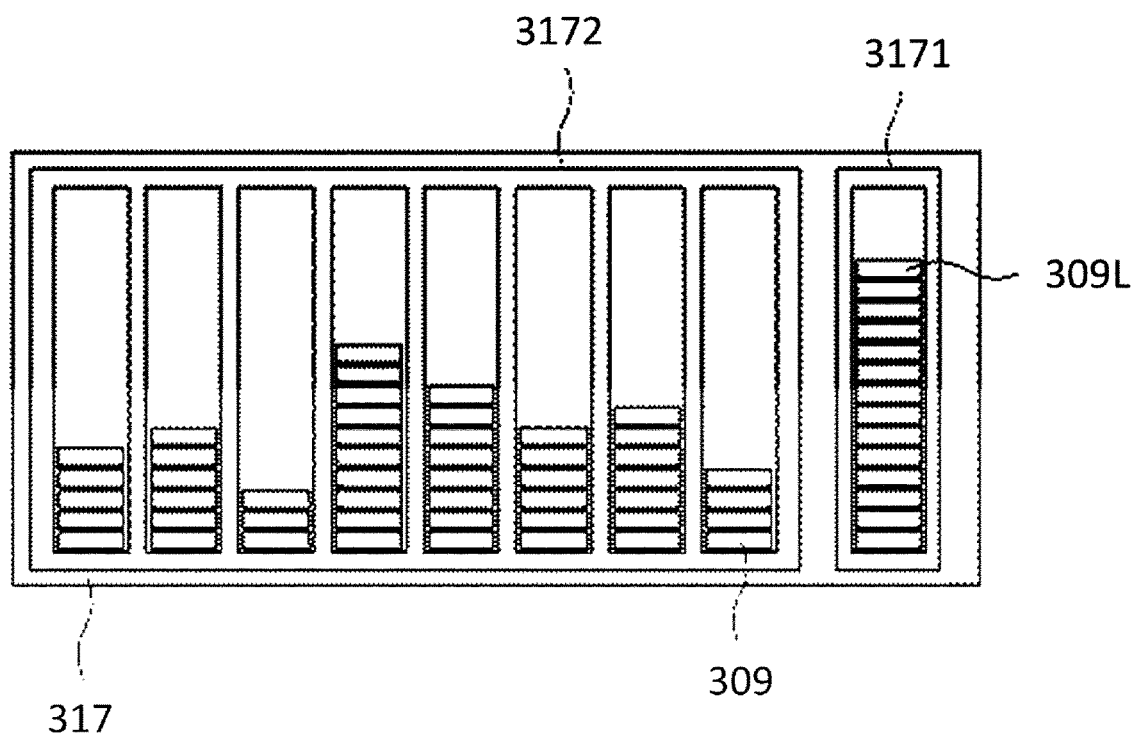
FIG. 17B is a view showing another example of the chip tray according to the third embodiment of the present invention.

FIG. 17A is a view showing a detail of a chip tray according to the present embodiment and FIG. 17B is a view showing another example. A collection chip tray 3171 configured to collect and temporarily store the chips 309L bet by the losing player 306L and a payout chip tray 3172 configured to store the chips 309W to be paid out are provided in the chip tray 317. The image analyzing device 312 and the control device 314 judge the position, the type and the number of chips 309L bet by the losing player 306L and calculate the increased amount of chips 309L in the game (the amount of chips 309 which should be in the collection chip tray 3171). Further, the image analyzing device 312 and the control device 314 grasp the actual total amount of chips 309 in the collected chip tray 3171 after the collection, and compare the total amount which should be and the actual total amount to judge whether there is a difference.

The chips 309 in the payout chip tray 3172 is used for the payout of the chips 309W to the winning player 306W, thereby ensuring a sufficient time in which the image analyzing device 312 and control device 314 grasp the actual total amount of chips 309 in the collection chip tray 3171 after collecting.

The game table 304 includes a disposal area 341 and/or a disposal slot 342 where the cards C used in the game are disposed of. At each time when the game is finished, the cards C used in the game are collected, and entered in the disposal area 341 or the disposal slot 342 on the game table 304 to be disposed of.

As described above, in the present embodiment, the control device 314 calculates balance of the chips based on the chip amount wagered on the game table 304 and the win/loss result of the game for each game, and verifies the increase in remainder of the chips in the chip tray 317 after the game. When detecting a difference in this verification, the control device 314 exits an alarm or add a record indicating it to the video record imaged by the camera 302. The casino operator can tack a cause of the difference by reviewing the video.

The illicitness detecting system according to the present invention adds/subtracts the increase/decrease amount of chips in the game calculated from the positions, the types, and the number of chips 309 wagered by all players 306 in the game and the win/loss result of the game obtained by the win/loss result judging device to/from the total amount of chips 309 in the chip tray 317 before the settlement of each game, compares the total amount of chips 309 which should be in the chip tray 317 after the settlement at the end of the game and the actual total amount of chips 309 in the chip tray 317 at the end of the game obtained through the image analyzing device 312, and judges whether or not there is the difference between the total amount which should be and the actual total amount.

The control device 314 grasps the positions, the types and the number of chips wagered by each player through the image analyzing device 312, grasp the actual total amount of chips in the chip tray when the collection of all losing chips wagered by each player is finished, compares the total amount of chips 309 which should be in the chip tray 317 by adding the increase amount in the chip tray 317 for the game based on the positions, the types and the number of chips wagered by a losing player to the actual total amount of chips in the chip tray before the settlement of each game and the actual total amount of chips 309 in the chip tray 317, and judges whether or not there is the difference between the total amount which should be and the actual total amount.

The control device 314 judges a payment error to generate a payment error signal to inform of the payment error when comparing the total amount of chips 309 which should be in the chip tray 317 by adding the increase amount in the chip tray 317 for the game based on the positions, the types and the number of chips wagered by the losing player 309 to the actual total amount of chips 309 in the chip tray 317 before the settlement of each game and the actual total amount of chips in the chip tray to judge that there is no difference between the total amount which should be and the actual total amount, and comparing the total amount of chips which should be in the chip tray 317 after the settlement at the end of the game and the actual total amount of chips 309 in the chip tray 317 at the end of the game obtained through the image analyzing device 312 to judge that there is the difference between the total amount which should be and the actual total amount.

The collection chip tray 3171 configured to collect and temporarily store the chips 309 wagered by the losing player is provided in the chip tray 317, and the image analyzing device 312 compares the amount of chips 309 which should be in the collection chip tray 3171 calculated from the positions, the types and the number of chips wagered by the losing players and the actual total amount of chips 309 in the collection chip tray 3171, and judges whether or not there is the difference between the total amount which should be and the actual total amount.

When the control device 314 judges the difference that the actual total amount of chips grasped in the chip tray 317 of the dealer 305 of the game table 304 does not correspond to the increase/decrease amount of chips calculated from amounts of chips wagered by all players and the win/lose result of the game, the game recording device 311 gives the index or the time to the obtained image, or identify and play the collection scene or the payment scene of chips so that the above record of the game where the difference occurred can be analyzed by the game recording device 311.

In this way, the control device 314 obtains the total amount of chips in the chip tray 317 after the settlement at the end of the game through the image analyzing device 312, and the post-settlement judgment in this case is at the time when one of the followings 1) to 4) occurs: 1) when the payout for the winning chips 309 is finished; 2) when the cards C used in the game are collected and disposed of in the disposal area 341 or the disposal slot 342 of the table; 3) when a certain button attached to the win/loss result judging device is pushed; and 4) when a marker indicating a win/ross is restored to its original position.

The control device 314 also is an artificial intelligence active-using type or deep learning configuration configured to grasp the position of the chips wagered at each playing position 307 on the game table 304 (the wagering position of the player the banker, or the pair bet) and the amount thereof (the type and the number of chips), compare a win/loss history of each player 306 and the obtained amount of chips (wining amount) obtained by the win/loss result of each game with statistical data of past many games (big data) to extract it as a peculiar situation (set by a casino). Typically, the control device 314 is provided, which is of an artificial intelligence active-using type or deep learning configuration configured to be capable of comparing an occurrence of a winning amount more than a certain amount (1 million dollars) or a continuation for several games of a situation in which the amount of chips wagered when losing is low and the amount of chips wagered when winning is high at a certain playing position 307 at a certain game table 304 with the statistical data of the past games (big data or the like) to extract it as the peculiar situation.

Furthermore, the control device 314 of the present illicitness detecting system is a configuration capable of extracting as the peculiar situation (integrated with the image analyzing device 312) or identify individual player 306 at the playing position 307 in which the win more than the predetermined amount occurs. Such identifying the player 306 is to obtain an image of the face by feature point extraction or the like at the image analyzing device 312, give an identity number (ID or the like) to identify. When the identified player 306 leaves the seat and arrives at the other game table, the control device 314 emits an alert function informing the other game table of the presence of the identified player. Specifically, a pit manager or a responsible person at each table (which may be the dealer) who manages each game table 304 is notified to prevent further peculiar phenomena.

The control device 314 further includes a database configured to keep a history of the exchanges between the bills and the chips 309, and may refer to the database at a regular time interval or on a daily basis to compare and judge whether or not the amount of chips 309 grasped in the chip tray 317 of the dealer 305 at the game table increases/decreases in accordance with the payment amount of chips 309 corresponding to the exchanged bills or the payment amount of bills corresponding to the exchanged chips 309.

In the above example, it may be to monitor a win/loss history and the obtained amount (won amount) of chips for each playing position 307 without identifying individual player 306. In this case, when each player 306 leaves the seat, the player 306 cannot be tracked, but it is possible to detect a peculiar situation such as a continuation for several games of a situation in which the amount of chips wagered when losing is low and the amount of chips wagered when winning is high at a particular playing position 307 at one game table 304 or the like. When such playing position 307 is detected, then it is suspected that there was an illicitness or a mistake at that playing position 307. It is possible to detect the illicitness or the mistake by verifying a video imaging that playing position 307.

Specifically, the camera 302 is installed to image at least the chips 309 placed in the bet area 308 of the game table 304. The image analyzing device 312 analyzes the image imaged by the camera 302 to detect which position of the player, the banker, and the tie of the bet area 308 the chips are placed in for each playing position 307 and the amount of chips placed. The card distribution device 303 also functions as a win/loss result judging device and judges the win/loss result of the game. The control device 314 records (monitors) the win/loss history and the obtained amount of chips (chip acquiring amount) for each playing position 307 based on the position in the bet area 308 on which the chips 309 are placed (the player, the banker, or the tie) and the win/loss result of the game. Only one of the win/loss history and the chip acquiring amount may be recorded. The control device 314 identifies this playing position 307 as a playing position in which an illicit action is suspected when this win/loss history and/or history of the chip acquiring amount is a peculiar situation (set by the casino) comparing with the statistical data of many past games (big data).

When an illicit action is suspected for a certain playing position 307, the illicitness detecting system may generate an alarm (a light, a sound or a vibration) to be perceptible to at least the dealer at that point of time. Thereby, it is possible to prevent a continuation of the illicit action by at least suspending a game after this point of time on this spot. Moreover, information indicating that an illicit action is suspected may be added to the image imaged and recorded by the camera 302. Thereby it is possible to find out a cause of the suspected illicit action by reviewing the video.

Figure 19:
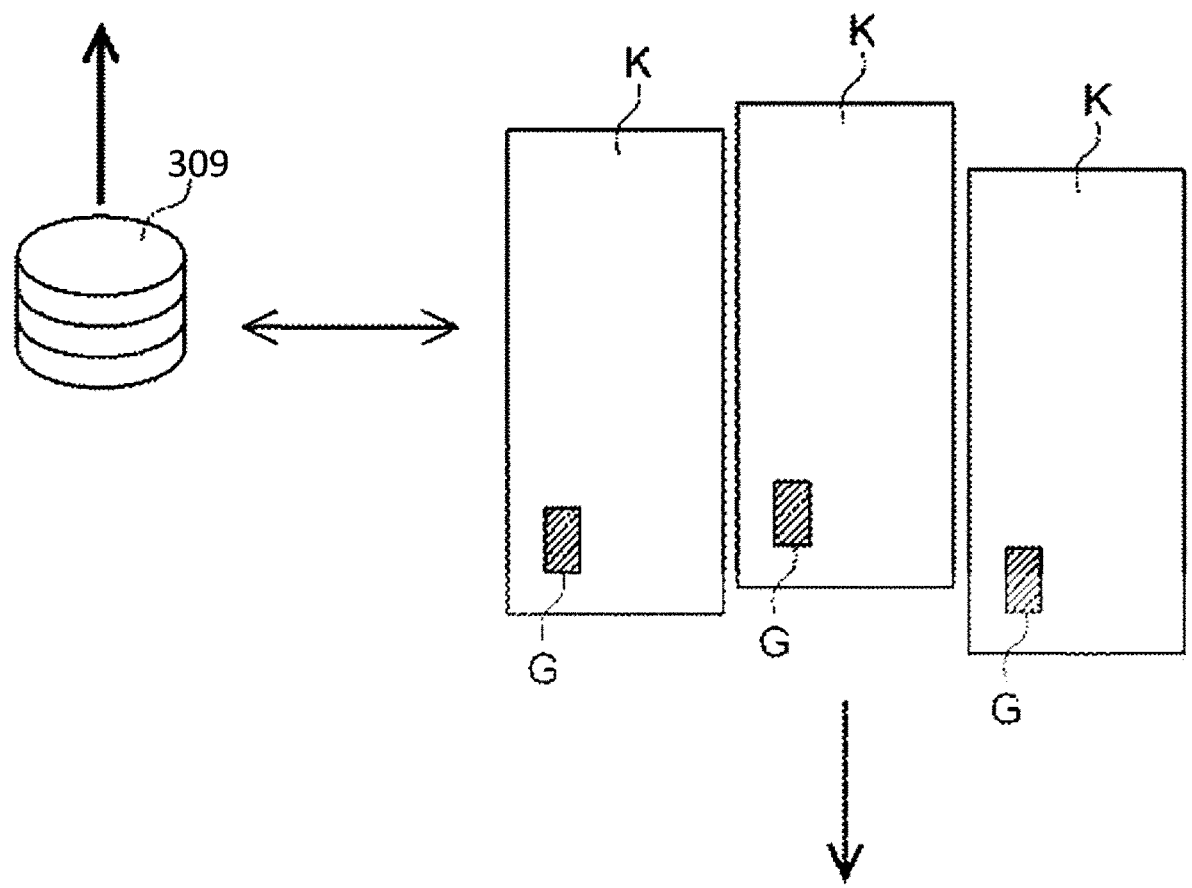
FIG. 19 is an explaining view simplifying an image of an exchanging state of a bill and a chip grasped in the third embodiment of the present invention.

The illicitness detecting system in the game park including the game tables in the present embodiment further has a function to perform an inspection of an exchange between bills and chips, which is often performed at the game table 304. In the game park of the casino or the like, the player 306 exchange their bills (cash or the like) for the gaming chips at a predetermined exchange before the game. However, when running out of chips, the player 306 can continue the game by exchanging the chips 309 from the cash (bills) at the game table (baccarat table or the like) without leaving the game table 304. However, an opportunity arises here, in which an illicitness is performed between the dealer 305 and the player). The exchange of the chips 309 from the cash (bills) on the game table (baccarat table or the like) must be done when the game is not progressing. The card distribution device 303 is capable of detecting a start of dealing of the cards and an end of dealing of the cards (time when a win/less is determined) in order to determine the win/less of the game. Therefore, the control device 314 detects a situation other than the dealing of the cards (dealing) with the card distribution device 303, and detects that bills and chips 309 are being exchanged at the game table 304 in the situation other than during card dealing (as shown in FIG. 19). The situation during card dealing (or the other situation) can be detected based on information obtained from the card distribution device 303 or an action of the dealer 305.

Figure 21:
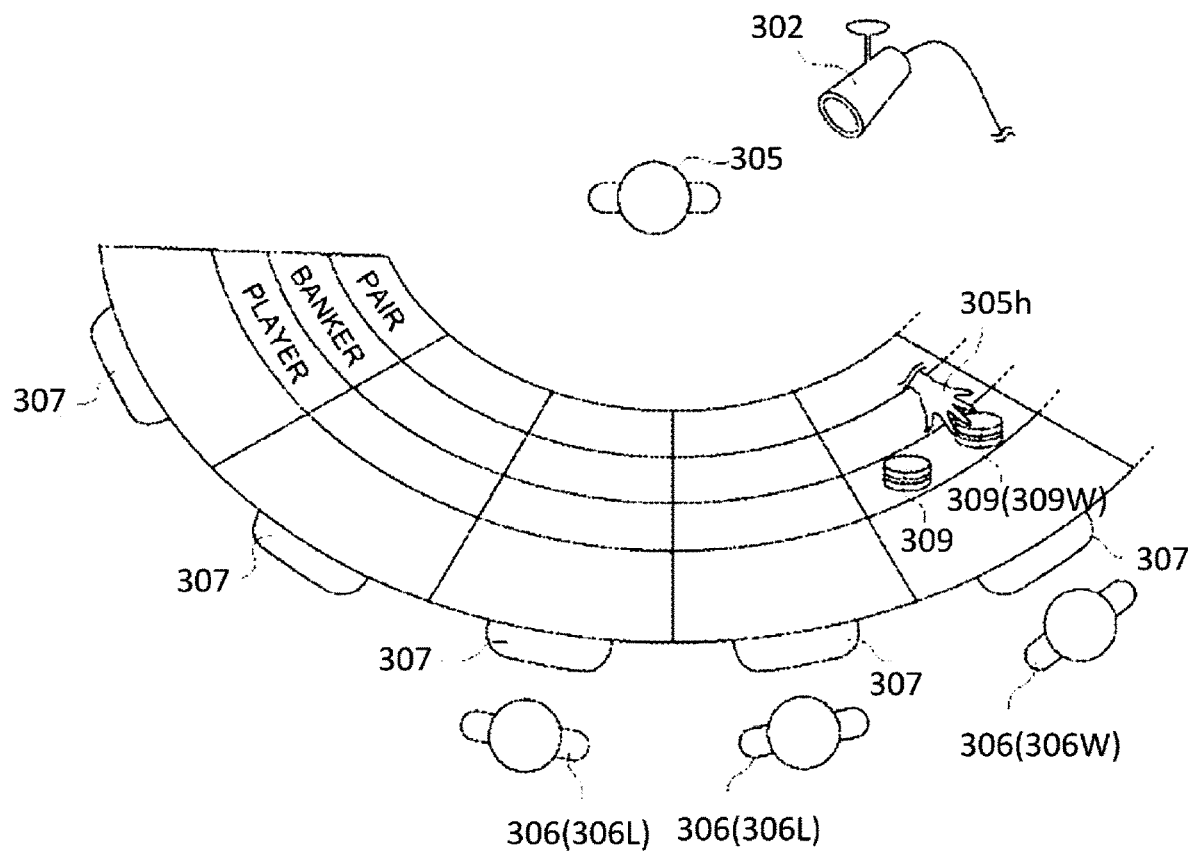
FIG. 21 is an explaining view showing a situation of payout to a winning customer (game participant) by the dealer in the baccarat game according to the third embodiment of the present invention.

The control device 314 is capable of recognizing the number and the amount of bills by performing image analysis on the surface of the bill K. Furthermore, at the game table 304, it is judged whether or not the bill K for exchange with the chip 309 is genuine by detecting an authenticity mark G on the bill by illuminating with a black light. As shown in FIG. 21, the control device 314 is an artificial intelligence active-using type or deep learning configuration configured to perform the image analysis and verify this authenticity mark G, recognize the total amount of authentic bills, and be also capable of recognizing the total amount of chips even when a plurality of chips put out on the game table as exchange targets is a situation of hidden by the blind spot of the camera 302, and compare the total amount of the bills K put out by the player and the total amount chips 309 put out by the dealer 305 on the game table 304, and be capable of judging whether or not the two amounts match with each other.

The control device 314 is an artificial intelligence active-using type or deep learning configuration configured to capable of comparing and calculating whether or not the total amount of chips 309 in the chip tray 317 of the dealer 305 at the game table 304 increase/decrease in accordance with the payment amount of the chips corresponding to the exchanged bills after the exchange between the bills and the chips is performed and settled. It is considered that the total amount of chips 309 in the chip tray 317 of the dealer 305 is always grasped in advance by the RFID or the like of the chips 309. The total amount of chips 309 in the chip tray 317 can also be detected by imaging the chip tray 317 accommodating the chips 309 with the camera 302 and analyzing the image with the image analyzing device 312.

The control device 314 verifies whether the increase/decrease amount of chips 309 in the chip tray 317 before and after the exchange between the bills and the chips and the exchanged amount of chips as a result of the image analysis on the game table 304 match with each other. The paid amount of bills may be input to the control device 314 by key entry or the like by the dealer 305, or it may also be identified by imaging the game table 304 on which the bill payment is performed by the camera 302 and analyzing the image with the image analyzing device 312.

As described above, the control device 314 judges whether or not the decreased amount of chips 309 from the chip tray 317 due to the exchange between the bills and the chips and the paid amount of bills by the player 306 to the dealer 305 match with each other. Furthermore, the control device 314 is an intelligent control device, and further may be an artificial intelligence active-using type or deep learning configuration, configured to be capable of comparing and calculating match or mismatch between the deposited amount of bill by the dealer 305 (usually by key entry or the like) and the calculated amount of bill as the image analysis result by the image analyzing device 312 after the exchange between the bills and the chips is performed and settled.

Further, the control device 314 is an artificial intelligence active-using type or deep learning configuration configured to be capable of comparing and calculating match or mismatch between the total deposit amount of bills based on the input of the dealer in the game table 304 for which the dealer is responsible and the total amount of bills based on the image analysis result by the image analyzing unit 312.

The control device 314 compares and judges whether or not the grasped amount of chips 309 in the chip tray 317 of the dealer 305 at the game table 304 increase/decrease in accordance with the paid amount of chips 309 corresponding to the exchanged bills or the paid amount of the bills corresponding to the exchanged chips 309 after the exchange between the bill and the chips 309 is performed.

Figure 20:
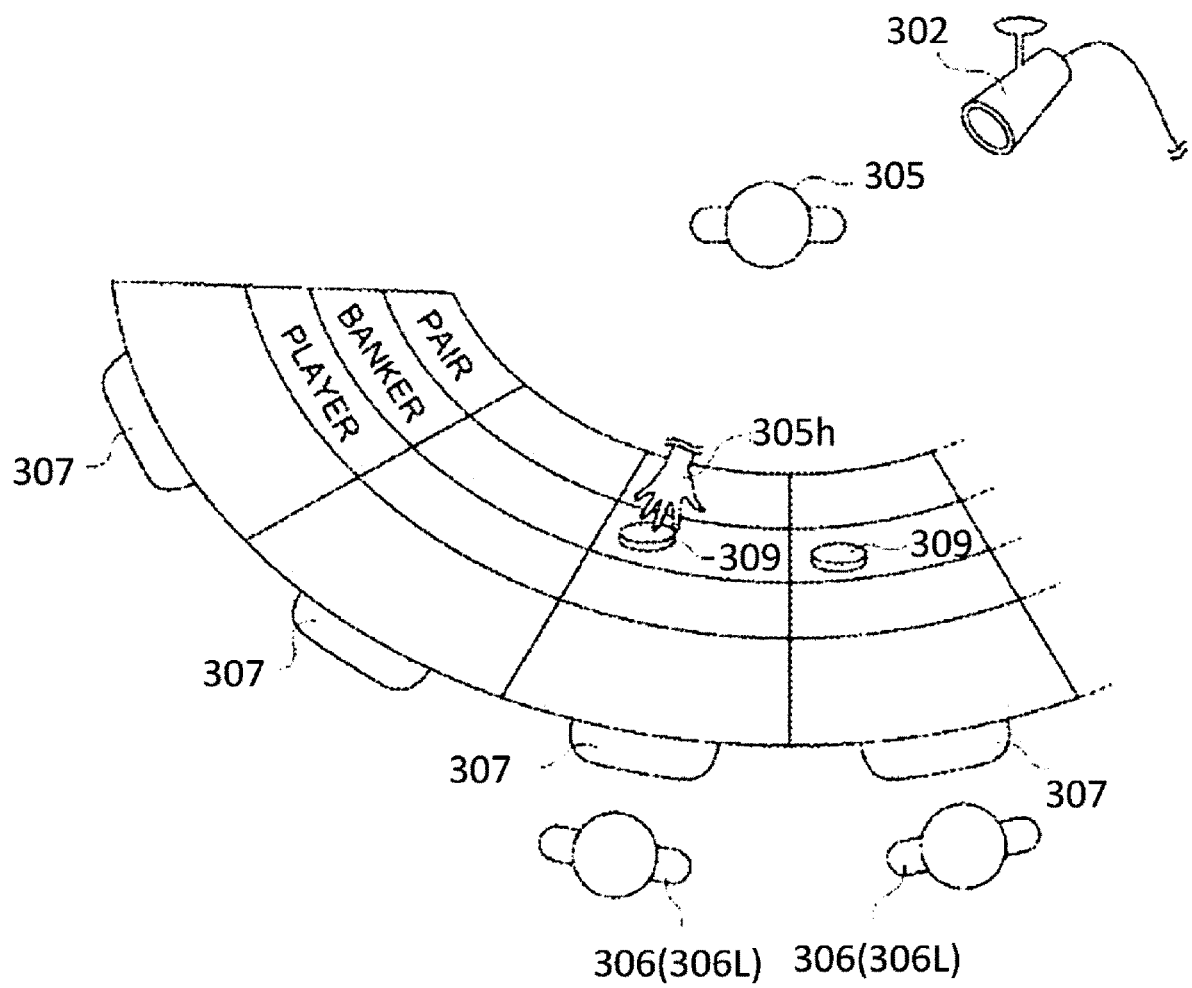
FIG. 20 is an explaining view showing a situation of collection of a chip won by a casino side by a dealer in a baccarat game according to the third embodiment of the present invention.
Figure 22:
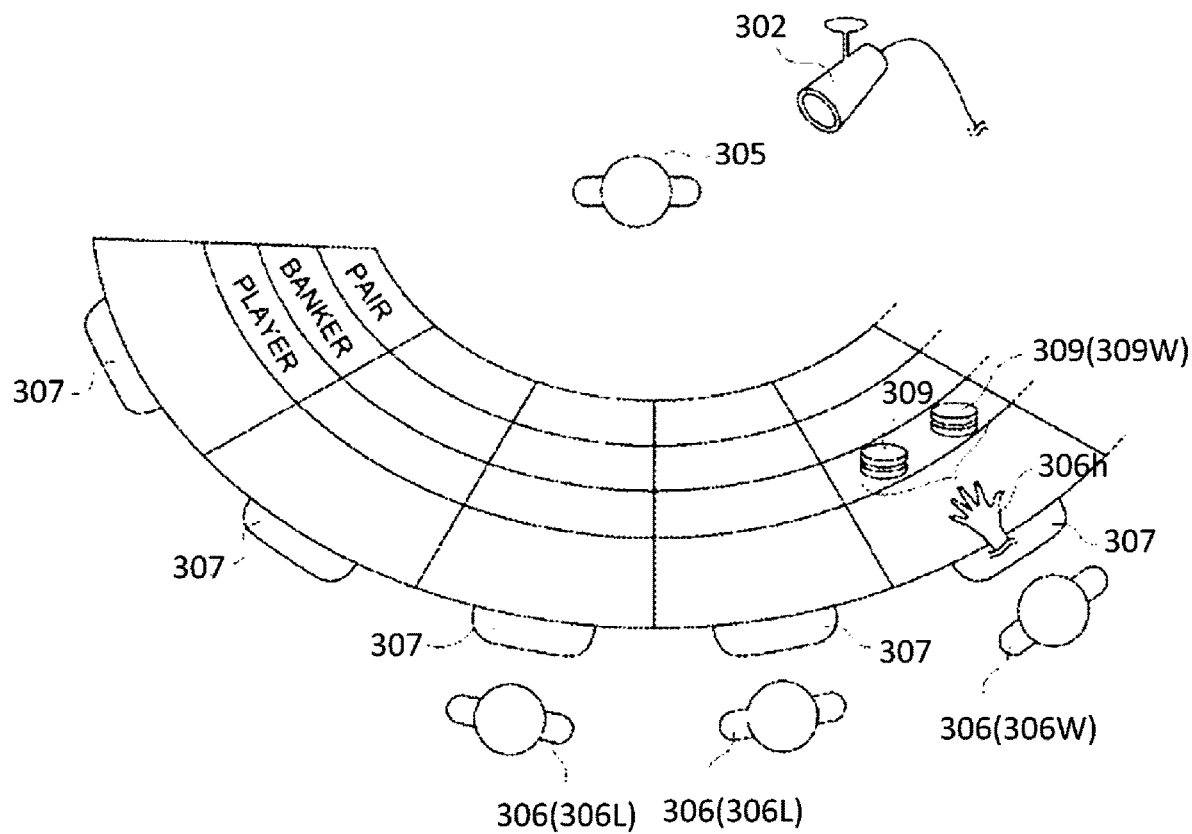
FIG. 22 is an explaining view showing a situation of receipt of a chip and payment by the winning customer (game participant) in the baccarat game according to the third embodiment of the present invention.
Figure 23A:
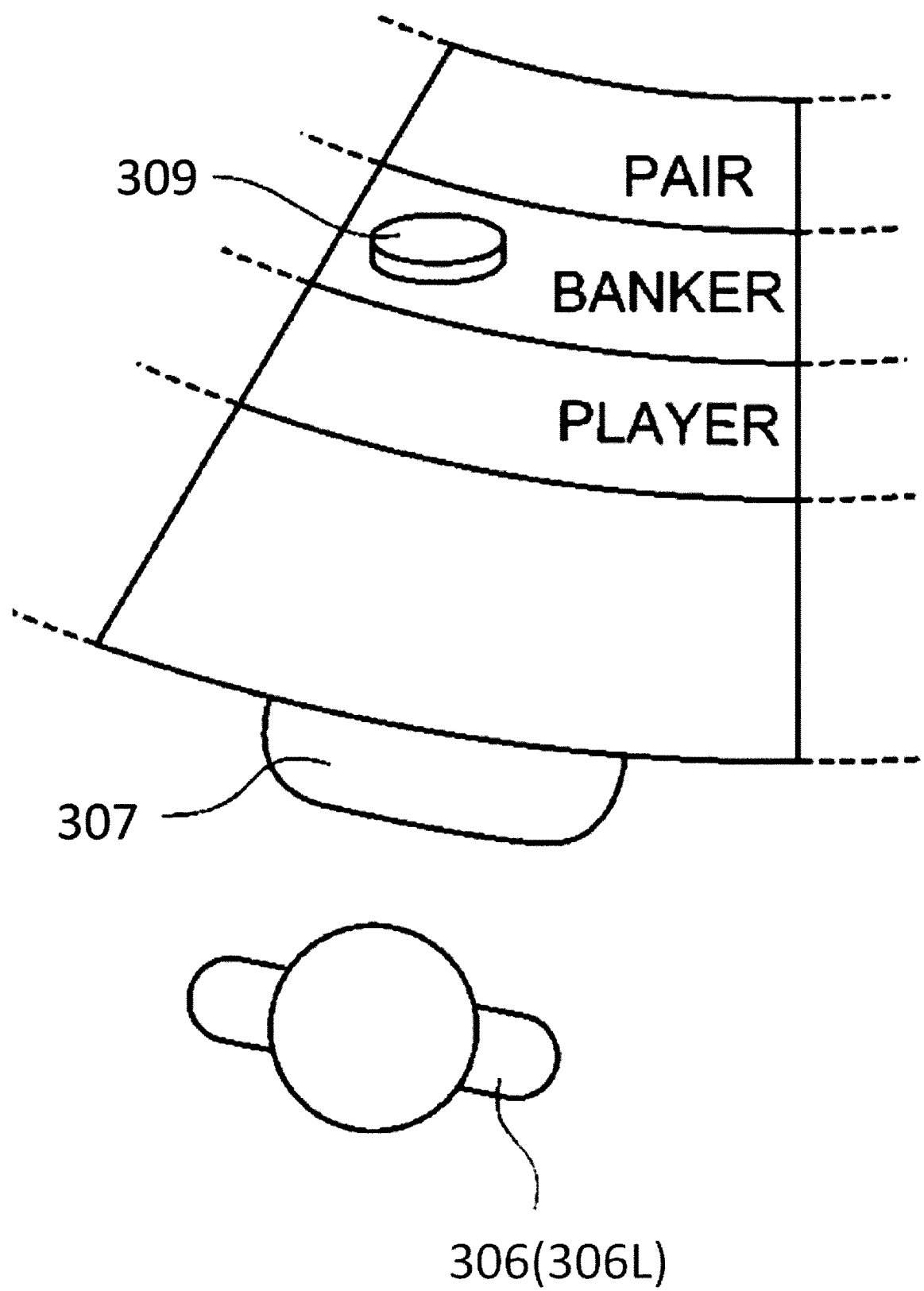
FIG. 23A is an explaining view showing of an image which is a target of image analysis of collection of a chip won by a casino side by a dealer in an illicitness detecting system according to the third embodiment of the present invention.
Figure 23B:
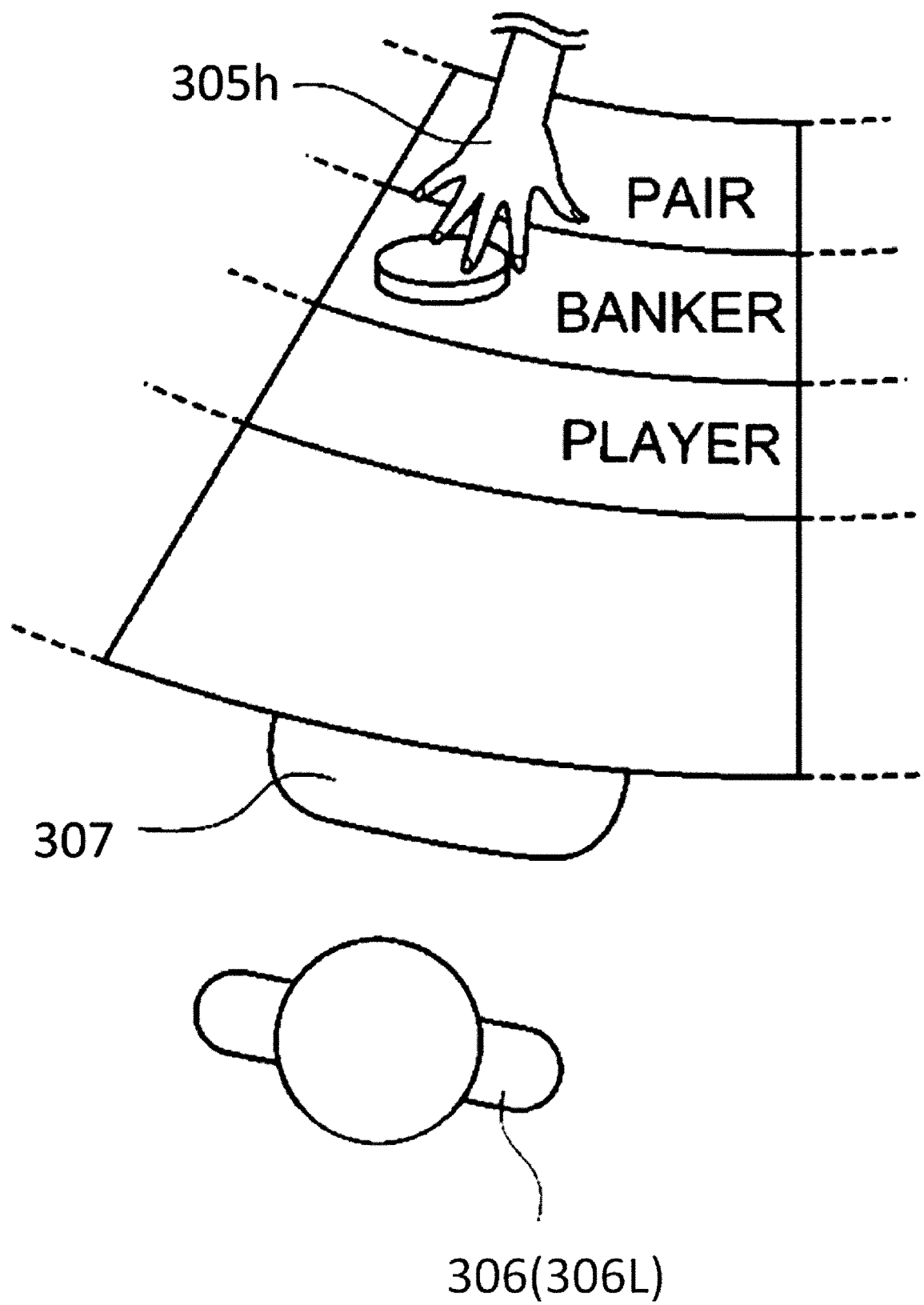
FIG. 23B is an explaining view showing of an image which is a target of the image analysis of the collection of the chip won by the casino side by the dealer in the illicitness detecting system according to the third embodiment of the present invention.
Figure 23C:
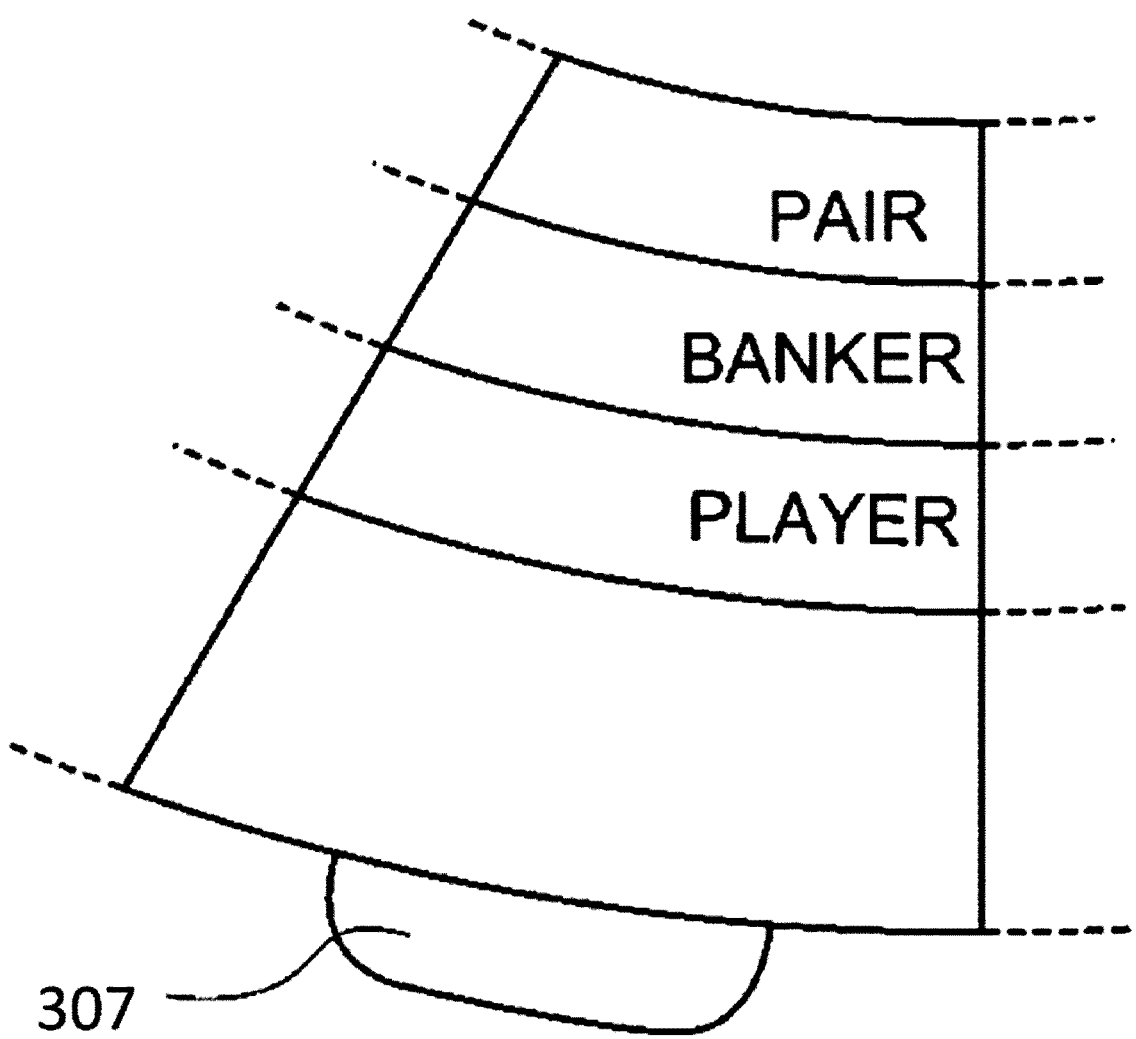
FIG. 23C is an explaining view showing of an image which is a target of the image analysis of the collection of the chip won by the casino side by the dealer in the illicitness detecting system according to the third embodiment of the present invention.
Figure 23C:
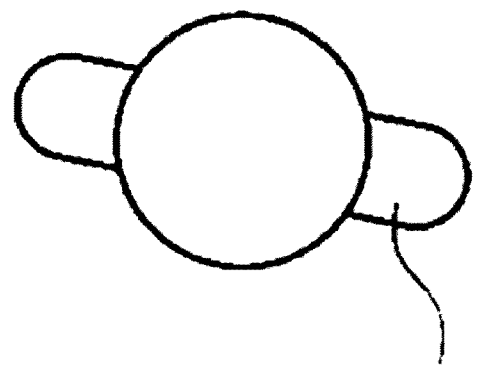

The control device 314 also includes the following functions 1) to 5) in accordance with a rule of baccarat game and judges whether or not an illicit action against the rule is performed. That is: 1) In each game, monitoring based on information obtained by the image analyzing device 312 using the camera 302 whether there is a movement of the chips 309 during after a signal obtained from the card distribution device 303 and starting the card draw or a game start operation by pressing a start button by the dealer 305, and before the win/loss result of the game are displayed by the card distribution device 303 (shown in FIG. 16); 2) After the end of each game, monitoring based on the information obtained by the image analyzing device 312 using the camera 302 whether the loser 306L does not illicitly take the chips 309 during the dealer 305 is collecting the chips 309 wagered by the loser among the game participants 306 (as shown in FIG. 20); 3) At the end of each game, monitoring based on the information obtained by the image analyzing device 312 using the camera 302 whether anyone other than the dealer 305 (winner or loser) does not add the winning chips 309W or newly place chips 309 on the winning side on which not wagered during the dealer 305 is collecting the chips 309 wagered by the loser among the game participants 306; 4) After the end of each game, monitoring based on the information obtained by the image analyzing device 312 using the camera 302 whether the dealer 305 correctly places the gaming chip 309W in a position of the chip 309 wagered by the winner among the game participant 306 (shown in FIG. 21); 5) After the end of each game (the dealer 305 operates the card distribution device 303 to display the win/loss result on the display lamp 313), monitoring based on the information obtained by the image analyzing device 312 using the camera 302 whether the winner 306W among the game participants 306 takes the wagered chips 309 and the payment chips 309W (shown in FIG. 22).

The control device 314 uses the camera 302 to analyze the information obtained by the image analyzing device 312 as follows. That is, the above 1) to 5) monitoring are performed by detecting hand movements of the dealer 305 and the game participant 306, chip movements, or the hand movements and chip movements using the analysis result by the image analyzing device 312, but in the basic analysis, it is at least necessary to know who the chips 309 are taken by. The method of this analysis is explained below, using FIGS. 23 to 25.

An analysis of that the dealer 305 takes the chips 309 wagered by the game participant 306L (FIG. 23). The dealer 305 collects the chips 309 wagered by the game participant 306L who lost in the game. It is monitored by analyzing the information obtained by the image analyzing device 312 using the camera 302 whether or not this was securely collected. First, a change from a state in which the wagering chip 309 is present (FIG. 27A) to a state in which it is not present (FIG. 23C) is detected by image analysis. Then, the image (FIG. 23B) between the state in which the chip 309 is present to the state in which it is not present is analyzed. In the image (FIG. 23B) between the state in which the chip 309 is present to the state in which it is not present, which side the hand 305h is extending from (from the above side or the other side in FIG. 23) is analyzed, and an illicitness is detected based on the rule that when it is extending from the above side (or the hand appears from the above side and then is withdrawn to the above side), it is judged that the hand 305h is that of the dealer 305h, and when the hand is extending from any other side, it is judged that it is illicit.

Figure 24:
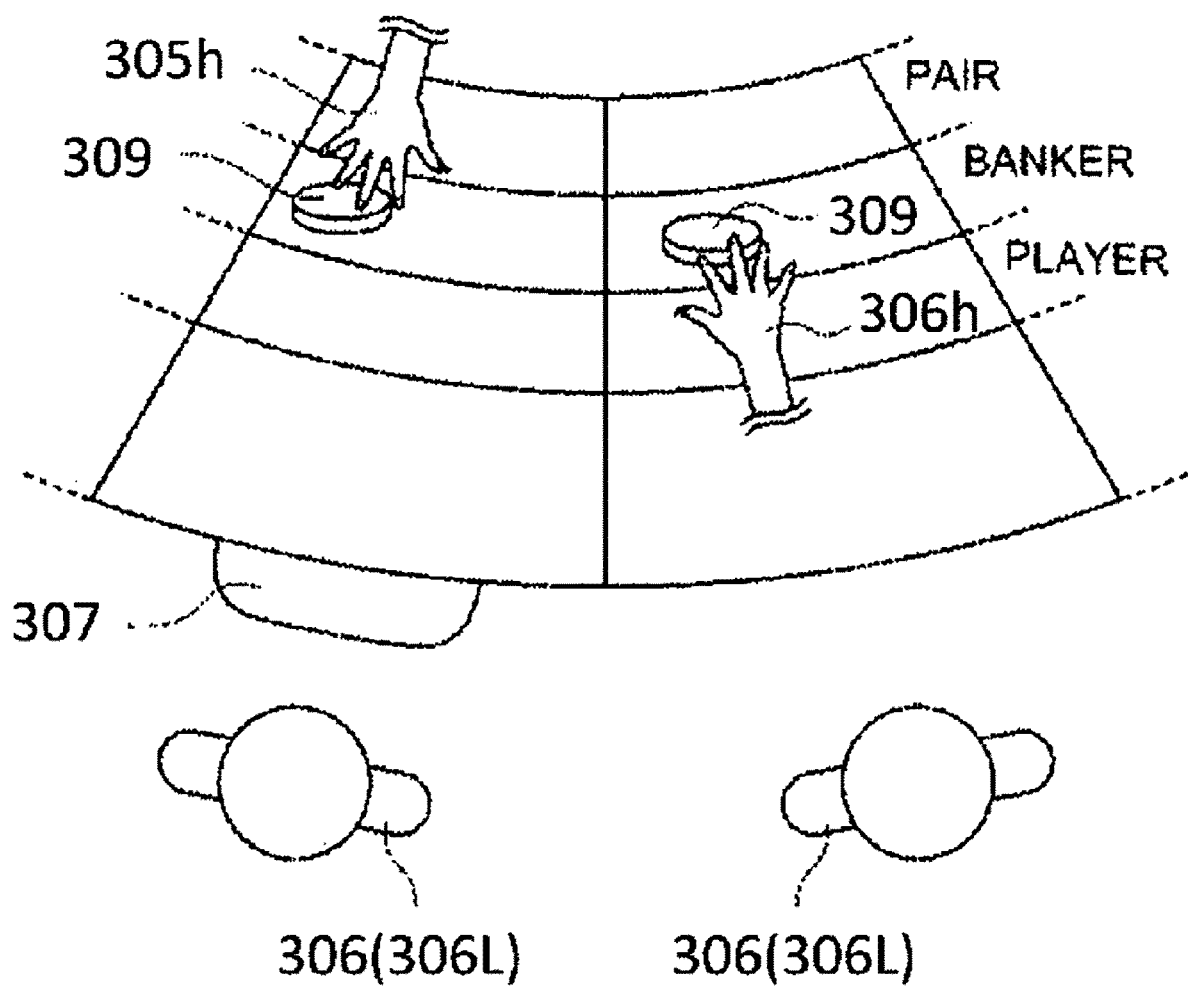
FIG. 24 is an explaining view of an image which is a target of image analysis of an illicit collection of a chip in the illicitness detecting system according to the third embodiment of the present invention.
Figure 26:
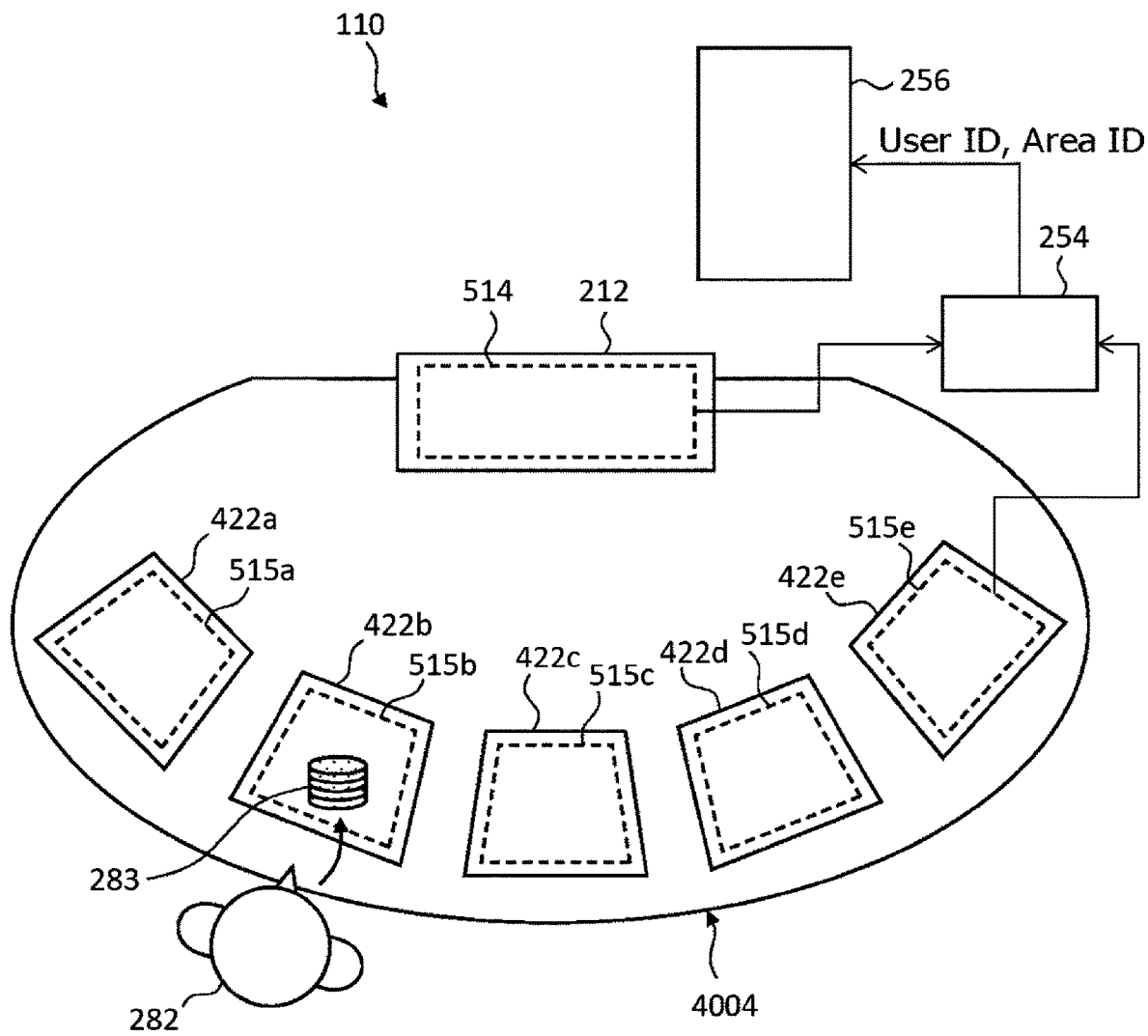
FIG. 26 is a view showing a configuration of a management system in a first example according to a fourth embodiment of the present invention.

While the dealer 305 is collecting the chips 309 wagered by the game participant 306L losing in the game, whether the other person illicitly takes the losing chips 309 is monitored (FIGS. 23 and 26). In the image between the state in which the chips 309 are present to the state in which the chips 309 are not present, as shown in FIG. 24, the analysis of that the loser 306L or the like among the game participants 306 takes is detecting with image analysis that the hand 306h is extending or moving from the below side (properly from the above side) in FIG. 24, judging that the hand 306h or the like of the other than the dealer 305 takes the chips 309, and judging that there is an illicitness.

Figure 25A:
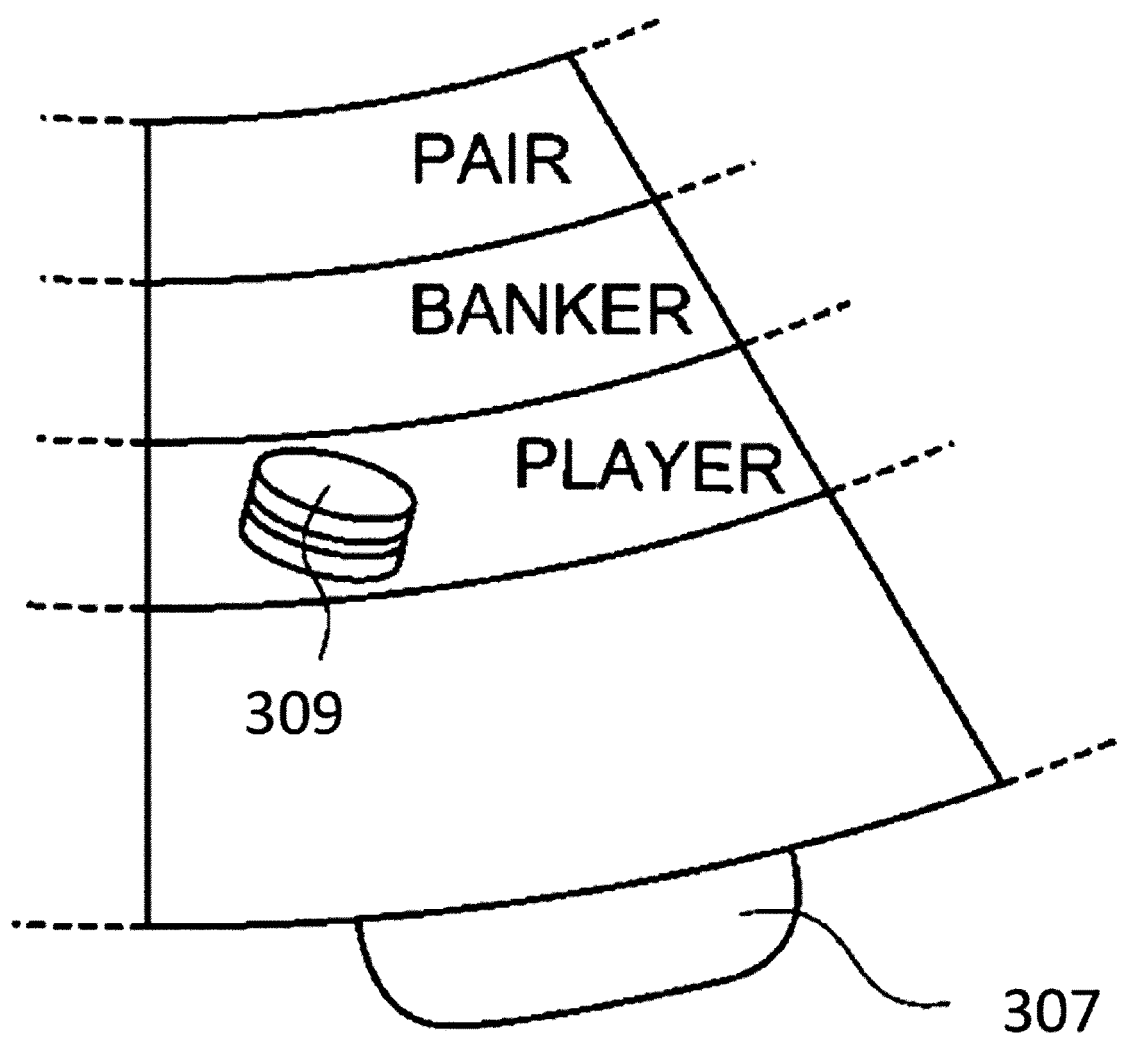
FIG. 25A is an explaining view of an image which is a target of image analysis of collection of a chip won by a game participant in the illicitness detecting system according to the third embodiment of the present invention.
Figure 25A:
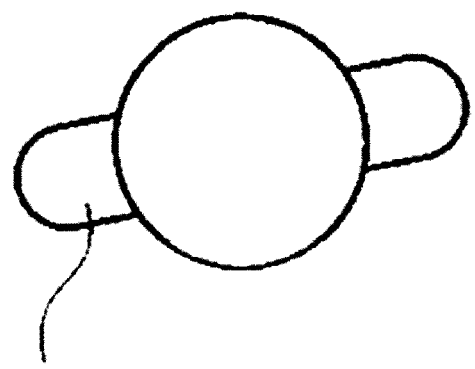
Figure 25B:
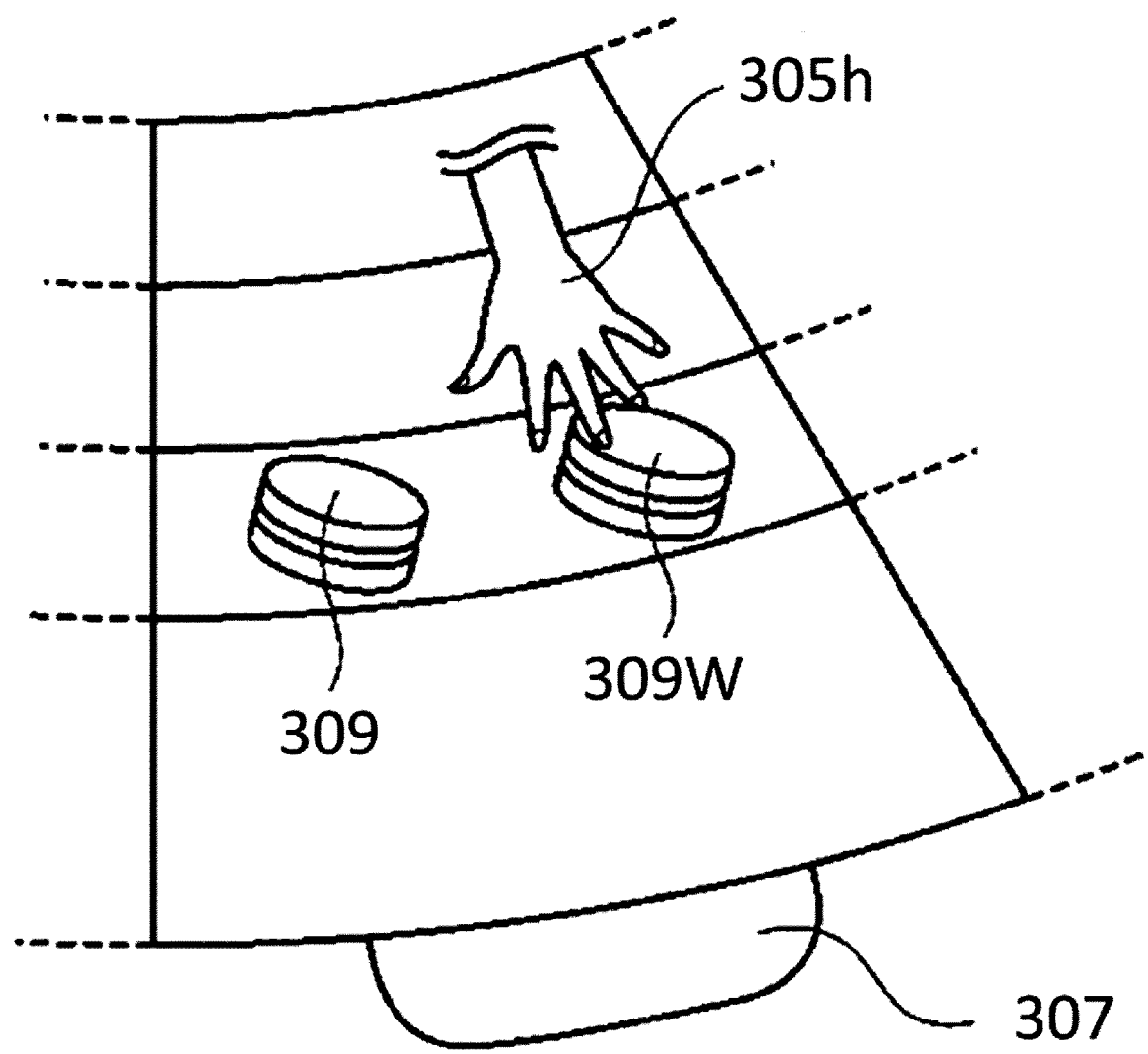
FIG. 25B is an explaining view of an image which is a target of the image analysis of the collection of the chip won by the game participant in the illicitness detecting system according to the third embodiment of the present invention.
Figure 25B:
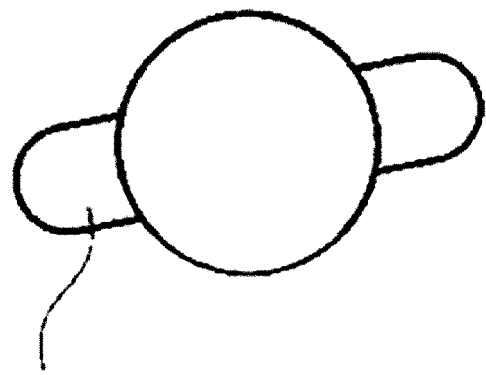
Figure 25C:
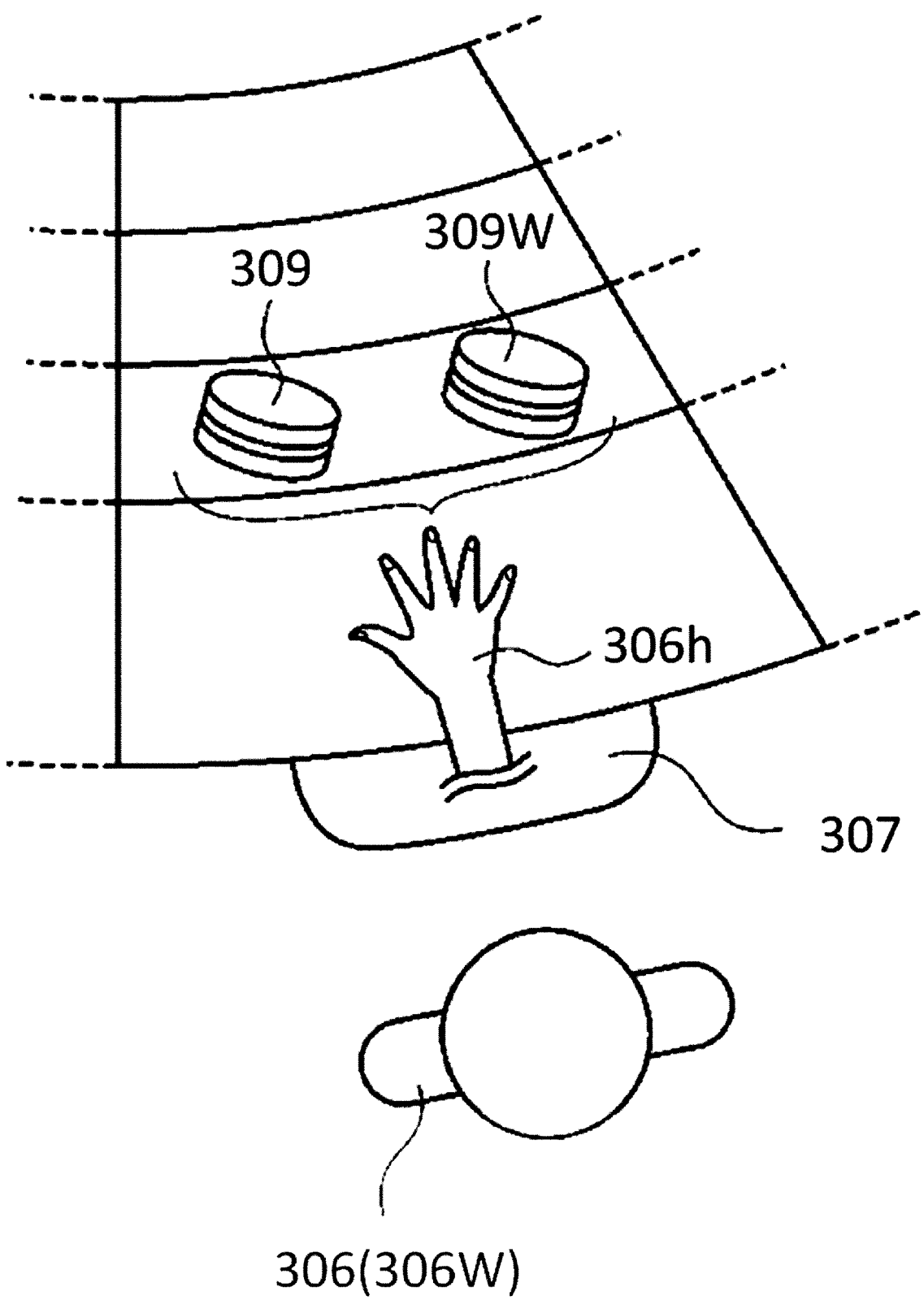
FIG. 25C is an explaining view of an image which is a target of the image analysis of the collection of the chip won by the game participant in the illicitness detecting system according to the third embodiment of the present invention.
Figure 25D:
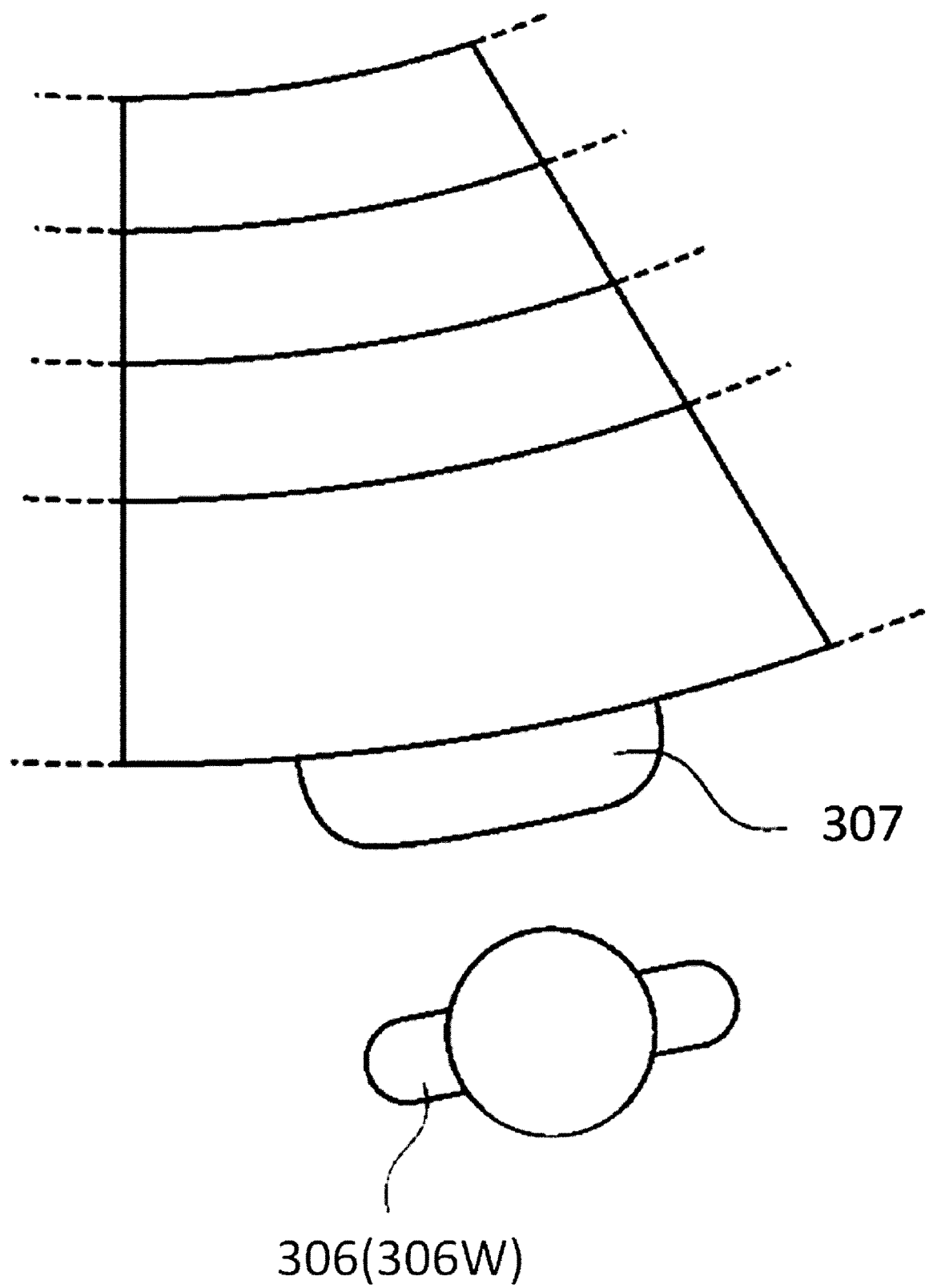
FIG. 25D is an explaining view of an image which is a target of the image analysis of the collection of the chip won by the game participant in the illicitness detecting system according to the third embodiment of the present invention.

An analysis of that the dealer 305 correctly pays (places) the chips 309 for the winning chips 309 and the winner 306W among the participants 306 in the game takes. First, for the winning chips shown in FIG. 25A, the chips 309W is paid out in accordance with the rule of the game as shown in FIG. 25B. A change from a state of the drawing shown in FIG. 25A to a state of the drawing shown in FIG. 25B is detected, and at the same time, whether the hand is the hand 305H of the dealer 305 is detected by image analysis. After this, the control device 314 inspects base on the image analysis result in accordance with the rule of the game whether or not the hand 306H of the winner 306W among the game participants 306 extends (moves) to the same wagered area at this time as shown in FIG. 25C, and then all the chips 309 disappear (a state shown in FIG. 25D) to judge whether or not there is no illicitness.

Furthermore, the control device 314 is configured to judge whether or not the amount of chips paid to the winner by the dealer 305 is correct based on the amount wagered by the winner 306W among the game participants 306. A specific example is shown below. It is expected that the position and the total amount of chips 309 (which of the player side and the banker side in the wagered area 308 the chips 309 are wagered on) cannot be read normally such as when the chips 309 are shifted to overlap or are in a blind spot from a position of the camera 302. The control device 314 is configured to recognize a hiding of the chips 309 due to the blind spot (when a part of the chip is hidden, or when the entire chip is hidden) or the like, and accurately judge the position, and the number or the like of chips using a self-learning function or the like by an existing artificial intelligence active-using type computer or control system, a deep learning (configuration) technology. Furthermore, a configuration configured to detect the position and the type of chips 309 in the wagered area 308 is not limited to this, and may be configured to detect, for example, by reading the ID embedded in the chip.

As explained above, the control device 314 is capable of grasping the position (the wagering position of the player, the banker, or the pair), the type (the chip 309 is assigned different amount value for each color), and the number of chips 309 wagered by each player 306 through the camera 302 and the image analyzing device 312, and detecting which customer 306 wagers on the player (when there is a plurality of customers 306 wagering on the player, which customer 306 wagers the highest amount), and which customer 306 wagers on the banker (when there is a plurality of customers 306 wagering on the banker, which customer 306 wagers the highest amount).

Furthermore, the control device 314 of the present illicitness detecting system for the game analyzes and monitors the information obtained by the image analyzing device 312 using the camera 302 in accordance with the rule of the baccarat game in the manner described above. The monitoring indicated in the above 1) to 5) is performed, and it is judged whether or not an illicitness against the rule is not performed. When the illicitness is detected, the control device 314 turns on abnormality displaying lamps provided in the card distribution device 303 and the game table 304, respectively, and outputs the detection of the illicitness to a casino management department or the like with wire or wireless. A monitor or a lamp configured to receive the judgment result to alert or display may be further provided elsewhere.

As described above, an illicit action is detected by the control device 314, and it may be to output a displaying signal to the display lamp 313 or the abnormality displaying lamp of the card distribution device 303 or emit an alert at a point of time of the detection or at an appropriate timing, and activate a function of preventing the distribution of the cards to prevent the distribution of the cards after the point of time when the illicitness or the mistake is detected.

In the above embodiment, the image analyzing device 312 or the control device 314 is a device including an artificial intelligence active-using type or deep learning configuration, but the image analyzing device 312 or the control device 314 may perform the image analysis and the above various types of control using specifically scale-invariant feature transform (SIFT) algorithms, convolutional neural network (CNN), deep learning, machine learning, or similar manner. These technologies are technologies to perform image recognition on imaged image to recognize objects included in an image. In particular, in recent years, it is performed to recognize objects with high accuracy using deep learning technology with multiple layers of neural networks. This deep learning technology generally overlaps layers over multiple stages in intermediate layer between input layer and output layer of neural network to recognize objects with high accuracy. In this deep learning technology, convolutional neural networks in particular attracts attention because it has higher performance than conventional recognition of objects based on image features.

In the convolutional neural network, a recognition target image to which a label is assigned is learned, and the main target included in the recognition target image is recognized. When there is a plurality of main objects in the learning image, they are designated by region rectangles, the image corresponding to the designated region is labeled, and learning is performed. Furthermore, in the convolutional neural network, it is also possible to judge the main target and the location of the target in the image.

Further explaining the convolutional neural network, the target recognition process performs edge extraction processing or the like on the image to be recognized to extract candidate regions based on local features, and also inputs the candidate regions to the convolutional neural network to extract feature vectors, and then performs classification, and obtain the classified candidate region with the highest confidence level as the recognition result. The confidence is a quantity that indicates what extent similarity of the main object learned together with the certain image regions and the labels is relatively higher than the similarity of other class.

The device with an artificial intelligence active-using type or deep learning configuration is described in U.S. Pat. No. 9,361,577, U.S. Pat. Pub. No. 2016/171336, U.S. Pat. Pub. No. 2015/036920, JP. Pat. Pub. No. 2016-110232 or the like, which are incorporated herein by reference.

A fourth embodiment of the present invention is described below. This embodiment relates to a system that enables to grasp and record which player an ownership of a gaming substitute currency is moved to when a dealer pays the gaming substitute currency to a player and the possessor of the gaming substitute currency is moved from a casino to the player in order to always grasp and manage possessor information of each gaming substitute currency to enhance security. The fourth embodiment can be used in combination with the second embodiment.

FIG. 26 is a view showing a configuration of a management system in a first example according to the fourth embodiment of the present invention. In the management system 110, the possessor of the gaming substitute currency is traced without using a database. For this purpose, information of the possessor is stored in the gaming substitute currency. The management system 110 includes a roughly oval-shaped game table 4004. The player 282 is located on one side of the game table 4004 (the below side in FIG. 26) and the dealer (not shown) is located on the opposite side. Bet areas 422a-422e (hereinafter generally referred to as "bet area 422") are divided for each of a plurality of playing positions on the top surface of the game table 4004. The bet area 422 is an area on which the player 282 bets by placing the gaming substitute currency 283. A chip tray 212 is provided on the side of a dealer position of the game table 4004, on which the gaming substitution currency 283 of the dealer are placed.

The gaming substitution currency 283 have the same configuration as the gaming substitution currency of the above embodiment. That is, the RFID tag is embedded in the gaming substitution currency 283, which includes a non-rewritable area configured to store fixed information and a rewritable area configured to store variable information. A chip ID (identification information) is stored in the RFID tag as the fixed information, which uniquely identifies the gaming substitute currency 283. A user ID is also stored in the RFID tag as variable information, which uniquely identifies the possessor of the gaming substitute currency 283.

A common user ID is assigned to the casino or the dealer, and when the gaming substitute currency 283 is owned by the casino (including when they are stored in the chip tray 212), the user ID indicating the casino or the dealer is stored in the variation information.

RFID antenna 515a-515e (hereinafter generally referred to as "RFID antennas 515") is provided in each of the bet areas 422a-422e of the game table 4004. Specifically, the RFID antenna 515 is embedded under raxa (woolen cloth) of the game table 4004 and at a location in which the corresponding bet area 422 is divided. RFID antennas 514 is also provided in the chip tray 212.

The RFID antenna 515 reads and writes data to the RFID tag embedded in the gaming substitute currency 283 placed in the corresponding bet area 422. The RFID antenna 514 reads and writes data to the RFID tag embedded in the gaming substitute currency 283 placed in the chip tray 212.

The RFID antennas 515a-515e and the RFID antenna 514 are connected to RF control device 254. In FIG. 26, only a line connecting the antenna 515e to the RF control device 254 is shown, and lines connecting antennas 515a-515d to the RF control device 254 are omitted for clarity of the drawing, but the antennas 515a-515d are connected to the RF control device 254 as well as the antenna 515e. The same is true in the following drawings. The RF control device 254 perform read and write control to each antenna. The RF control device 254 perform the read and write control distinguishing each antenna. For this purpose, an area ID is given to each antenna, which uniquely identifies the area in which the antenna reads and writes. When performing reading, the RF control device 254 performs periodically reading.

It is possible by referring to this area ID to identify whether the read gaming substitute currency 283 is in the chip tray 212 or the bet area 422, and for the bet area 422, identify which of the bet areas 422a-422e of the playing positions.

When performing reading, the RF control device 254 receives from each antenna the data read by that antenna and identifies which area the data is read from, that is, the area ID. When performing writing, the RF control device 254 identifies the antenna to write, that is, the area ID, and transmits the data to be written. Thereby, the RF control device 254 can perform the reading and writing control for each antenna individually.

The RF control device 254 outputs the user ID of the gaming substitute currency 283 ("User ID" in FIG. 26) and the area ID of the area in which the user ID is read ("Area ID" in FIG. 26) based on the data read at each antenna. The management system 110 further includes a management control device 256 connected to the RF control device 254. The management control device 256 receives the user ID and area ID from the RF control device 254 and identifies to the RF control device 254 the user ID to be written to the RFID tag.

As explained below, the user ID stored in the RFID tag of the gaming substitute currency 283 changes as the gaming substitute currency 283 is moved, and the past user ID as well as the latest user ID is stored in the RFID tag as the variable information. Therefore, it is possible to check a transition of the possessor for each gaming substitute currency 283 by referring to this variable information. In the following explanation, an expression such as "rewrite user ID" or the like means to change at least the latest user ID, and do not necessarily mean to delete information of the past the user ID at the same time.

The management control device 256 updates the variation information of the gaming substitute currency 283 based on the data (user ID and area ID) of the gaming substitute currency 283 received from the RF control device 254. The method of updating the variation information is described below.

Figure 27:
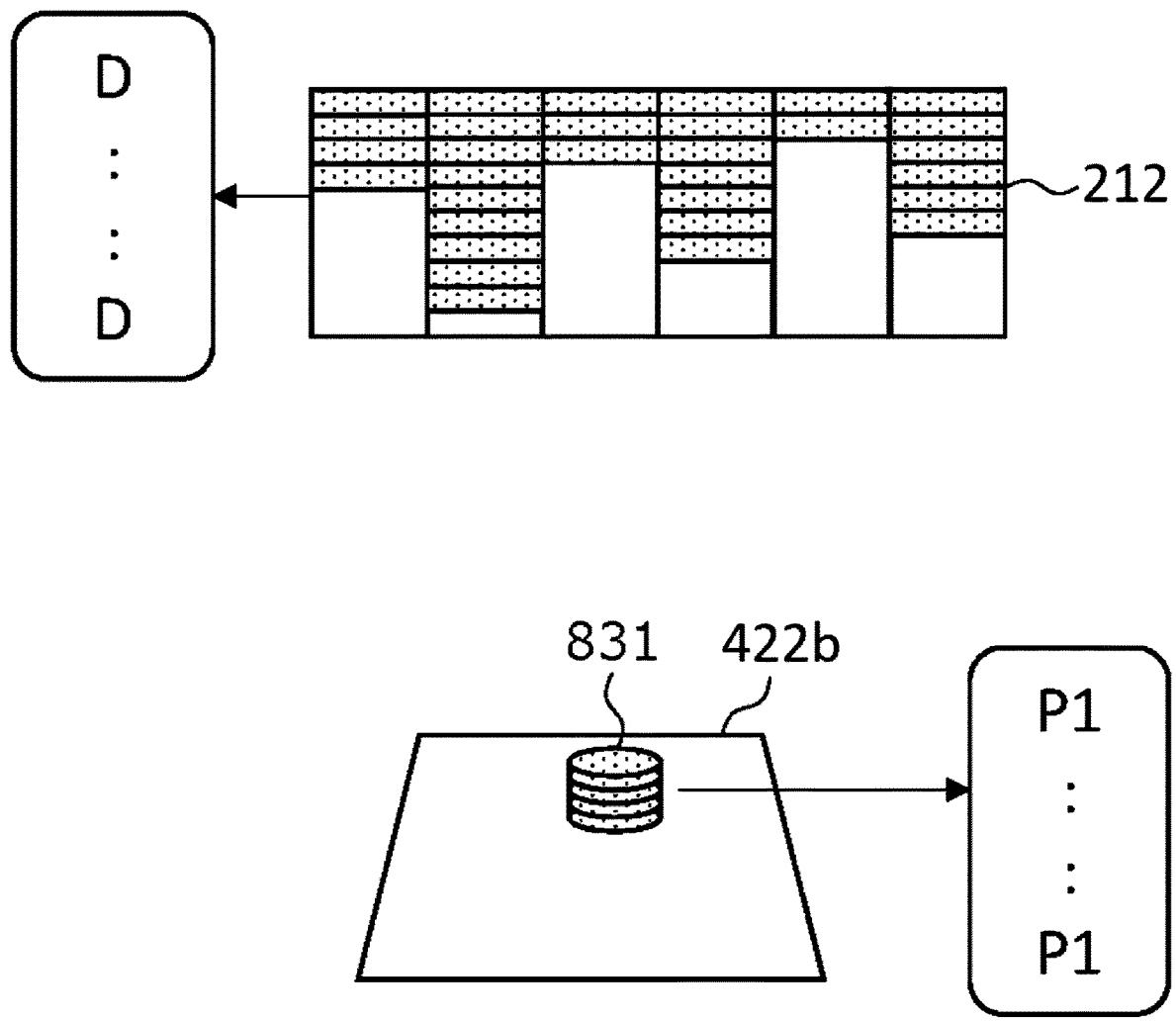
FIG. 27 is a view explaining an example of update of variation information in the first example according to the fourth embodiment of the present invention.
Figure 28:
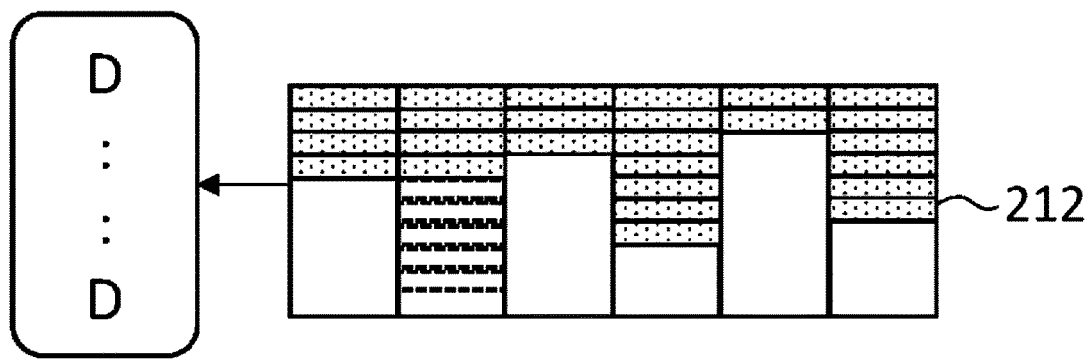
FIG. 28 is a view explaining the example of the update of the variation information in the first example according to the fourth embodiment of the present invention.
Figure 28:
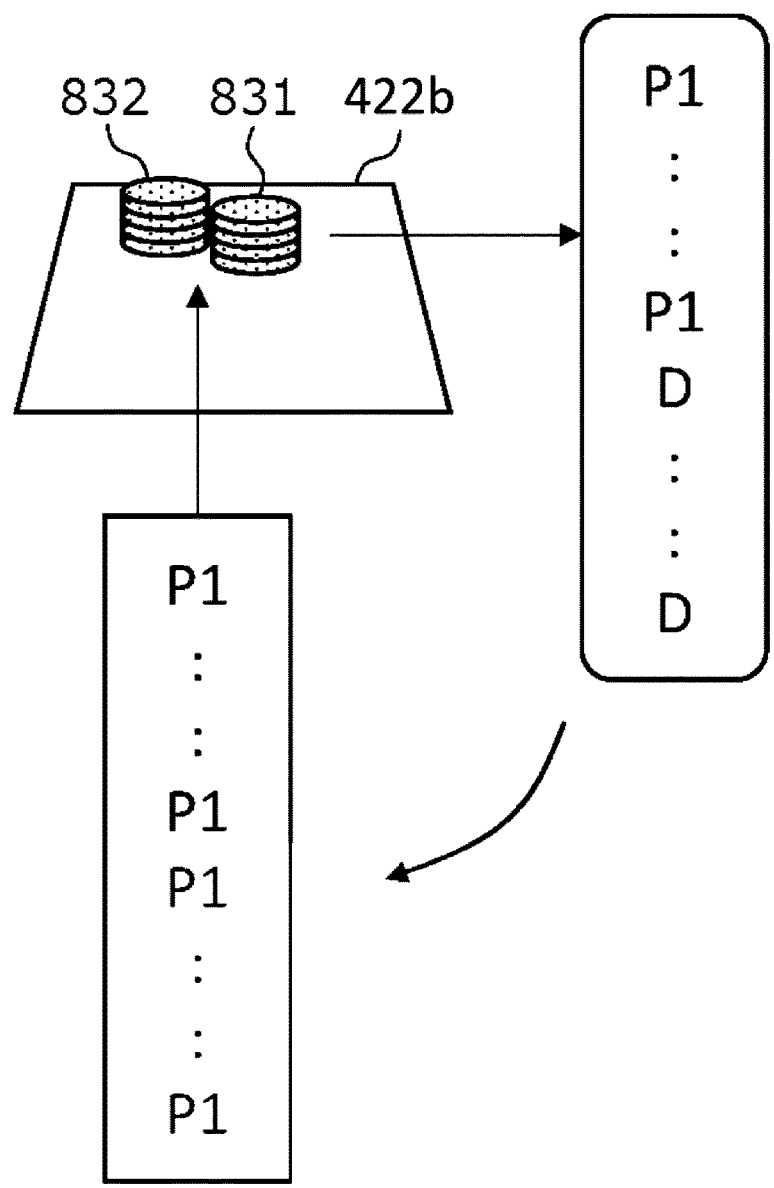
Figure 29:
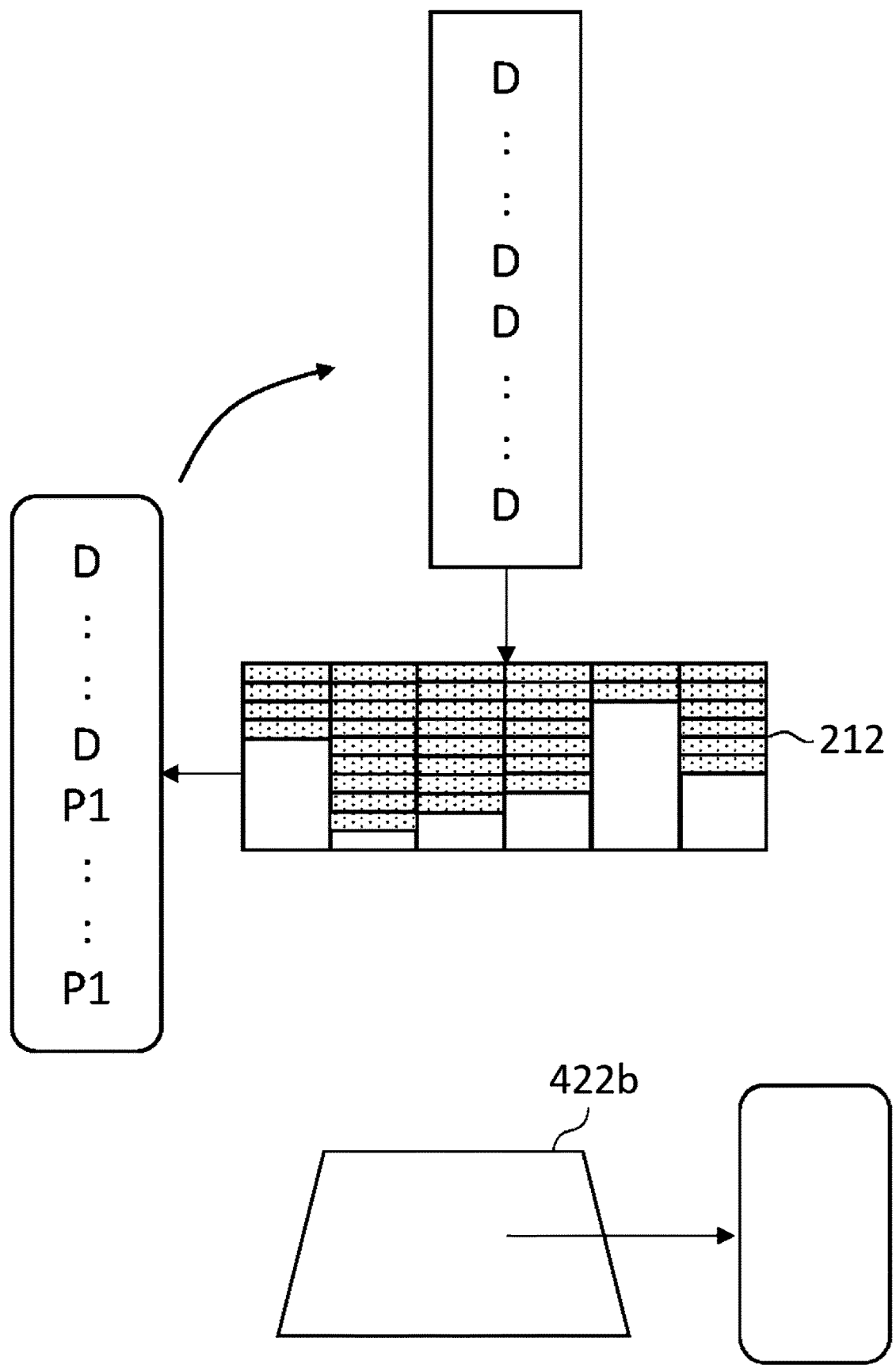
FIG. 29 is a view explaining the example of the update of the variation information in the first example according to the fourth embodiment of the present invention.

FIGS. 27 to 29 is a view explaining an example of update of variation information. As shown in FIG. 27, the player bets the gaming substitute currencies 831 in the bet area 422b. The gaming substitute currencies which the player bet on the bet area are hereinafter also referred to as "betting chips 831," and the user IDs of the betting chips 831 and the area ID of the bet area 422b obtained by reading the RFID tags of the gaming substitute currencies which the player bet on the bet area are input to the management control device 256.

At a betting stage, as shown in FIG. 27, the same user IDs ("P1" in the example in FIG. 27) are read from the bet area 422b, and the same IDs ("D" indicating that the possessor is the casino or the dealer in the example in FIG. 24) are read from the chip tray 212. When this player wins the game, as shown in FIG. 28, the dealer pays out (payout) the gaming substitute currencies (hereinafter referred to as "payout chips 832") from the chip tray 212 and place them next to the betting chip 831 in the bet area 422b.

Then, "D" as well as "P1" are read from the bet area 422b as the user ID. When the user IDs of the gaming substitute currencies 283 read from the same bet area 422 are two types, and one of them is "D" and the other of them is the user ID assigned to the player, the management control device 256 control the RF control device 254 to rewrite the user IDs of all gaming substitute currencies 283 in the bet area 422 to the user ID assigned to the player ("P1" in the case of FIG. 28). In this case, the same "P1" is further written to be added as the latest user ID to the betting chip 831 in which "P1" is stored as the user ID.

On the other hand, when the player loses the game, the betting chips 831 are collected in the chip tray 212 by the dealer, as shown in FIG. 29. Then, "P1" as well as "D" are read from the chip tray 212 as the user ID. When the user IDs of the gaming substitute currencies 283 read from the chip tray 212 includes the user ID assigned to the player ("P1" in the example in FIG. 29) other than "D," the management control device 256 rewrite the user IDs of all gaming substitute currencies 283 in the chip tray 212 to "D."

It may be to provide a collection float configured to temporarily store the gaming substitute currencies 283 collected in the chip tray 212, the antennas are separated between the collection float and other portions, and only the gaming substitute currencies 283 collected in the collection float are processed as described above.

By the above processing of the management control device 256, the user ID stored in the gaming substitute currency 283 is updated in accordance with the change in the actual possessor. That is, in this embodiment, since the user ID is stored in the RFID tag of the gaming substitute currency 283, and the user ID is updated for the payout chip 832 so that the possessor of the payout chip 832 is the same as the possessor of the betting chip 831, it is possible to trace the transition of the possessor by the game performed on the game table 4004 without using the database and the player identification system described below and grasping progress situation of the game (a betting stage, a game stage, and a settlement stage) by the management control device 256.

When the player purchases new gaming substitute currencies 283, the player is identified using the player identification system described below, and the user ID of the casino or the dealer is rewritten to be changed to the user ID of the identified player before the gaming substitute currencies 283 are given to the player. When the player cashes the gaming substitute currencies 283, the user IDs of the gaming substitute currencies 283 given by the player are also rewritten to be changed to the user ID of the casino or the dealer.

Figure 30:
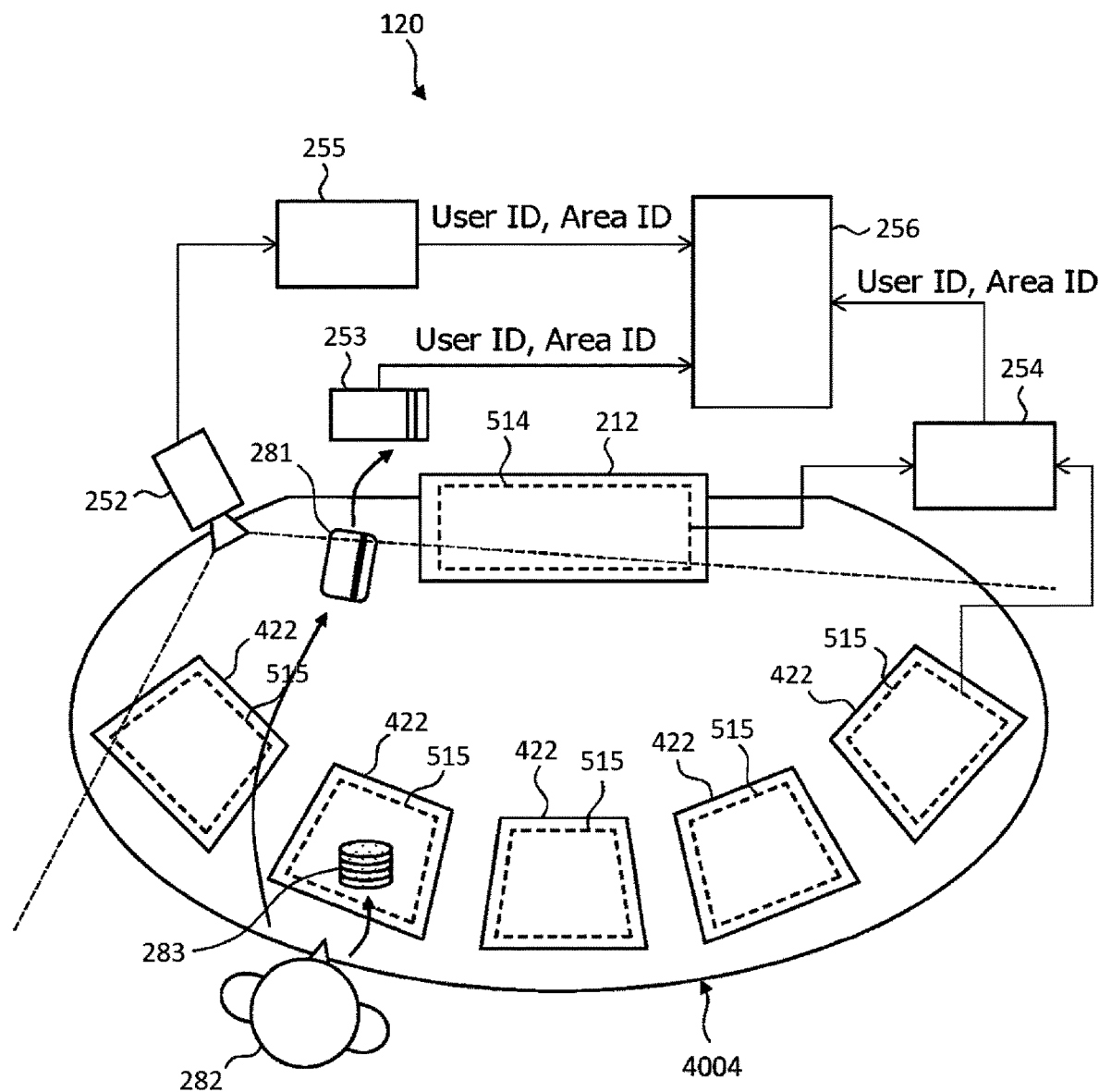
FIG. 30 is a view showing a configuration of a management system in a second example according to the fourth embodiment of the present invention.

FIG. 30 is a view showing a configuration of a management system in a second example according to the fourth embodiment of the present invention. In addition to the configuration of the first example management system 110, a player identification system is introduced in the management system 120. The player identification system includes an image recognizing system formed of a camera 252 and an image recognizing device 255, and a card certificating system formed of a card 281 and a card reader 253, but may include only one of them.

The camera 252 images the face of the player 282 positioned in the playing position and outputs the image generated by the imaging to the image recognizing device 255. The image recognizing device 255 includes a face recognition engine with a neural network in which the face images of a plurality of players 282 registered in advance (hereinafter, the registered player is also referred to as "member") was learned. The face recognition engine inputs the image from the camera 252 into the neural network to identify which of the registered members the input face image is. When judging that the image from the camera 252 is not any face of the registered members, the image recognizing device 255 outputs a result that the face image is a face image of a non-member.

The image recognizing device 255 also identifies the playing position of the member based on a position in the image in which the face is certificated. The image recognizing device 255 outputs the area ID ("Area ID" in FIG. 30) of the identified playing position together with the user ID ("User ID" in FIG. 30) of the member corresponding to the image from the camera 252. When cannot identify which member it is, the image recognizing device 255 outputs "Unknown" as the user ID.

The card reader 253 scans a membership card 281 handed to the dealer from the player 282 and reads information stored in the membership card 281. The membership card 281 is a magnetic card in which a magnetic stripe is formed, and at least the user ID of the player 282 (member) is stored in the magnetic stripe. When receiving the membership card 281 from the player 282, the dealer scans the membership card 281 using the card reader 253 and inputs the playing position of the player 282 into the card reader 253. The card reader 253 outputs the user ID ("User ID" in FIG. 30) read from the membership card 281 and the area ID ("Area ID" in FIG. 30) of the playing position input by the dealer.

The user ID and the area ID stored in the gaming substitute currency 283 and read using the antenna 515 are input to the management control device 256 from the RF control device 254, the user ID and the area ID identified based on the face image of the player are input to it from the image recognizing device 255, and the user ID obtained by reading the membership card 281 and the area ID designated by the dealer are input to it from the card reader 253.

For the same area ID, When the user ID read from the antenna 515, that is, the user ID stored as the possessor of the gaming substitute currency 283 in the gaming substitute currency 283 bet on the bet area 422 does not match the user ID read from the membership card 281 or the user ID identified by the image, that is, the player identified by the player identification system, the management control device 256 controls the RF control device 254 to rewrite the user ID stored as the possessor in the rewritable area of the gaming raja substitute currency 283 bet on the bet area 422 to the user ID of the player identified in the player identification system.

The RF control device 254 uses the antenna 515 to write the user ID of the player identified by the player identification system in the rewritable area of the RFID tag of the gaming substitute currency 283 placed in the bet area 422. At this time, the RF control device 254 also records in the rewritable area that the user ID as a possessor information is rewritten due to the discrepancy of the user IDs. Thereby, when the casino or the dealer obtains the gaming substitute currency 283, it is also possible it is possible to know that there was the discrepancy of the possessors by referring to the history of the transition in the possessor and identify the player involved in such discrepancy.

In the player identification system, only one of the identification of the players by the face recognition system and the identification of the players by reading the membership card 281 may be used. That is, the registered member does not necessarily have to identify the player by the membership card 281 when taking a seat at the playing position, and in the case, the player is identified only by the face recognition system. Even when the face of the player cannot be successfully imaged and the facial recognition cannot be performed, the player may be identified by the membership card 281.

Furthermore, the player may be identified by both of the facial recognition and the membership card 281. In this case, the user ID of the player identified by the facial recognition and the user ID of the player identified by the membership card 281 may be different. When either of those user IDs matches the user ID read from the gaming substitute currency 283, the management control device 256 controls the RF control device 254 to record in the rewritable area of the gaming substitute currency 283 that there is a discrepancy in the identifications of the player together with one user ID which does not match the user ID read from the gaming substitute currency 283.

By this example, as in the first example, the user ID stored in the gaming substitute currency 283 is also updated in accordance with the actual possessor. Furthermore, in this example, when the user ID of the player identified by the player identification system and the user ID stored in the gaming substitute currency 283 do not match with each other, the discrepancy is corrected, and it is recorded in the gaming substitute currency 283 that such discrepancy is occurred. Therefore, it is possible by referring to this record in the gaming substitute currency 283 to know that there is an exchange of the gaming substitute currencies 283 between players and to identify the players involved in such an exchange.

When cashing the gaming substitute currency 283, by using the same player identification system as above, when the user ID of the player identified by the facial recognition or the membership card 281 (the user who is to cash) differs from the user ID stored in the substitute currency 283 to be cashed, an alarm indicating it may be output, and the operator may not approve the cashing.

Figure 31:
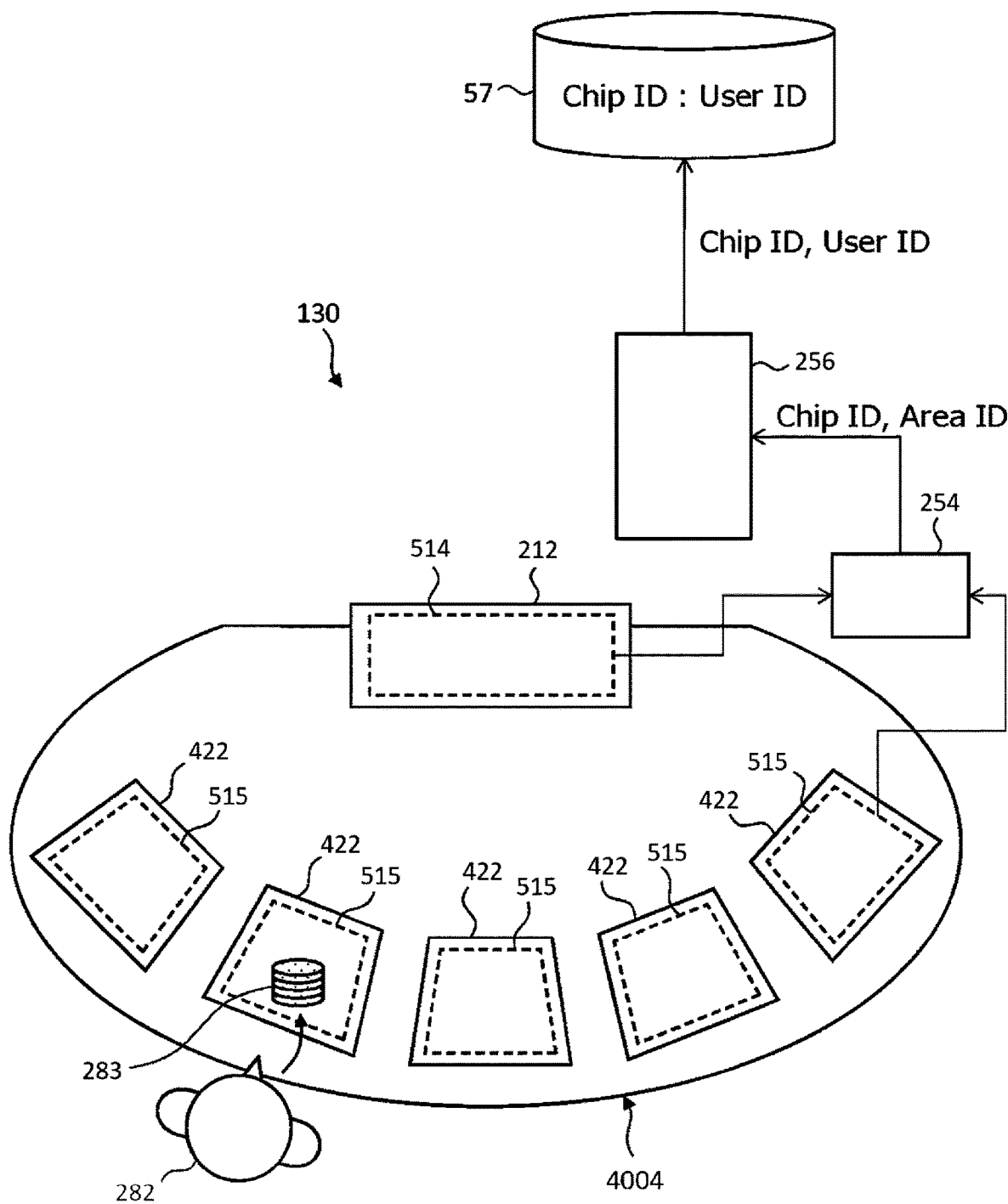
FIG. 31 is a view showing a configuration of a management system in a third example according to the fourth embodiment of the present invention.

FIG. 31 is a view showing a configuration of a management system in a third example according to the fourth embodiment. The management system 130 includes a database 57 in addition to the configuration of the first example management system 110. The chip ID ("Chip ID" in FIG. 31) uniquely identifying the gaming substitute currency 283 and the user ID of the player who possesses the gaming substitute currency 283 is stored in the database 57 in association with each other. As described above, the possessor changes as the gaming substitute currency 283 is purchased, used in the game, and cashed, but a history of the past possessors is recorded in the database 57. Therefore, it is possible by referring to the database 57 to know the transition of the possessors for each gaming substitute currency 283.

In this example, the gaming substitute currency 283 need to include only the non-writable area and need not to include the writable area. That is, at least the chip ID need to be stored in the gaming substitute currency 283. Moreover, the RF control device 254 need not have the function of writing, but may be an RF reader having only the function of reading.

The management control device 256 updates the database 57 based on the data (chip ID and area ID) of the gaming substitute currency 283 received from the RF control device 254. The method of updating database 57 is described below.

Figure 32:
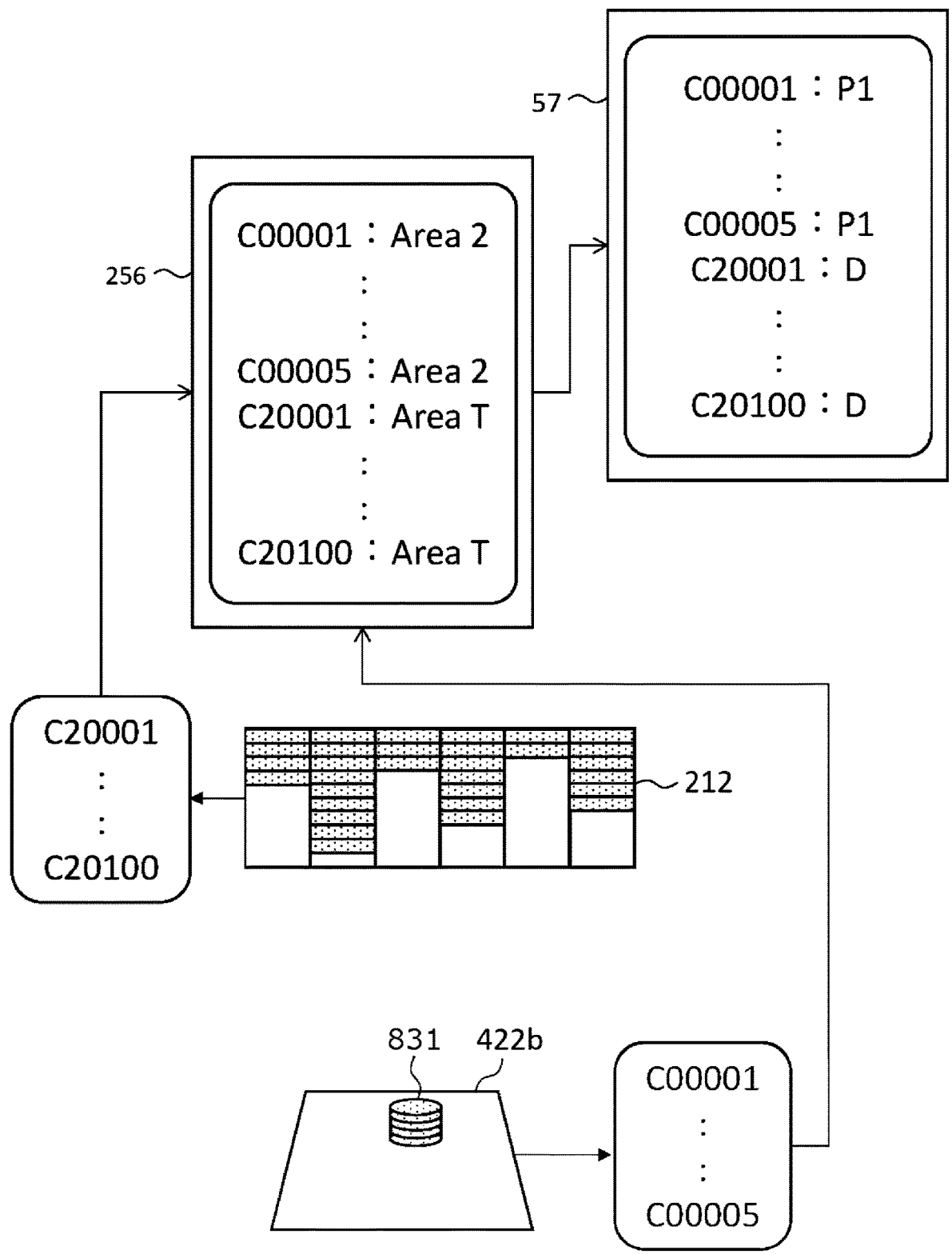
FIG. 32 is a view explaining an example of update of a database in the third example according to the fourth embodiment of the present invention.
Figure 33:
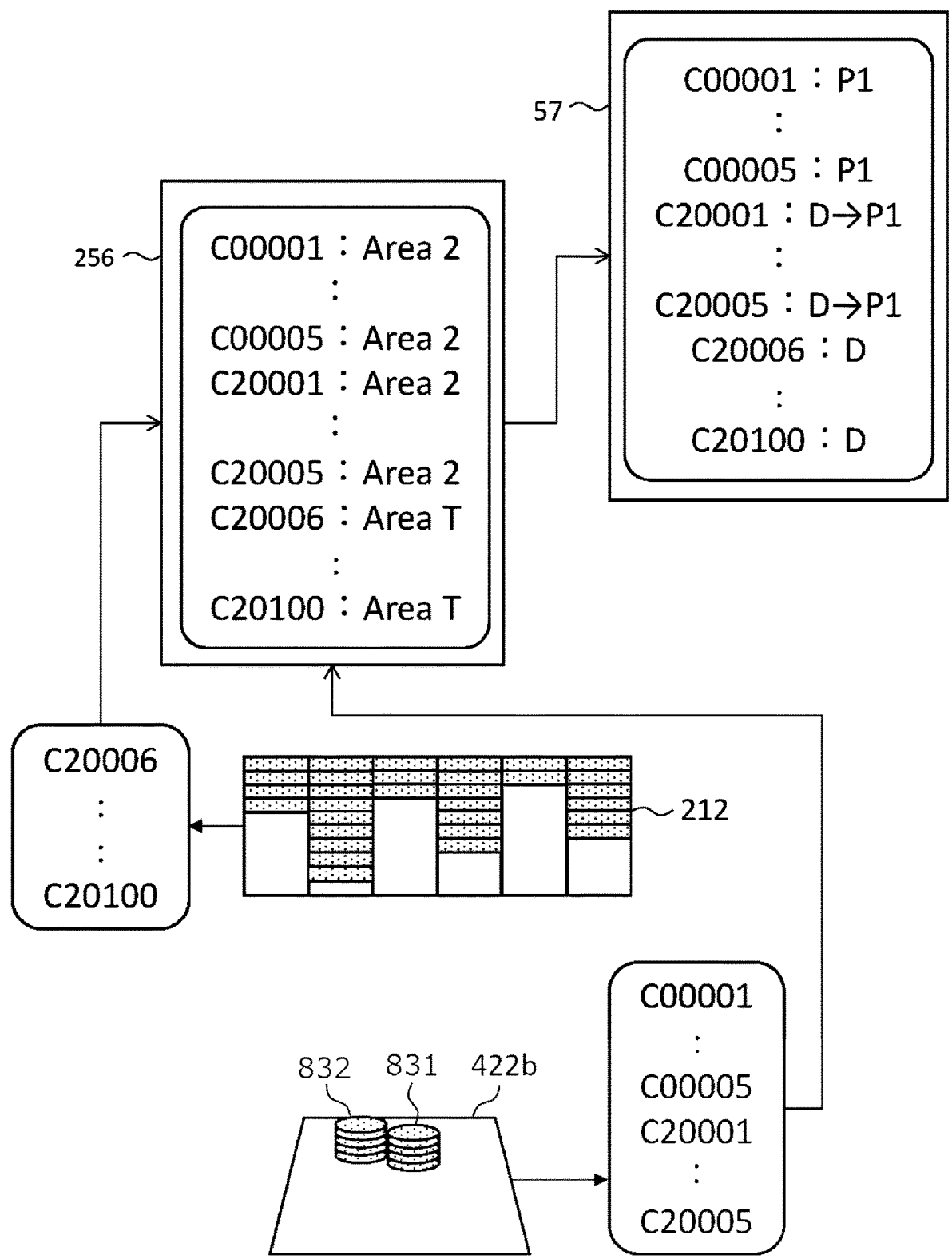
FIG. 33 is a view explaining the example of the update of the database in the third example according to the fourth embodiment of the present invention.
Figure 34:
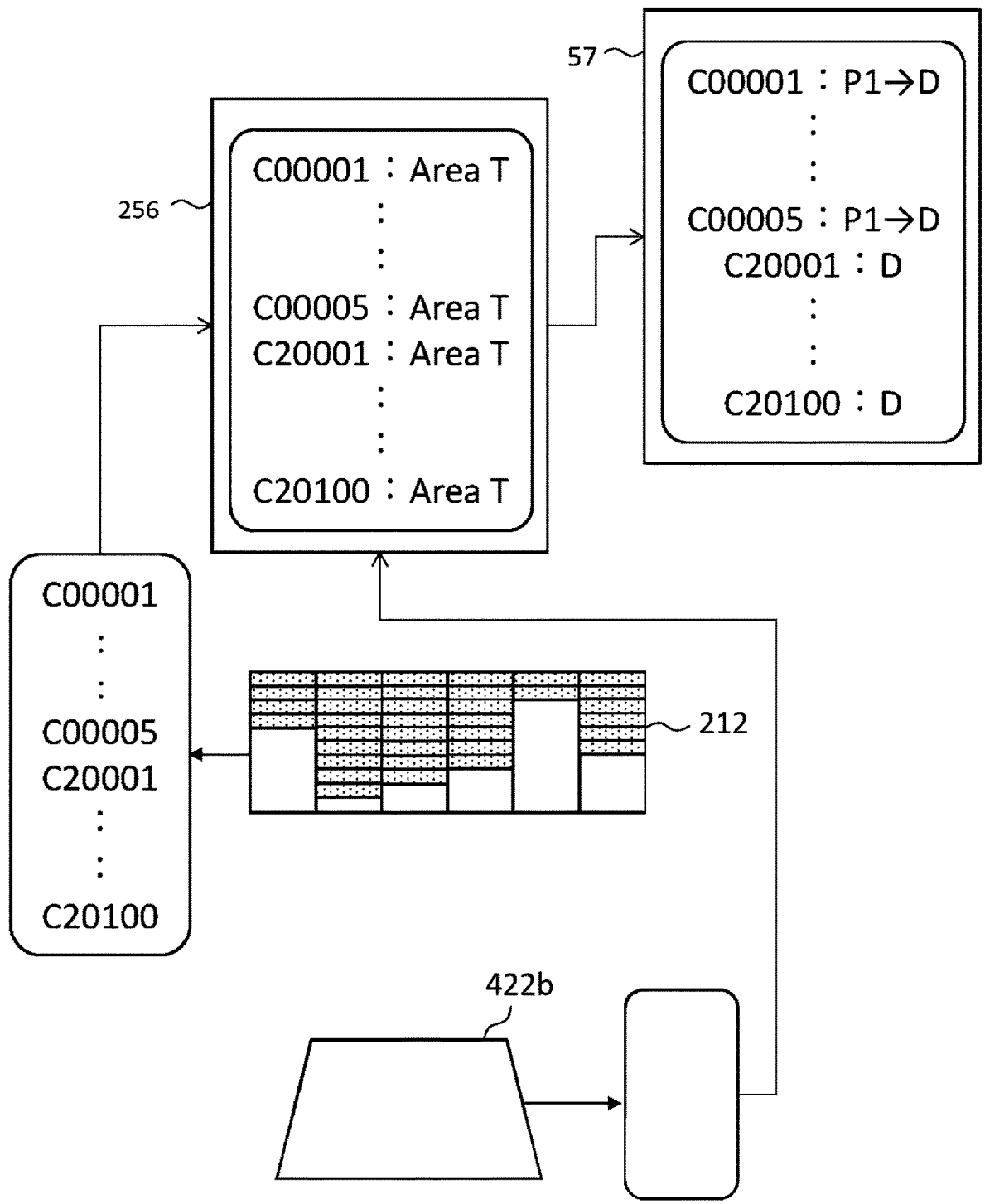
FIG. 34 is a view explaining the example of the update of the database in the third example according to the fourth embodiment of the present invention.

FIGS. 32 to 34 is a view explaining an example of update of a database. As shown in FIG. 32, the player bets the gaming substitute currencies 831 in the bet area 422*b*. The chip IDs of the betting chips 831 and the area ID of the bet area 422*b* obtained by reading the RFID tags of the betting chips 831 bet on the bet area 422*b* by the player are input to the management control device 256.

At the betting stage, as shown in FIG. 32, "C00001" to "C00005" are read as the chip IDs from the bet area 422*b* and "C20001" to "C20100" are read as the chip IDs from the chip tray 212. The RF control device 254 outputs pairs of the chip IDs read by the antennas 515 and 514 and the area IDs corresponding to the antennas 515 and 514 to the management control device 256. In the example in FIG. 32, the combination of the chip IDs "C00001" to "C00005" and the area ID "Area 2" and the combination of the chip IDs "C20001" to "C20100" and the area ID "Area T" (area ID representing the chip tray 212) are obtained in the RF control device 254, and output to the management control device 256.

When this player wins the game, as shown in FIG. 33, the payout chips 832*s* are paid out (payout) by the dealer from the chip tray 212 and placed next to the betting chip 831 in the bet area 422*b*. Then, the combination of the chip IDs "C00001" to "C00005" and "C20001" to "C20005" and the area ID "Area 2" and the combination of the chip IDs "C20006" to "C20100" and the area ID "Area T" are obtained in the RF control device 254, and output to the management control device 256.

The management control device 256 refers to the database 57 for all read chip IDs to obtain the user IDs associated with those chip IDs. Then, the management control device 256 refers to the combinations of the chip IDs and the area ID obtained from the RF control device 254, and when the user IDs are different for the plurality of chip IDs associated with the same area ID, updates the database 57 to make those user IDs the same user ID.

Specifically, when the user ID of the player and the user ID of the casino or the dealer exist as the user IDs of the plurality of substitute currencies 283 read in the same area ID of the bet area 422, the management control device 256 rewrites the user ID of the casino or dealer to the user ID of the player to unify the user IDs of the chip IDs paired with the same area ID.

On the other hand, when the player loses the game, as shown in FIG. 34, the betting chips 831 are collected by the dealer in the chip tray 212. Then, "C00001" to "C00005" as well as "C20001" to "C20100" is read from chip tray 212 as the chip IDs. The RF control device 254 obtains the pairs of this chip ID "C20001" to "C20100" and "C00001" to "C00005" and the area ID "Area T" of the chip tray 212, and output them to the management control device 256.

The management control device 256 refers to the database 57 for all read chip IDs to obtain the user IDs associated with those chip IDs. Then, the management control device 256 refers to the combinations of the chip IDs and the area ID obtained from the RF control device 254, and when the user IDs are different for the plurality of chip IDs paired with the same area ID, updates the database 57 to make those user IDs the same user ID.

Specifically, when the user ID of the player and the user ID of the casino or the dealer exit as the user IDs of the plurality of gaming substitute currencies 283 read by the area ID of the chip tray 212, the management control device 256 rewrites the user ID of the player to the user ID of the casino or the dealer to make the user IDs of all chip IDs associated with the area ID of the chip tray 212 the user ID of the casino or the dealer.

By the above processing of the management control device 256, the user IDs stored in the database 57 are updated in accordance with the actual possessor. That is, in the present embodiment, the database 57 is rewritten to unify for the gaming substitute currencies 283 associated with the different user IDs in the same area to one user ID of them in accordance with the area. Therefore, it is possible to trace the transition of the possessor by the game performed on the game table 4004 without using the player identification system described above and even when the management control device 256 does not grasp the progress situation of the game (the betting stage, the game stage, and the settlement stage).

In the above example, the management control device 256 judges for the payout chip 832 that it is the payout chip 832 based on that it is read in the bet area 422 and the user ID is "D" in the database 57, and rewrite the user ID to the user ID of the player, but alternatively, identifies the chip ID of the payout chip 832 based on a difference in the chip IDs read from the chip tray 212 before and after the payout.

For example, in the examples in FIGS. 32 and 33, before payout, as shown in FIG. 32, the chip IDs "C20001" to "C20100" are read from the chip tray 212, while after payout, as shown in FIG. 33, the chip IDs "C20006" to "C20100 are read from the chip tray 212. Therefore, the management control device 256 can judge from this difference that the chip IDs "C20001" to "C20005" are paid out.

Figure 35:
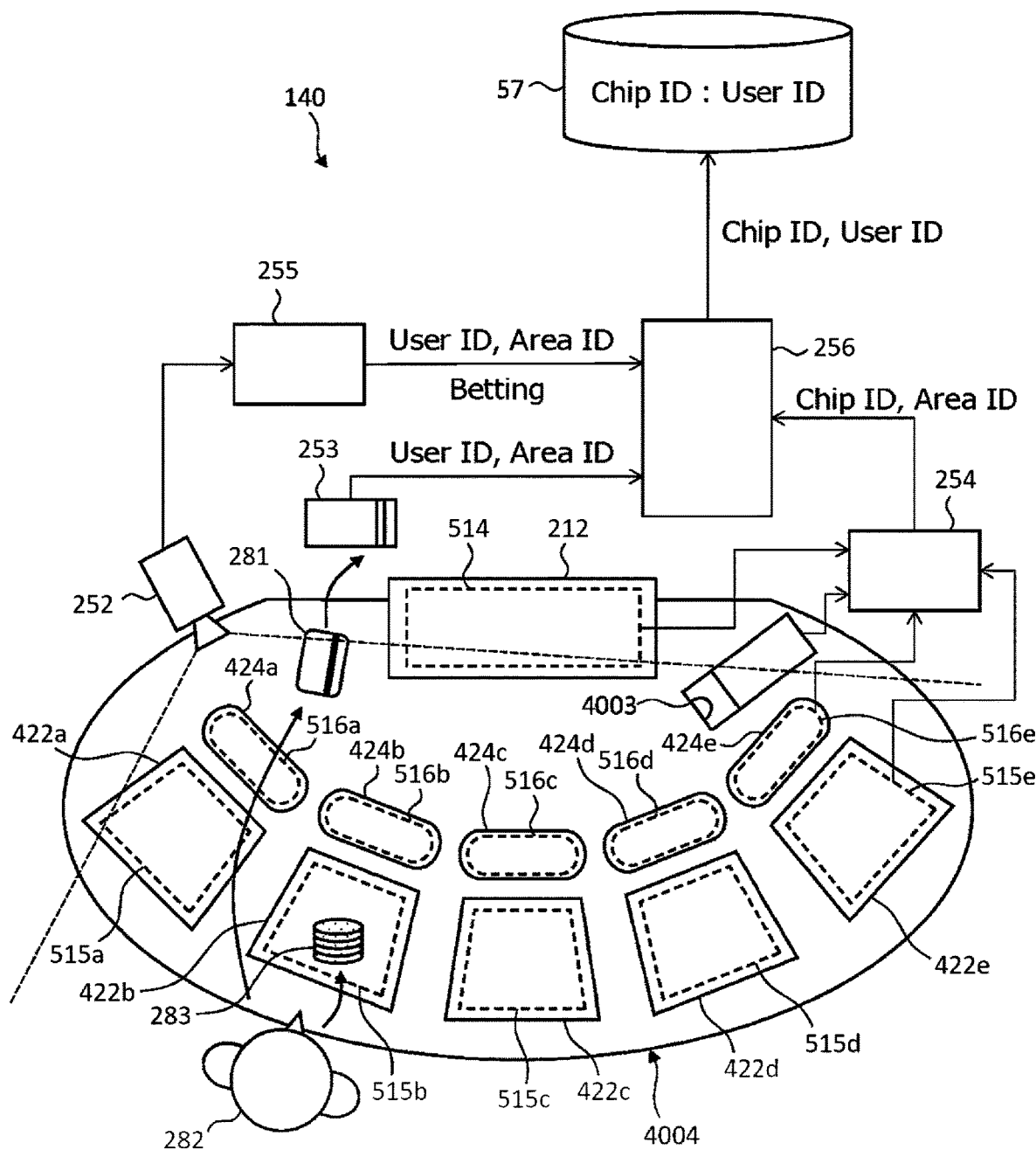
FIG. 35 is a view showing a configuration of a management system in a fourth example according to the fourth embodiment of the present invention.

FIG. 35 is a view showing a configuration of a management system in a fourth example according to the fourth embodiment. In addition to the configuration of the first example management system 110, the management system 140 includes the player identification system, the database 57, and a card distribution device (electronic shoe) 4003. Moreover, pay areas 424a-424e (hereinafter generally referred to as "pay area 424") is provided on the dealer side of the bet area 422 in each playing position in the game table 4004. In the pay areas 424a-424e, antennas 516a-516e (hereinafter generally referred to as "antenna 516") are provided corresponding to the respective areas.

When performing the payout (payout) of the gaming substitute currencies 283 to the player 282 who wins the game, the dealer positions the gaming substitute currencies 283 taken from the chip tray 212 in the pay area 424 of the winning player 282 and then places it in that bet area 422 of the player 282.

The camera 252 in this example images the betting chips 831 in the bet areas 422 as well as the players 282. The image recognizing device 255 performs image recognition processing not only on the face of the player but also on the betting chips 831 in the bet area 422, recognizes which of the bet targets (player, banker, tie, player pair, banker pair or the like) in the bet area 422 the betting chips 831 in each of the bet areas 422 is bet on, and outputs the recognition result as betting contents ("Betting" in FIG. 35).

The camera configured to image the face of the player 282 and the camera configured to image the betting chip 831 may be different cameras. The image recognizing device configured to identify the player based on the image of the face of the player and the image recognizing device configured to recognize the bet content based on the image of the betting chip 831 may be different devices.

In this example, the card distribution device 4003 judges the progress situation of the game (that is, any of during the betting, during the game, and during the settlement), and outputs the information to the RF control device 254. The card distribution device 4003 judges that the game starts when the first card is drawn, and the game ends based on the result of reading the drawn cards in accordance with a game rule of baccarat. The card distribution device 4003 also judges that the settlement is completed and the betting starts when a button of a game start is pushed.

The card distribution device 4003 judges a game result such as player win, banker win, tie, player pair, banker pair or the like in accordance with the game rule of the baccarat by reading at least ranks of the drawn cards.

The management control device 256 judges which playing position receives the payout based on the betting contents obtained from the image recognizing device 255 and the game result obtained from the card distribution device 4003. The management control device 256 also obtains the user ID of each player for each playing position from the image recognizing device 255 or the card reader 253, and so judges which player receives the payout based on this information as well.

The RF control device 254 activates the antenna 516 in the pay area 424 to perform reading and writing with respect to the RFID tags of the gaming substitute currencies 283 when the game progress situation received from the card distribution device 4003 is during the settlement.

The management control device 256 refers to the database 57, and when the user IDs associated with the chip IDs of the payout chips 832 read in the pay area 424 are the user ID of the casino or the dealer, rewrites the user IDs with the user IDs associated with the chip IDs of the betting chips 831 placed in the corresponding bet area 422 at that time.

There is a possibility that the antenna 516 in the pay area 424 reads the chip IDs of the betting chips 831 when the dealer collects the betting chip 831 of the losing player, but in this case, since the chip ID read in the pay area 424 the chip ID read in the corresponding bet area 422 immediately before that match with each other, it is judged base on this that the chip IDs are read in the pay area 424 during the collection, and in this case, the user IDs of the gaming substitute currencies 283 read in the pay area 424 is not rewritten.

In this example, the management system 140 is described as including the player identification system, the database 57, and the card distribution device (electronic shoe) 4003, but, as in the first example, in the management system not including the player identification system, the database 57, and the card distribution device (electronic shoe) 4003, the pay area 424 and the corresponding antenna 516 may be provided to update the user IDs in the same manner as in this example.

In the management system 140 in this example, the pay area 424 is provided, the reading and writing of the RFID tags of the gaming substitute currencies 283 is performed distinctly from the bet area 422, so it is possible to perform at high speed the reading and writing of the RFID tags of the payout chips 832 paid out from the chip tray 212. That is, in the case where the reading and writing are performed for the payout chips 832 using the same antenna 516 as for the betting chips 831 as in the first to three examples above, the reading and writing of the betting chips 831 is also needed for the reading and writing of the payout chips 832, and so time is taken, but in the pay area 424, the reading and writing is needed only for the payout chips 832, and so it is possible to perform the reading and writing in a relatively short time, and it is not significant interference with an operation of the game.

Figure 36:
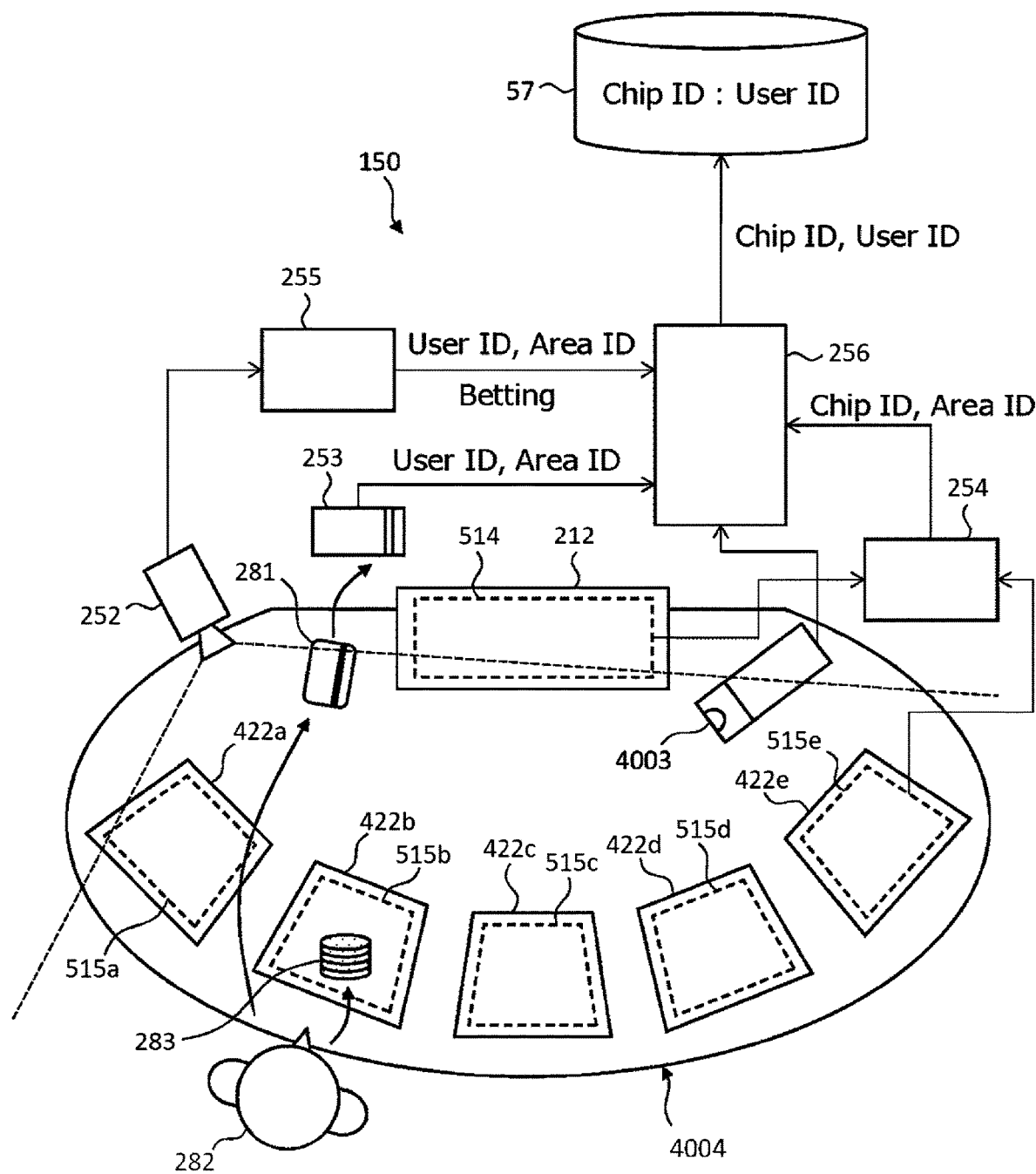
FIG. 36 is a view showing a configuration of a management system in a fifth example according to the fourth embodiment of the present invention.

FIG. 36 is a view showing a configuration of a management system in a fifth example according to the fourth embodiment. The management system 150 has the same configuration as the fourth example management system 140 shown in FIG. 35. That is, in addition to the configuration of the first example management system 110, the management system 150 includes the player identification system, the database 57, and the card distribution device (electronic shoe) 4003.

The camera 252 in this example images the betting chips 831 in the bet areas 422 as well as the players 282. The image recognizing device 255 performs the image recognition processing not only on the face of the player but also on the betting chips 831 in the bet area 422 to recognize which of the bet targets (the player, the banker, the tie, the player pair, the banker pair or the like) in the bet area 422 the betting chips 831 in each bet area 422 are placed on. The system recognizes which of the bet targets (player, banker, tie, player pair, banker pair or the like) in the 422 bet areas is being placed, and outputs the recognition result as the betting contents ("Betting" in FIG. 33).

The camera configured to image the face of the player 282 and the camera configured to image the betting chip 831 may be different cameras. The image recognizing device configured to identify the player based on the image of the face of the player and the image recognizing device configured to recognize the betting contents based on the image of the betting chip 831 may be different devices.

The card distribution device 4003 reads at least the ranks of the cards drawn in sequence to judge the game result including the player win, the banker win, the ties, the player pairs, and the banker pairs in accordance with the game rule of the baccarat.

The management control device 256 judges which playing position receives the payout (payout) based on the betting contents obtained from the image recognizing device 255 and the game result obtained from the card distribution device 4003. The management control device 256 also obtains the user ID of each player for each playing position from the image recognizing device 255 or the card reader 253, and so judges which player receives the payout (payout) based on this information as well.

The management control device 256 receives from the RF control device 254, for each bet area 422, the pair of the area ID of the bet area 422 and the chip IDs of the betting chips 831 read at that bet area 422. The management control device 256 judges which playing position receives the payout as described above, and so refers to the database 57 to obtain the user IDs associated with the chip IDs read at the playing position to receive the payout, and updates the user ID associated with the chip IDs of the payout chips 832s with that obtained user IDs.

The management control device 256 recognizes the chip IDs that is no longer read from the chip tray 212 before and after the payout as the chip IDs of the payout chips 832. When there is a plurality of players to receive the payouts, the dealer pays out in order in a predetermined direction from the end (e.g., performing the payout in order from the end on the right hand side of the dealer toward the end on the left hand side thereof). Thereby, even when there is the plurality of players to receive the payouts, it is possible to judge which playing position or player the payout chips 832s removed from the chip tray 212 is removed in order to pay out to.

The management control device 256 can judge the playing position of the losing player, and so updates the database 57 so as to make the user IDs associated with the chip IDs read from the bet area 422 of that playing position "D" representing the casino or the dealer.

As described above, in this example, the management control device 256 can judge which player or playing position the betting chips 831 pay out to and which player or playing position the betting chips 831 is collected from by grasping the bet contents and the game result, and also identify the chip IDs of those betting chips 831 and payout chips 832, and so can judge which chip IDs the user IDs associated with should be changed and which user IDs they should be changed to. Thereby, it is possible to performing the tracing of the possessor of the gaming substitute currency 283.

Figure 37:
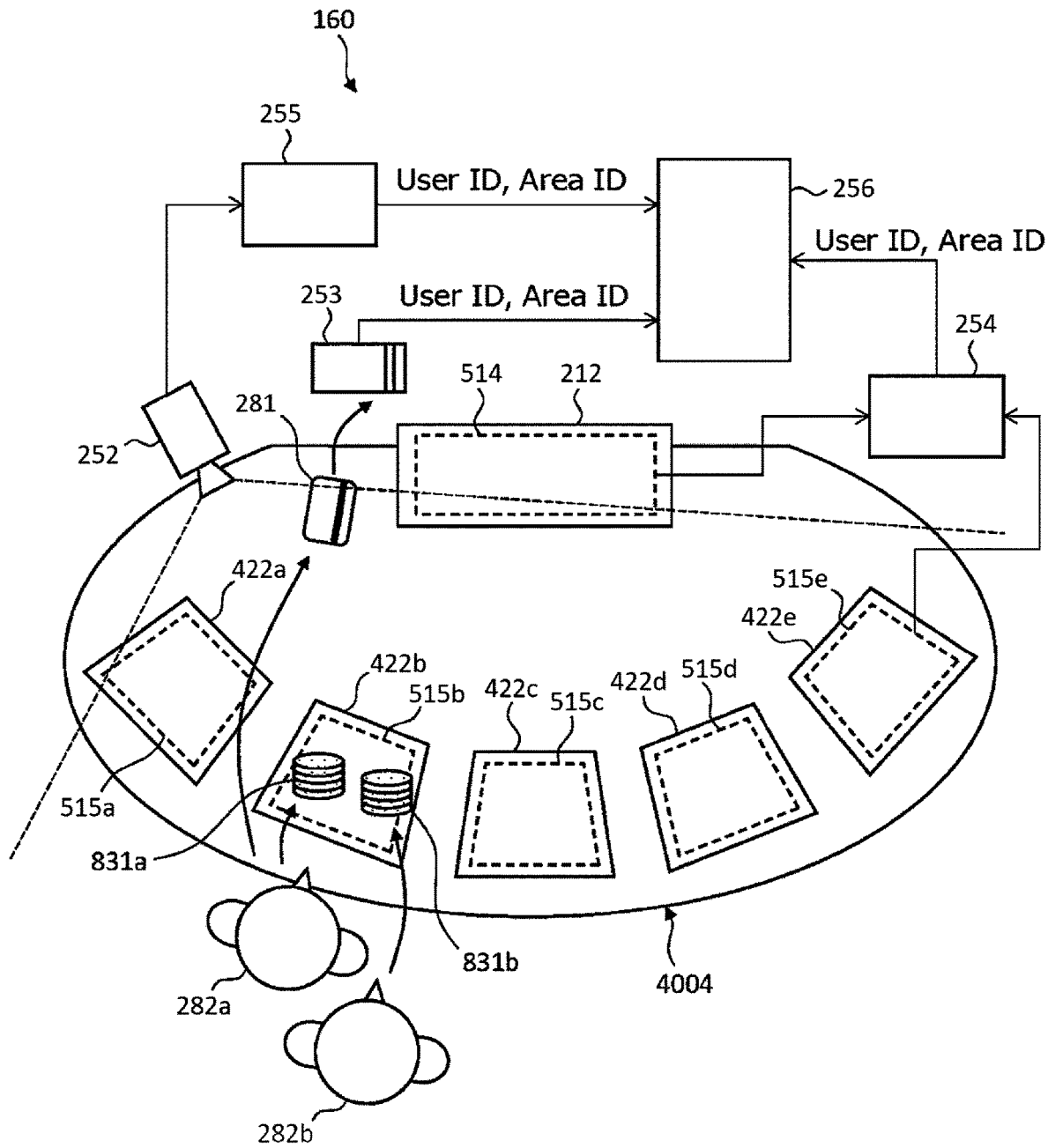
FIG. 37 is a view showing a configuration of a management system in a sixth example according to the fourth embodiment of the present invention.

FIG. 37 is a view showing a configuration of a management system in a sixth example according to the fourth embodiment. The management system 160 includes the same configuration as in the second example. In the baccarat, as described above, a plurality of playing positions is provided in the game table 4004, and the bet area 422 is provided for each playing position at the location corresponding to each playing position in the game table 4004. In principle, one player plays in one playing position.

However, when all playing positions are filled, a player who bet from behind the player playing in the playing position (sitting player) on the bet area 422 assigned to that sitting player (back-betting players) may appear, and such betting is permitted in some casinos or play tables 4004. By the back betting, a plurality of gaming substitute currencies 283 with different user IDs is bet on the same bet area. The management system 160 in this example enables the tracing of the possessor of the gaming substitute currency 283 even in such case.

In the management system 160 in this example, as in the second example, the user ID of the gaming substitute currency 283 is stored in the rewritable area of the RFID tag of the substitute currency 283, and no database is used. However, it includes the player identification system configured to identify the player.

Figure 38:
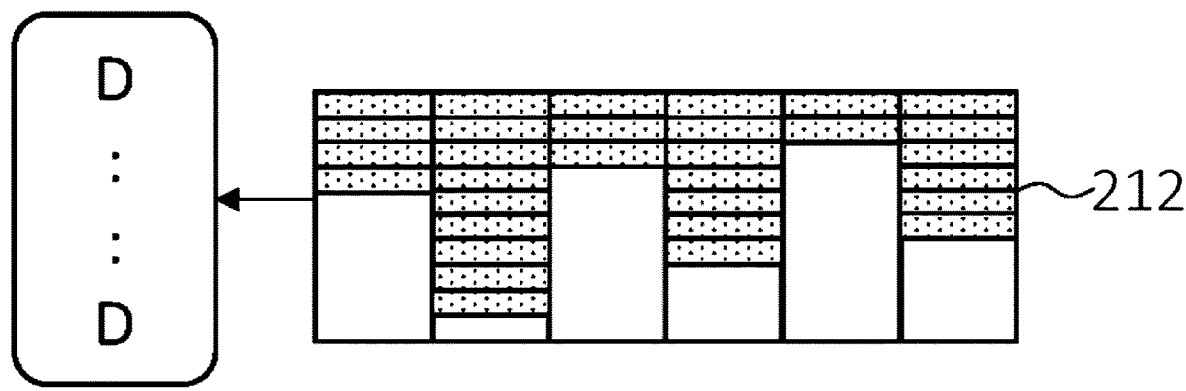
FIG. 38 is a view explaining an example of update of variable information in the sixth example according to the fourth embodiment of the present invention.
Figure 38:
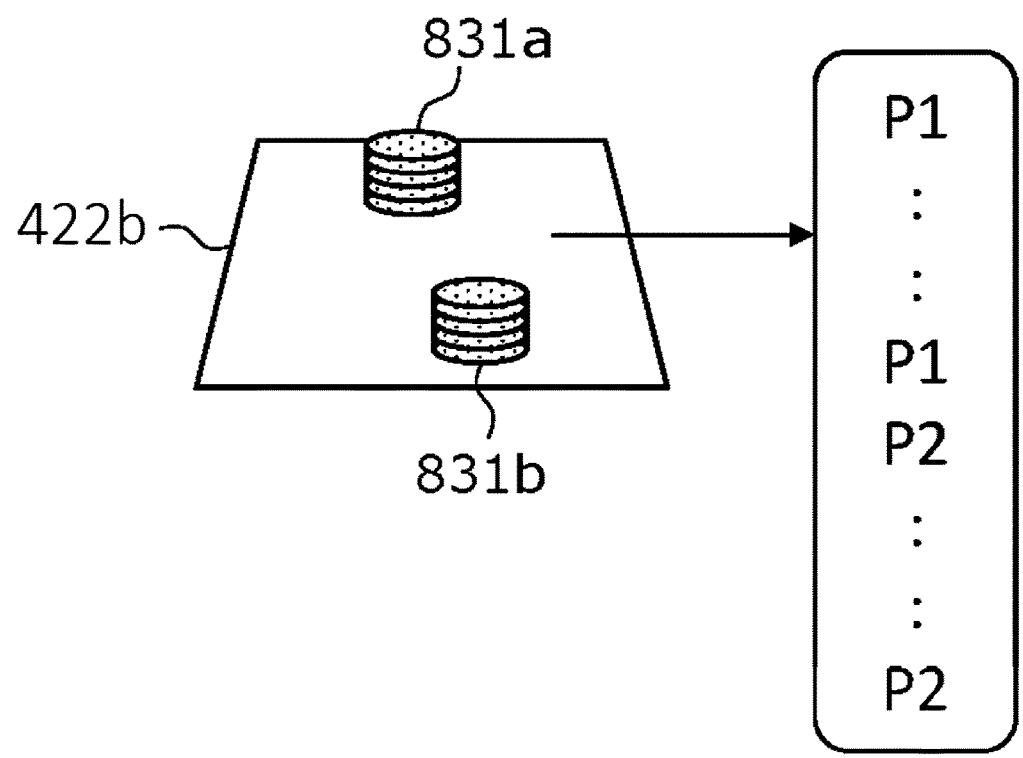

In the example in FIG. 38, the betting chips 831a with the user ID "P1" and the betting chips 831b with the user ID "P2" are bet in the same bet area 422b. At this time, "P1" and "P2" are read from the bet area 422b as the user IDs of the gaming substitute currencies 283.

Figure 39:
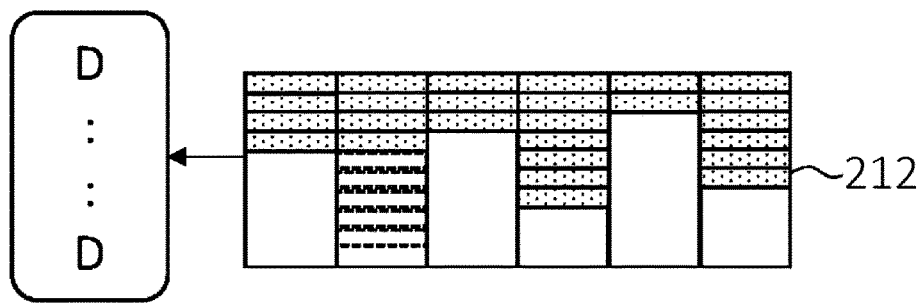
FIG. 39 is a view explaining the example of the update of the variable information in the sixth example according to the fourth embodiment of the present invention.
Figure 39:
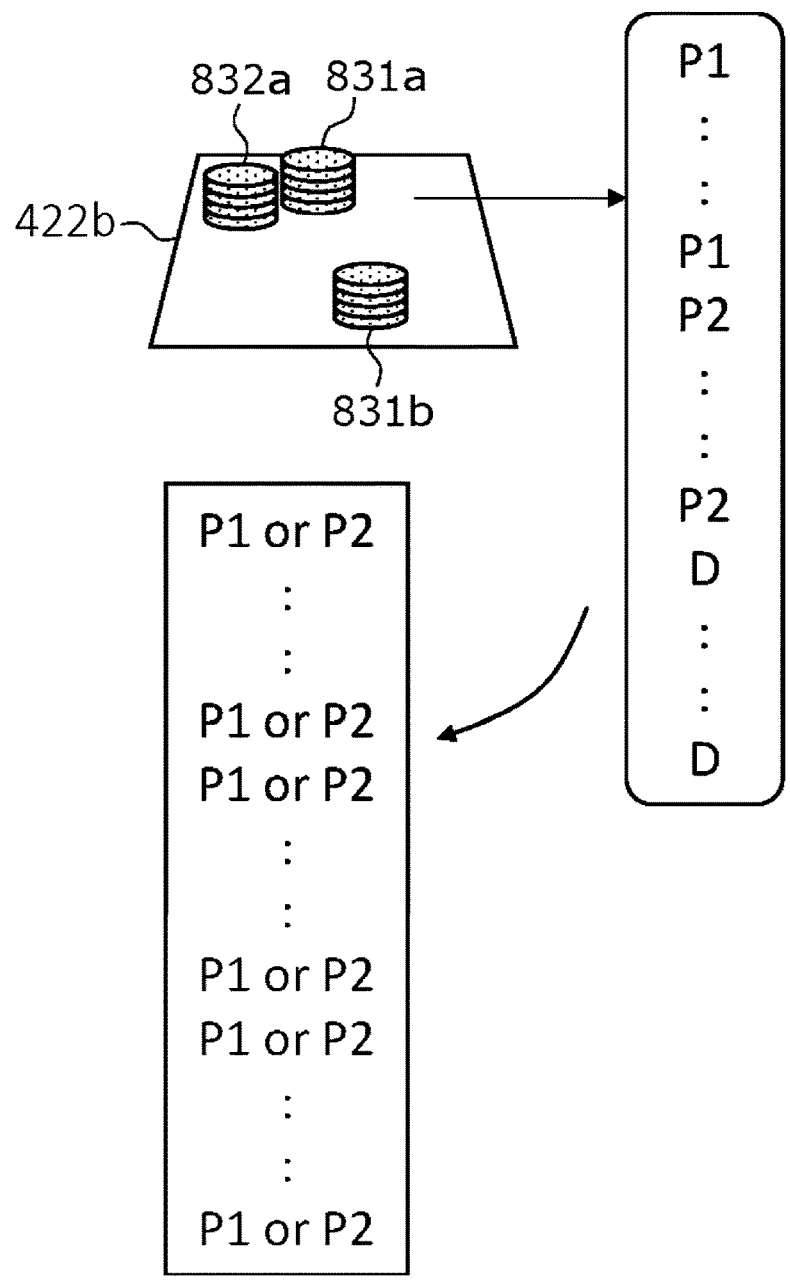
Figure 40:
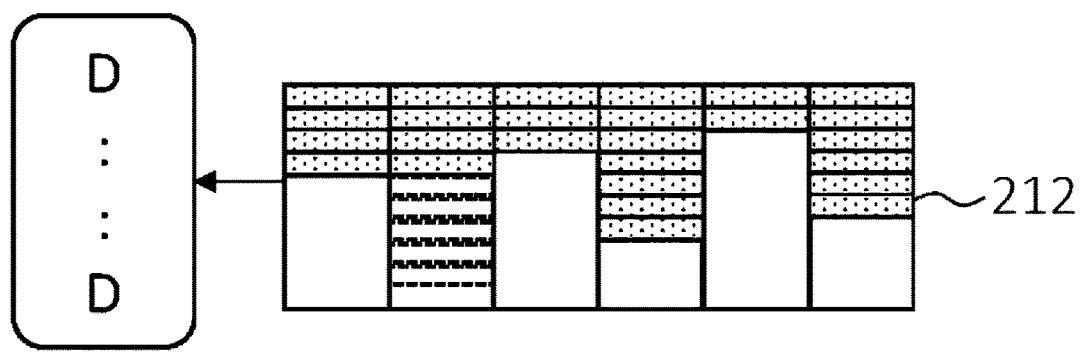
FIG. 40 is a view explaining the example of the update of the variable information in the sixth example according to the fourth embodiment of the present invention.
Figure 40:
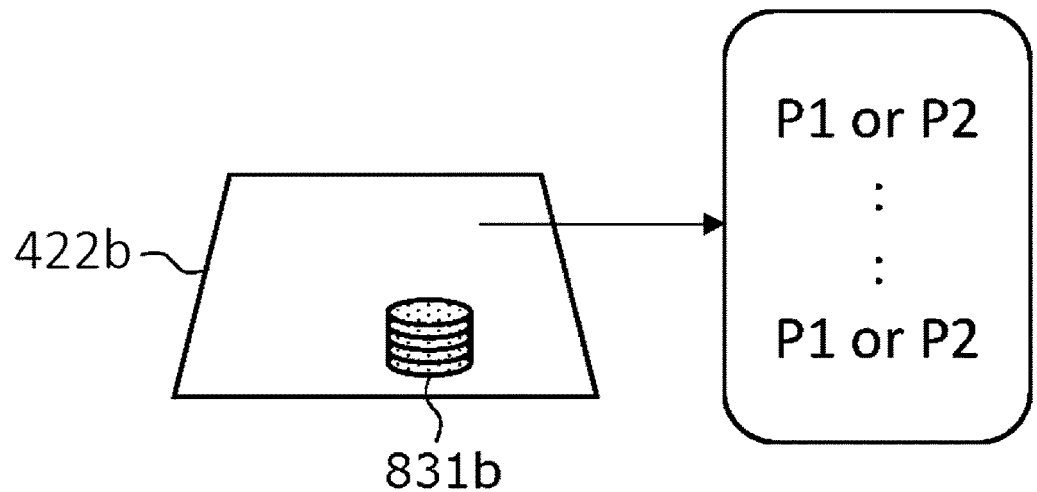
Figure 41:
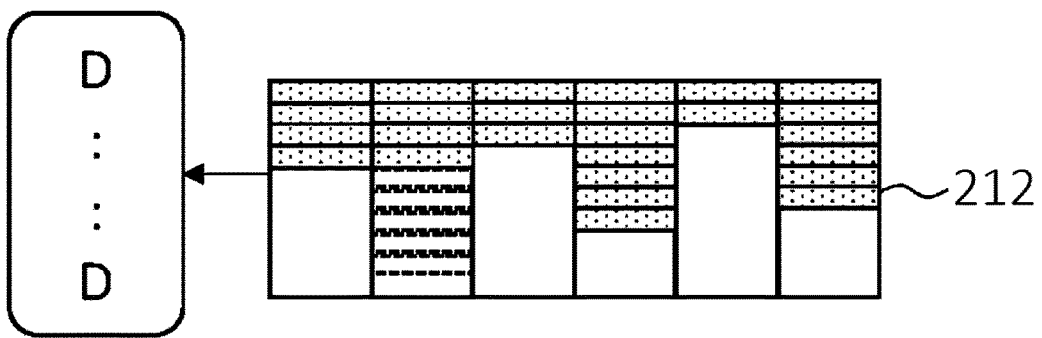
FIG. 41 is a view explaining the example of the update of the variable information in the sixth example according to the fourth embodiment of the present invention.
Figure 41:
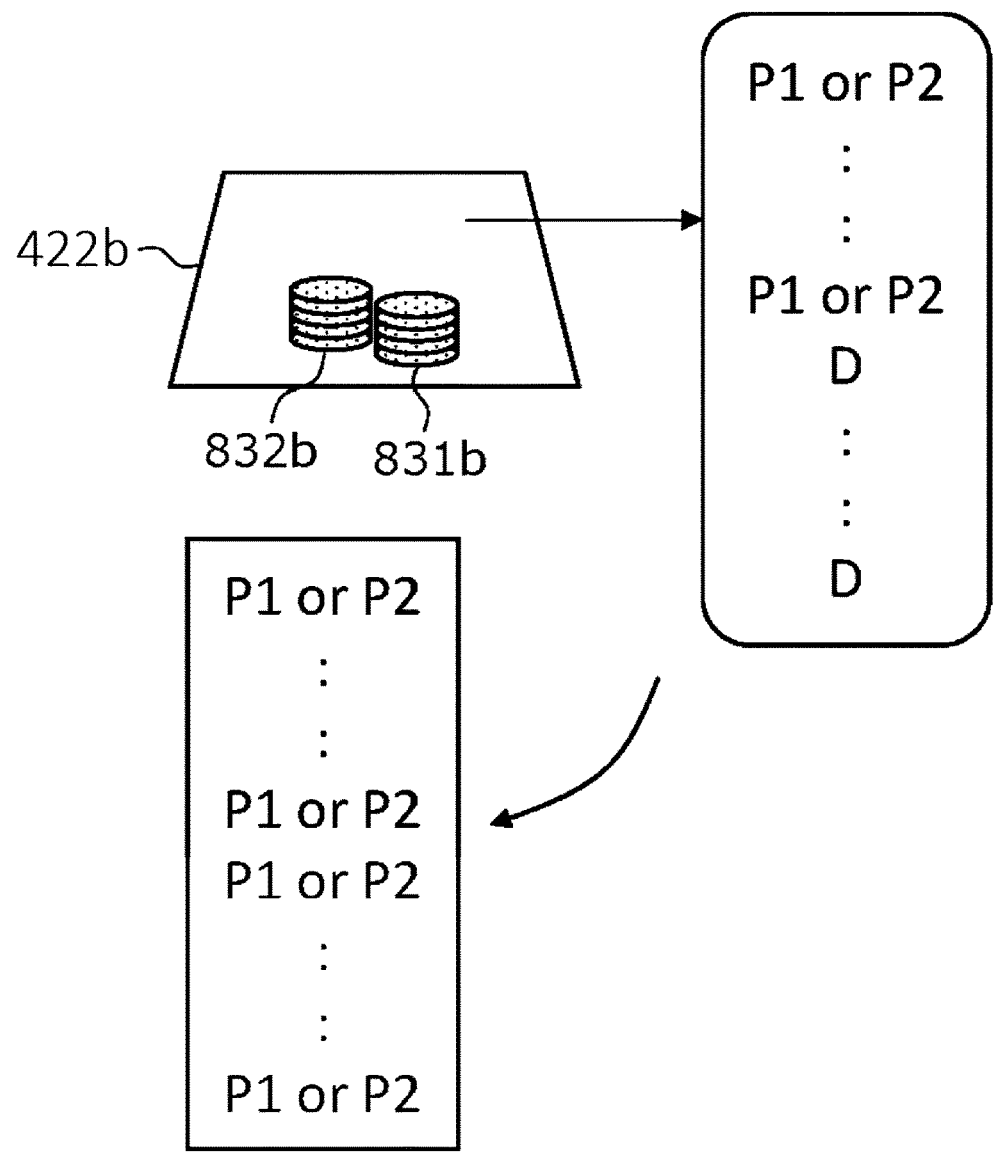

FIGS. 39-41 is a view explaining an example of payout when both players win the game. First, as shown in FIG. 38, the payout is performed for the player 282a with the user ID "P1." At this time, the management system 160 is unable to distinguish whether the payout is performed to the player 282a with the user ID "P1" or to the player 282b with the user ID "P2," and make the writing information different for the plurality of gaming substitute currencies in one bet area 422, and so the management control device 256 controls the RF control device 254 to rewrite the user ID to the selective information "P1 or P2" for all gaming substitute currencies 283 in the bet area 422b.

When the player 282a takes own betting chip 831a and the payout chips 832a from the bet area 422b, the bet chips 831b whose user IDs are "P1 or P2" remains in the bet area 422b, as shown in FIG. 40. The dealer confirms that the player 282a took the gaming substitute currencies 283 and pays out the payout chips 832b whose user IDs are "D" for the bet chips 831b, as shown in FIG. 41. At this time, the management control device 256 controls the RF control device 254 to rewrite the user ID to "P1 or P2" for all gaming substitution currencies 283 in the bet area 422.

Thereby, both players 282a and 282b who bet in the same bet area 422 own the gaming substitute currencies 283 in which "P1 or P2" is recorded as the user ID.

When these players 282a and 282b again bet on the same bet area 422 using those gaming substitute currency 283, "P1 OR P2" is recorded as the user ID in both betting chips 831a and 831b. Alternatively, the gaming substitute currency 283 whose user ID is "P1" or "P2" may be included in some of the betting chips. In these cases, when performing the payout in accordance with the game result, the management control device 256 controls the RF control device 254 to selectively write "P1 or P2" as the user ID for all gaming substitute currencies 283 placed in the bet area 422 during the payout.

When the betting chip 831 whose user ID is "P1 or P2" is collected in chip tray 212, "D" representing the casino or the dealer is written as the user ID.

Then, when the player 282*a*, 282*b* alone bets on the bet area 422 the gaming substitute currency 283 in which the user IDs of the plurality of users are selectively recorded, and when the user ID of the player identified by the player identification system matches one of these choices of the user IDs, the management control device 256 controls the RF control device 254 to rewrite the selective user IDs of the gaming substitute currency 283 to that matching user ID.

For example, when the player 282*a* alone bets on the bet area 422 the gaming substitute currency 283 in which "P1 or P2" is recorded as the user ID, the user ID "P1 or P2" is read from the betting chip 831 in the bet area 422 by the RF control device 254, and it is recognized by the player identification system that the user ID of the player who bet on the bet area 422 is "P1." In this case, since the user IDs "P1" match with each other, the management control device 256 controls the RF control device 254 to rewrite the user ID of the betting chip 831 in the bet area 422 to "P1."

On the other hand, when the player who possesses the gaming substitute currency 283 whose user ID is selectively recorded bets and another player whose user ID is not included among the choices bets in the same bet area 422, and when the former player receives the payout in accordance with the game result, the user ID of the gaming substitute currency 283 is selectively written to include that the user ID of the latter player as the choice.

For example, when the player 282*a* bets on the bet area 422 the gaming substitute currency 283 in which "P1 or P2" is recorded as the user ID, and another player bet in the same bet area 422 the gaming substitute currency 283 in which "P3" is recorded as the user ID, and when performing the payout in accordance with the game result, the management control device 256 controls the RF control device 254 to rewrite the user IDs of all gaming substitute currencies 283 including the payout chips in the bet area 422 to "P1 or P2 or P3."

As described above, in this example, since the selective recording as user ID is permitted, it is possible to trace the possessor even when the plurality of players bet on the same bet area. Furthermore, it is possible by using the player identification system to rewrite the selectively recorded user ID fixedly.

When the plurality of players bets on the same bet area 422, and some of them win and some of them lose, the betting chips of the losing players are collected first, and so "D" is recorded as the user ID for the collected betting chips when read in the chip tray 212, and the above processing may be performed for the betting chips that receives the payout chips 832 and the payout chips that are paid out to them.

Figure 42:
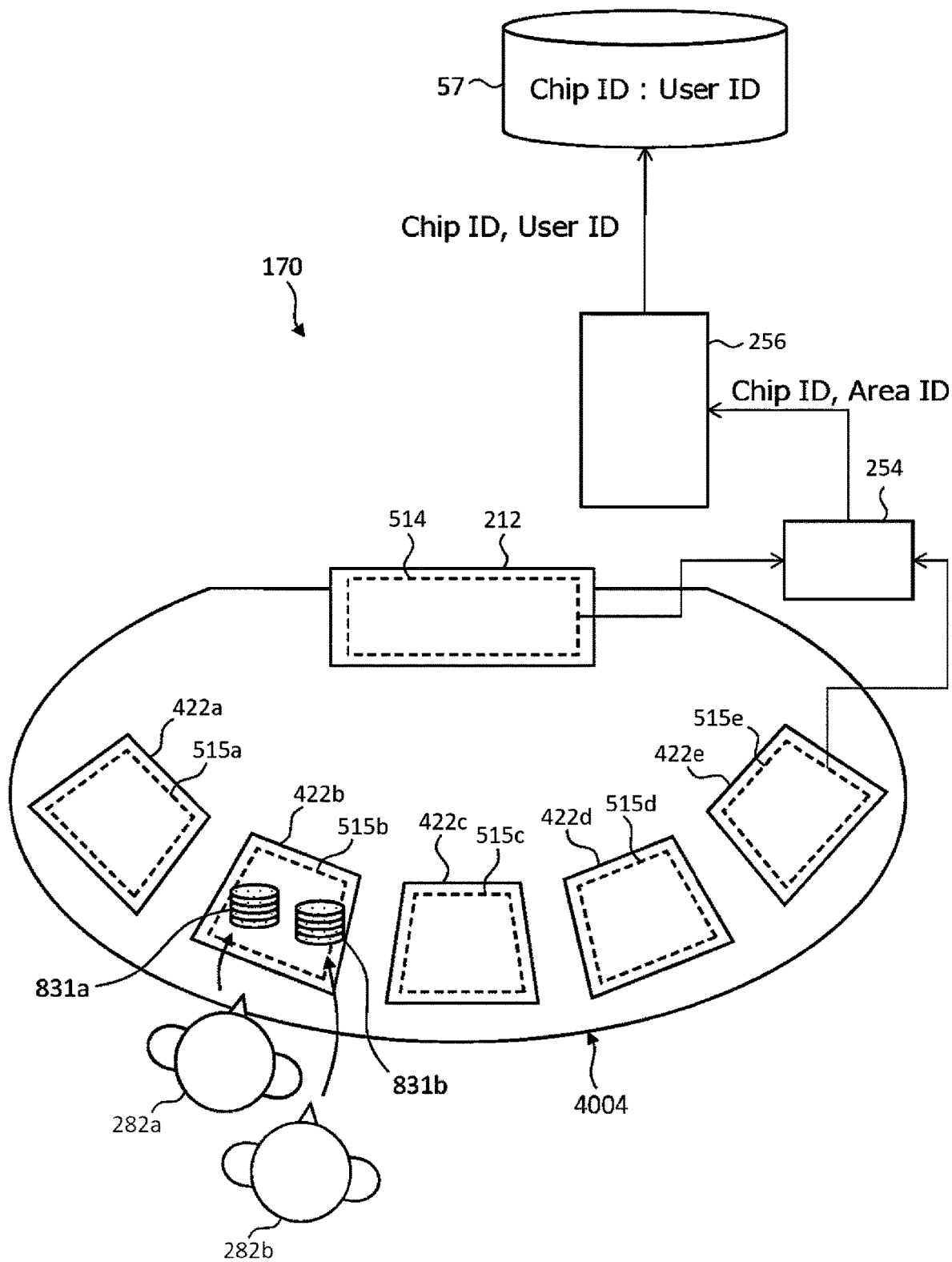
FIG. 42 is a view showing a configuration of a management system in a seventh example according to the fourth embodiment of the present invention.

FIG. 42 is a view showing a configuration of a management system in a seventh example according to the fourth embodiment. The management system 170 includes the same configuration as the third example management system 130. In the management system 170, it is possible to trace the possessor of the gaming substitute currency 283 even when the plurality of players bet on the same bet area 422.

Figure 43:
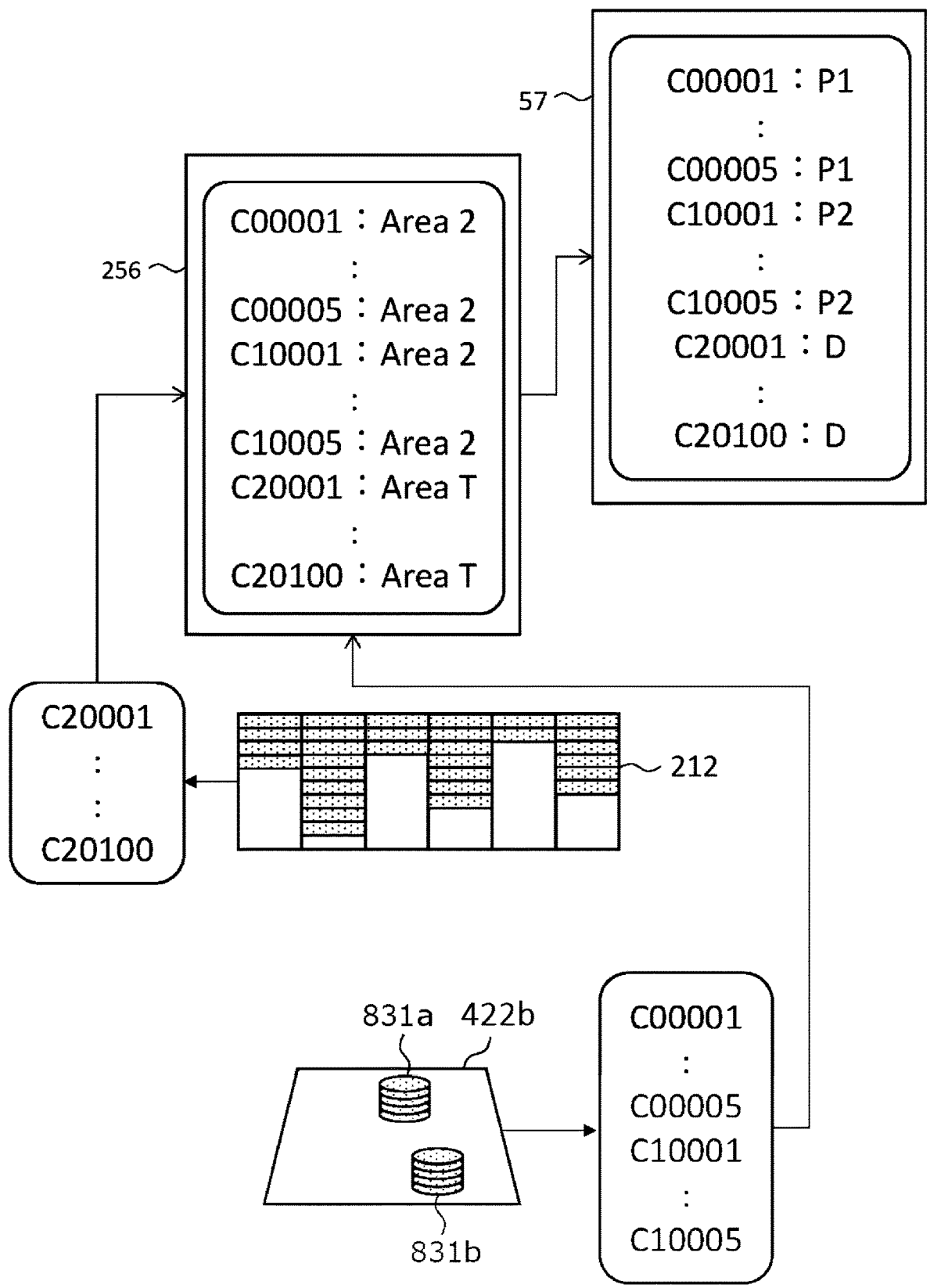
FIG. 43 is a view explaining an example of update of a database in the seventh example according to the fourth embodiment of the present invention.

FIGS. 43-47 is a view explaining an example of update of the database 57. When the player 282*a* bets the betting chip 831*a* in the bet area 422*b* and the player 282*b* bets the betting chip 831*b* in the same bet area 422*b*, as shown in FIG. 43, the chip IDs of the betting chip 831*a* "C00001" to "C00005" and the chip IDs of the betting chip 831*b* "C10001" to "C10005" are read out as the user ID from this bet area 422*b* in RF control device 254, and output to the management control device 256 as a combination with the area ID "Area 2" of the bet area 422. Moreover, the chip IDs "C20001" to "C20100" are read from the chip tray 212, and a combination with the area ID "Area T" is obtained in the management control device 256.

As shown in FIG. 43, at this point, in database 57, the user ID "P1" is associated with the chip IDs "C00001" to "C00005," the user ID "P2" is associated with the chip IDs "C10001" to "C10005," and the user ID "D" is associated with the chip IDs "C20001" to "C20100."

Figure 44:
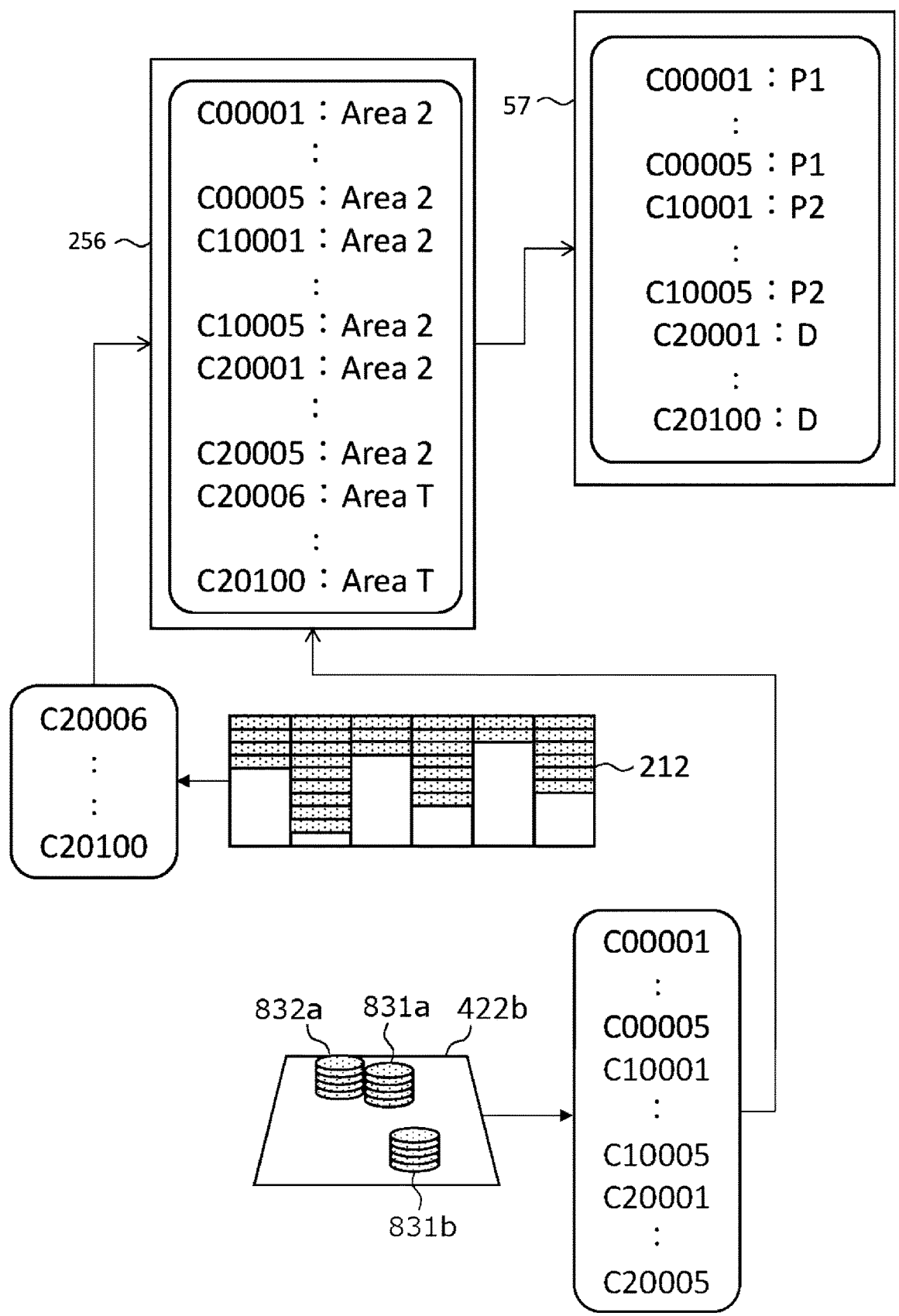
FIG. 44 is a view explaining the example of the update of the database in the seventh example according to the fourth embodiment of the present invention.
Figure 45:
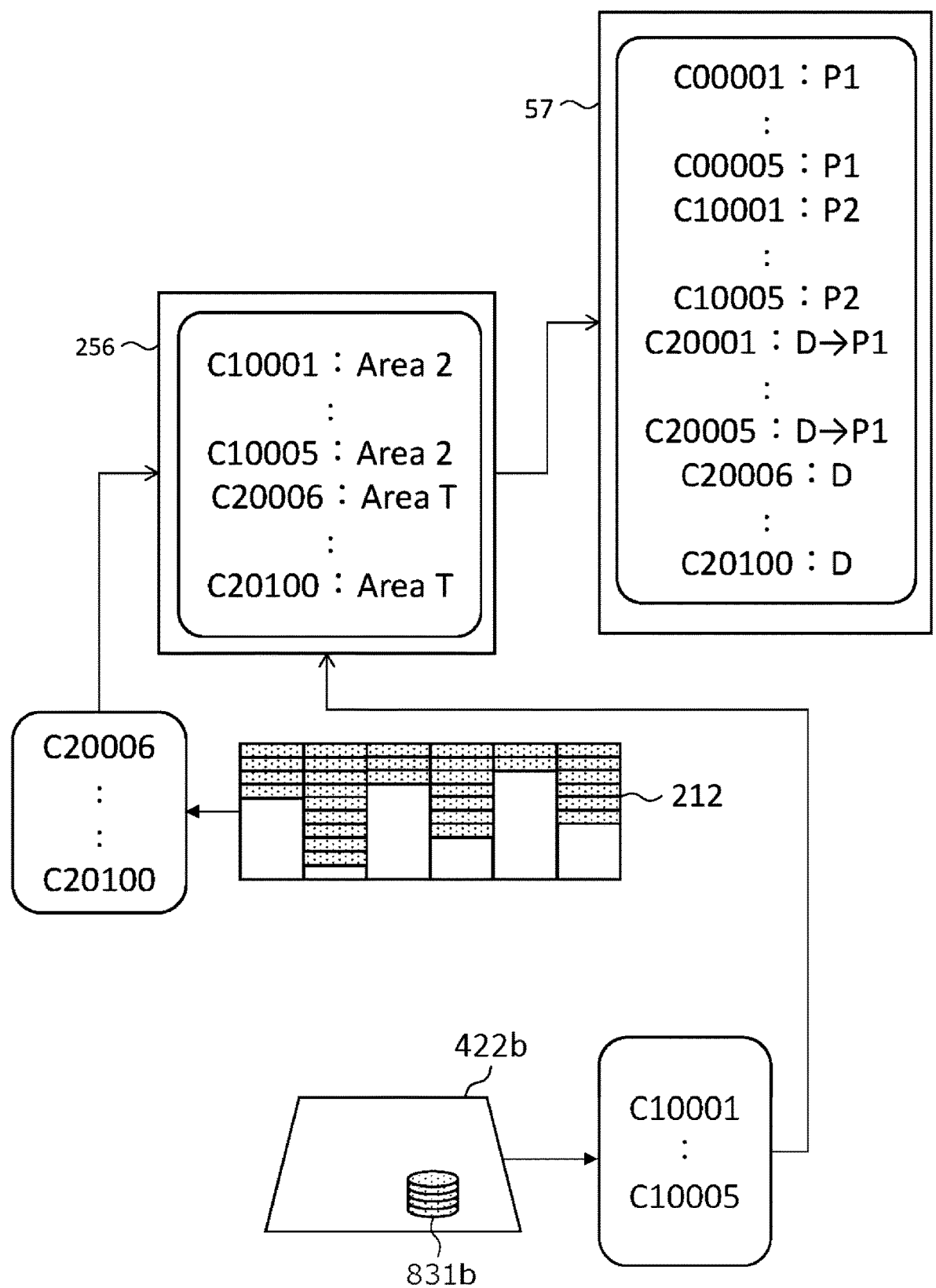
FIG. 45 is a view explaining the example of the update of the database in the seventh example according to the fourth embodiment of the present invention.

When both of these players 282*a* and 282*b* win as the result of the game, as shown in FIG. 44, the payout is first performed by the dealer for either betting chip 831*a* or betting chip 831*b*. At this time, the chip IDs of the payout chips 832*a* "C20001" to "C20005" in addition to the chip IDs of the betting chips 831*a* "C00001" to "C00005" and the chip IDs of the betting chip 831*b* "C10001" to "C10005" are read from the bet area 422*b*, and output to the management control device 256 as a combination with the area ID of the bet area 422 "Area 2."

At this stage, the management control device 256 is still unable to judge which the payout chips 832*a* is paid out for the betting chips 831*a* with the chip IDs "C00001" to "C00005" or the betting chips 831*b* with the chip IDs "C10001" to "C10005," and so does not perform the update of the database 57.

Next, when the player 282*a* takes the betting chips 831*a* and the payout chips 832*a* paid out for it from the bet area 422*b*, as shown in FIG. 44, only chip IDs of the remaining betting chips 831*b* "C10001" to "C10005" are read. The management control device 256 judges that the payout chips 832*a* with the chip IDs "C20001" to "C20005" read in the bet area 422*b* is paid out for the betting chips 831*a* with the chip IDs "C00001" to "C00005" based on this change, and then rewrite the user IDs associated with the chip IDs "C20001" to "C20005" in database 57 from "D" to "P1," that is, the user ID associated with the betting chip 831*a* removed from the bet area 422*b* together with the payout chip 832*a* with the chip IDs "C20001" to "C20005."

Figure 46:
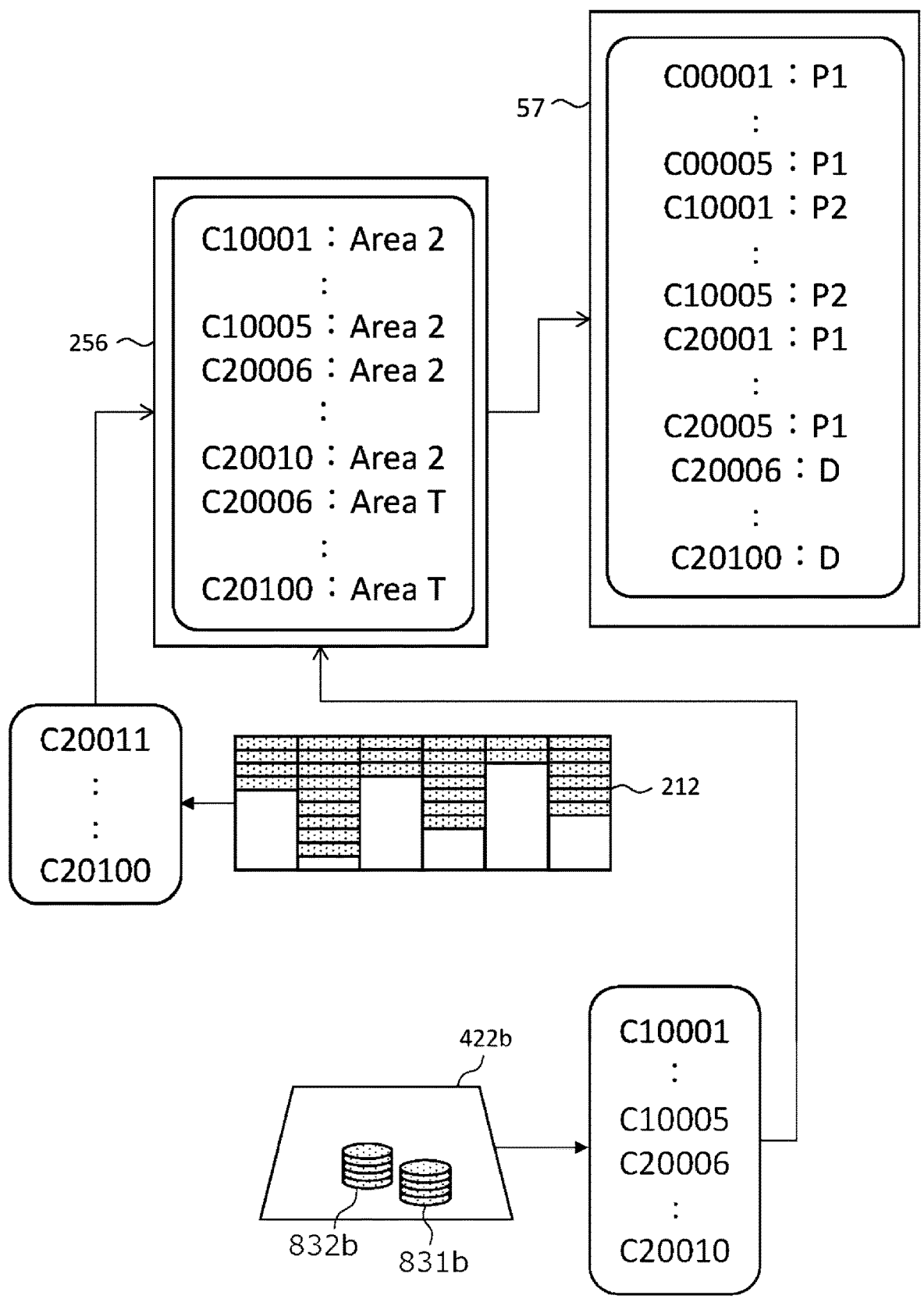
FIG. 46 is a view explaining the example of the update of the database in the seventh example according to the fourth embodiment of the present invention.

The dealer confirms that the betting chips 831*a* and the payout chips 832*a* paid out for them are removed from the bet area 422*b*, and then pays out the payout chips 832*b* for the betting chips 831*b* in the same bet area 422*b*, as shown in FIG. 46. In doing so, the chip IDs of the betting chips 831*b* "C10001" to "C10005" and the chip IDs of the payout chips 832*b* "C20006" to "C20010" are read from the bet area 422*b*, and recorded in the management control device 256 in combination with the area ID of the bet area 422 "Area 2."

Figure 47:
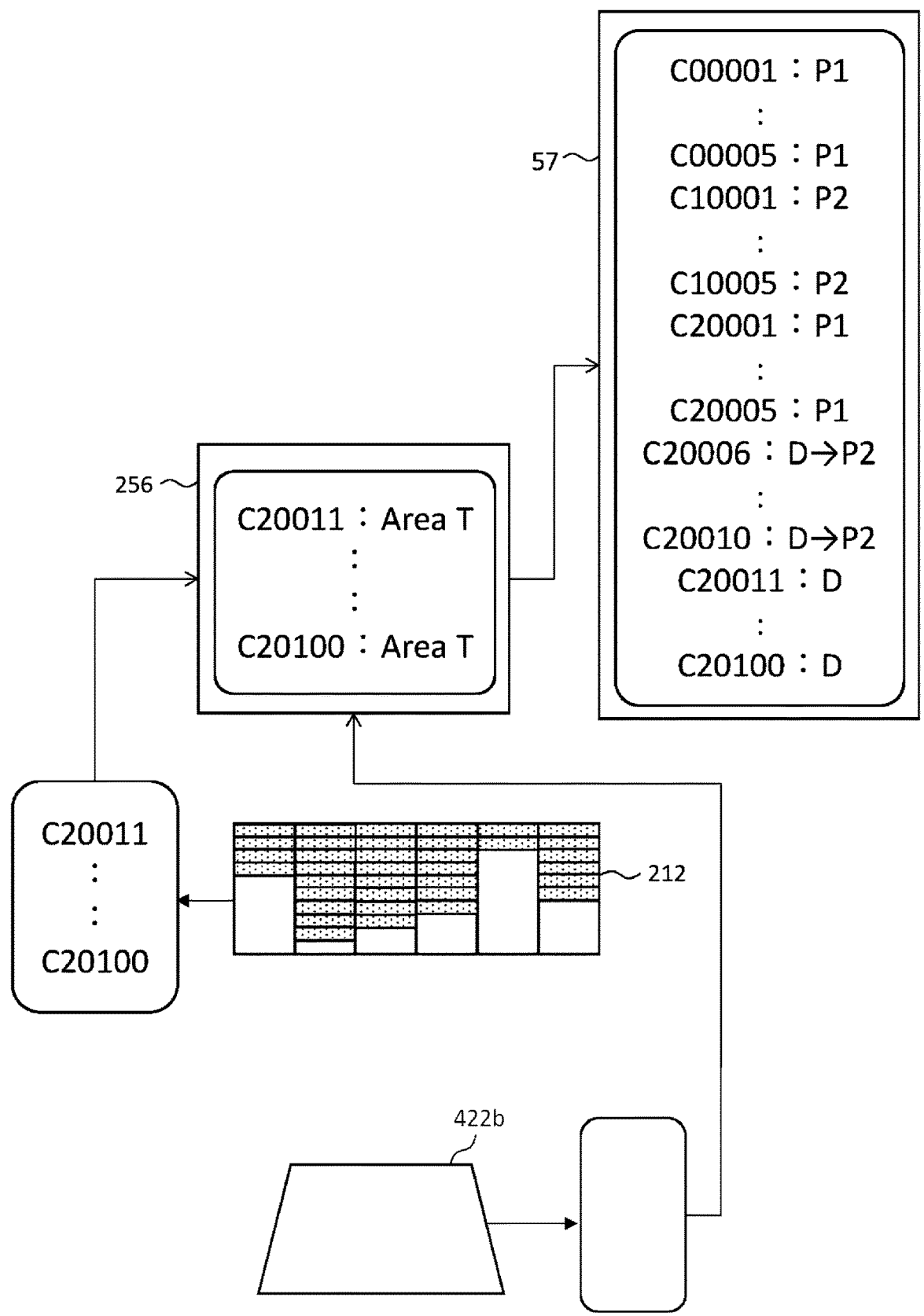
FIG. 47 is a view explaining the example of the update of the database in the seventh example according to the fourth embodiment of the present invention.

When the player 282*b* then takes these bet chips 831*b* and payout chips 832*b*, as shown in FIG. 47, no chip ID is read from the bet area 422*b* and only the chips ID read from the chip tray 212 is input to the management control device 256. Based on this change, the management control device 256 judges that the payout chips 832*b* with the chip IDs "C20006" to "C20010" is passed to the same player as the players with the chip IDs "C10001" to "C10005," and updates the database 57 so that the user IDs associated with the chip IDs "C20006" to "C20010" are the same as the user IDs associated with the chip IDs "C10001" to "C10005 in the database 57.

As described above, by this example management system 170, it is detected that the betting chips 831 and the payout chips 832 are removed from the bet area together, and the database 57 is updated so that the user IDs of the payout chips 832 are the same as the user IDs of the betting chips 831. Therefore, even when 283 the gaming substitute currencies of the plurality of players are bet on the same bet area 422, it is possible by paying out to these players in order to grasp which player the payout chips 832 is paid out to and update the database 57, and so it is possible to trace the possessor of the gaming substitute currency.

Figure 48:
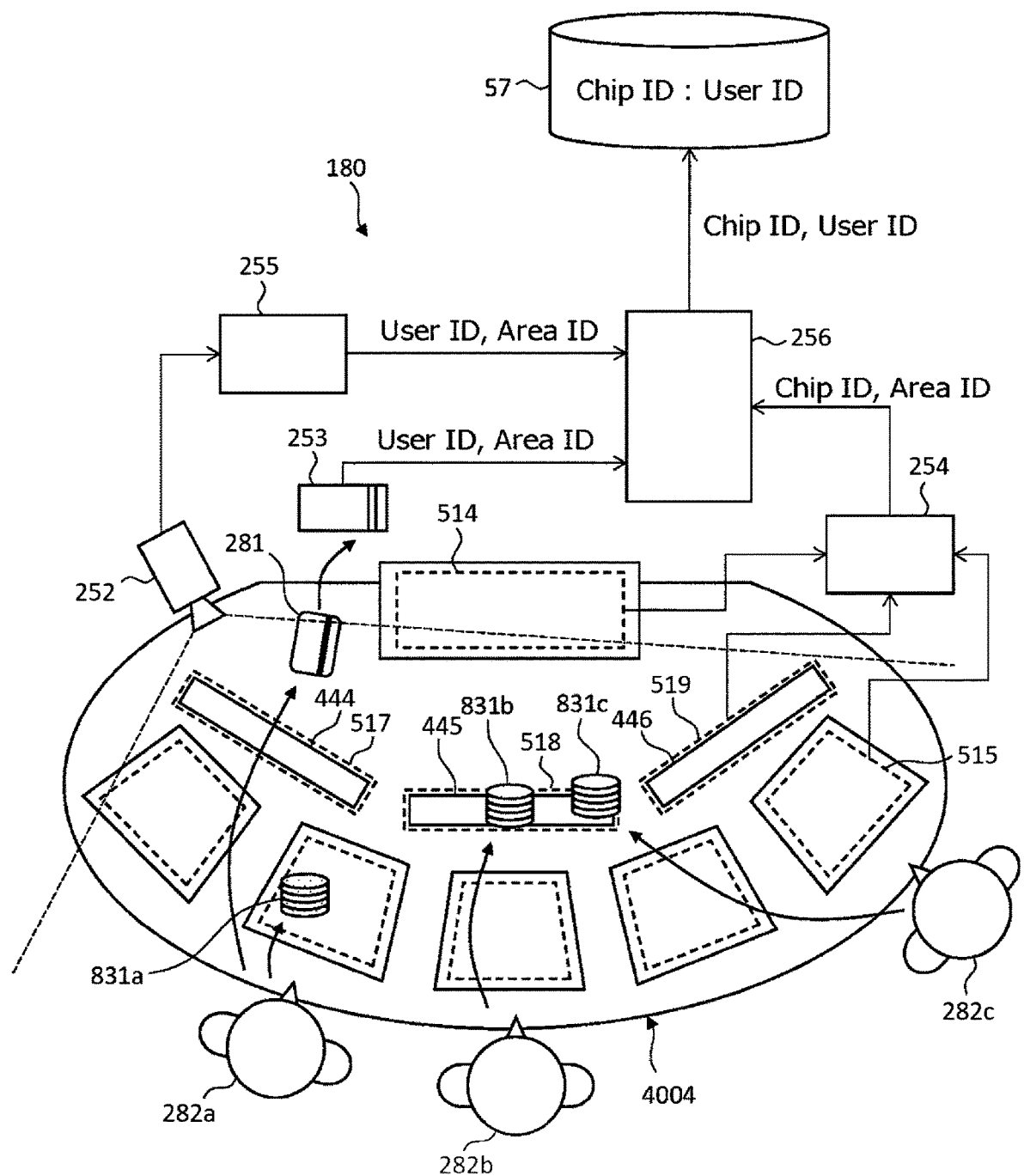
FIG. 48 is a view showing a configuration of a management system in an eighth example according to the fourth embodiment of the present invention.

FIG. 48 is a view showing a configuration of a management system in an eighth example according to the fourth embodiment. The management system 180 includes the same configuration as the fourth example management system 140. However, in the management system 180, player pair area 444, tie area 445, and banker pair area 446 are provided as the bet areas in the game table 4004. In addition, in the game table 4004, antennas 517, 518, and 519 corresponding to the player pair area 444, the tie area 445, and the banker pair area 446 are provided.

Each of these areas 444-446 is divided for each playing position within that area, and when betting on these areas 444-446, the player places the betting chips in a position (section) corresponding to own playing position within these areas.

That is, the player pair area 444, the tie area 445, and the banker pair area 446 are shared bet areas shared by the plurality of players, respectively. In the example in FIG. 48, the players 282a-282c participate in the game, the players 282b and 282c of them bets the chips 831b and 831c, respectively, in the tie area 445.

In this example, it is possible for the shared bet areas 444-446 to perform the tracing of the possessor of the gaming substitute currency 283 in the same manner as in the sixth or seventh example. Even when the management system 180 does not include the database 57, it is possible to perform the tracing of the possessor of the gaming substitute currency 283 in the same manner as in the sixth example, and even when the management system 180 does not includes the player identification system, it is possible for the shared bet area to perform the tracing of the possessor of the gaming substitute currency 283 in the same manner as in the seventh example.

Figure 49:
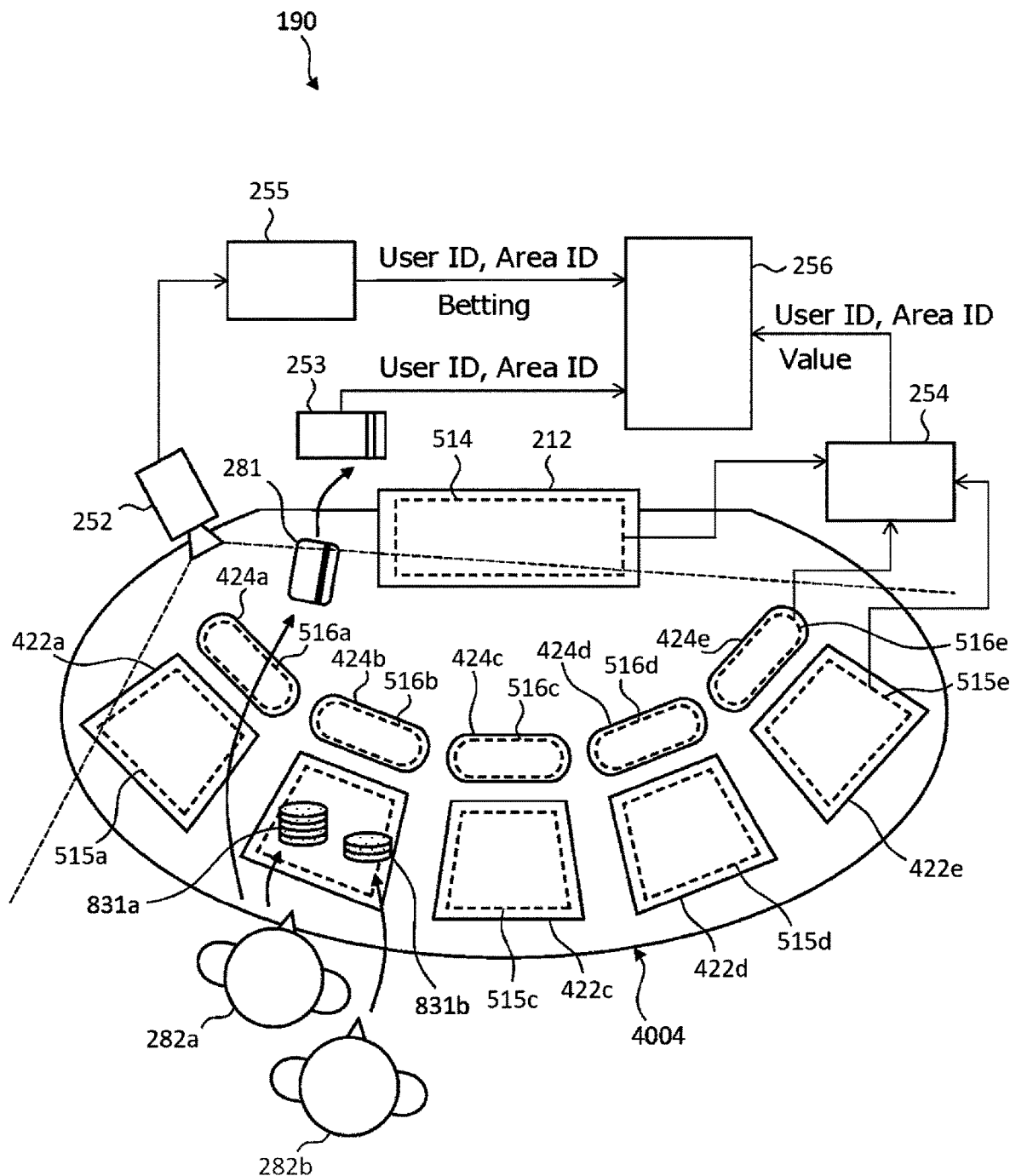
FIG. 49 is a view showing a configuration of a management system in a ninth example according to the fourth embodiment of the present invention.

FIG. 49 is a view showing a configuration of a management system in a ninth example according to the fourth embodiment. The management system 190 includes the player identification system. In this example, the tracing of the gaming substitute currency 283 is performed without using the database 57. In the game table 4004, pay areas 424a-424e and antennas 516a-516e corresponding them are provided. Information indicating the amount (value) of the gaming substitute currency 283 is stored in the fixed information of the RFID tag of the gaming substitute currency 283, and the user ID of the possessor is stored in the variable information thereof.

In this example, the database 57 may also be used, and in this case, the chip ID is stored in the gaming substitute currency 283, and the amount (value) of the gaming substitute currency 283 and the user ID of the possessor are stored in the database 57 in association with the chip ID.

Figure 50:
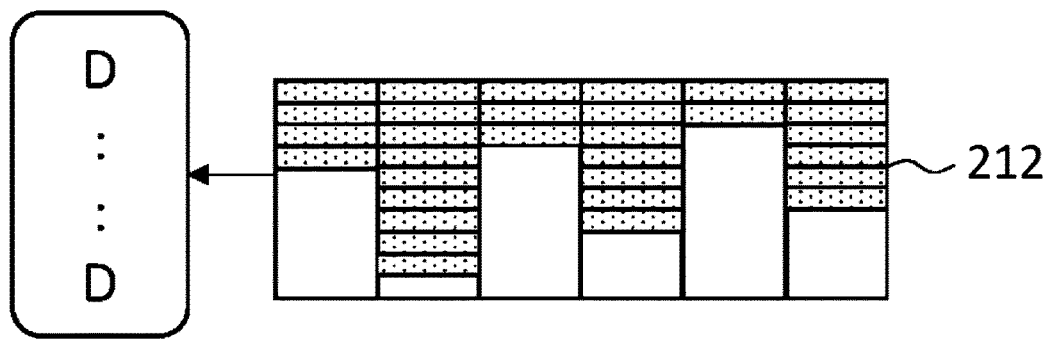
FIG. 50 is a view explaining an example of update of variable information in the ninth example according to the fourth embodiment of the present invention.
Figure 50:
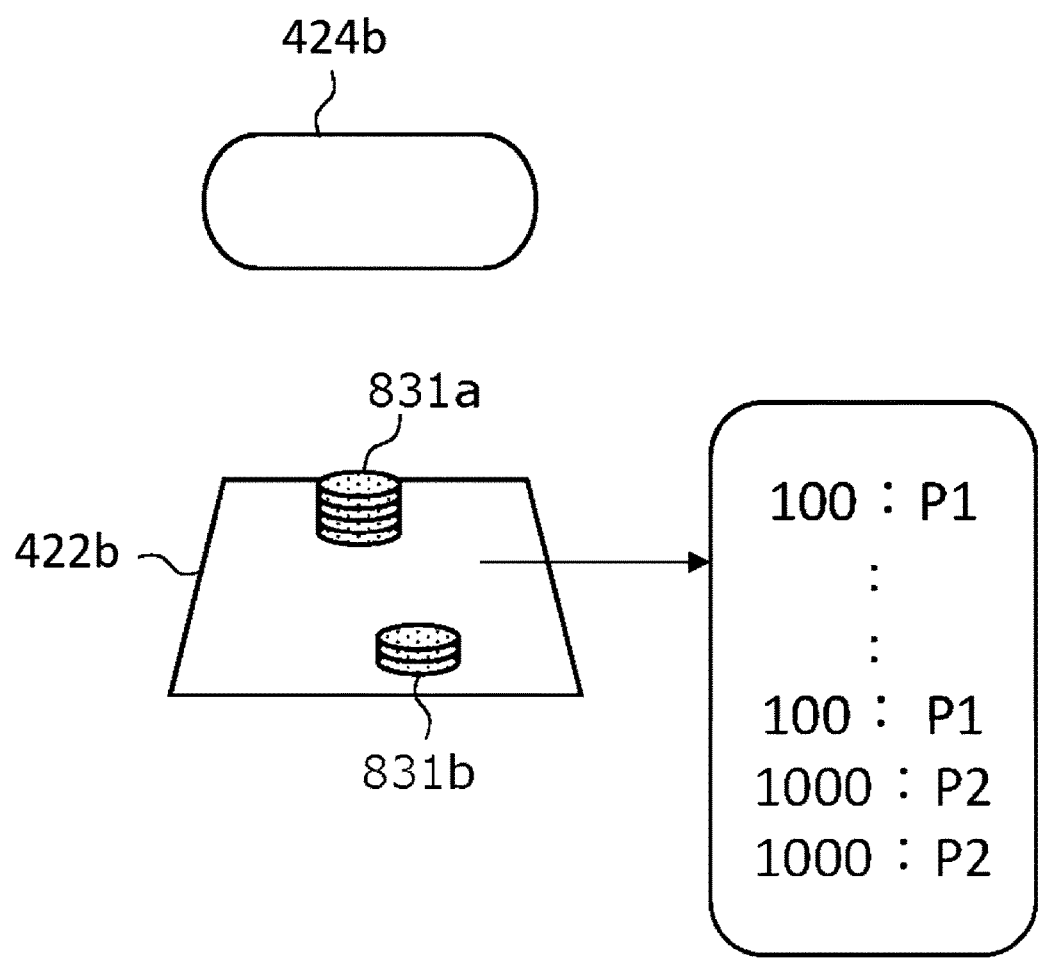

As shown in FIG. 50, when betting chip 831a of the player 282a (five chips with amount "100") and the betting chip 831b of the player 282b (two chips with amount "1000") are placed in the bet area 422b, the five gaming substitute currency 283 in which the amount is "100" and the user ID is "P1" and the two gaming substitute currency 283 in which the amount is "1000" and the user ID is "P2" are read from this bet area 422b are read, and these are output to the management control device 256 together with "Area 2" which is the area ID of the bet area 422.

The management control device 256 calculates the total amount of bet chips for each player for each bet area 422 to detect the bet amount for each player. In the case of FIG. 50, the management control device 256 detects that the bet amount of the user ID "P1" is "500" and the bet amount of the user ID "P2" is "2000."

Figure 51:
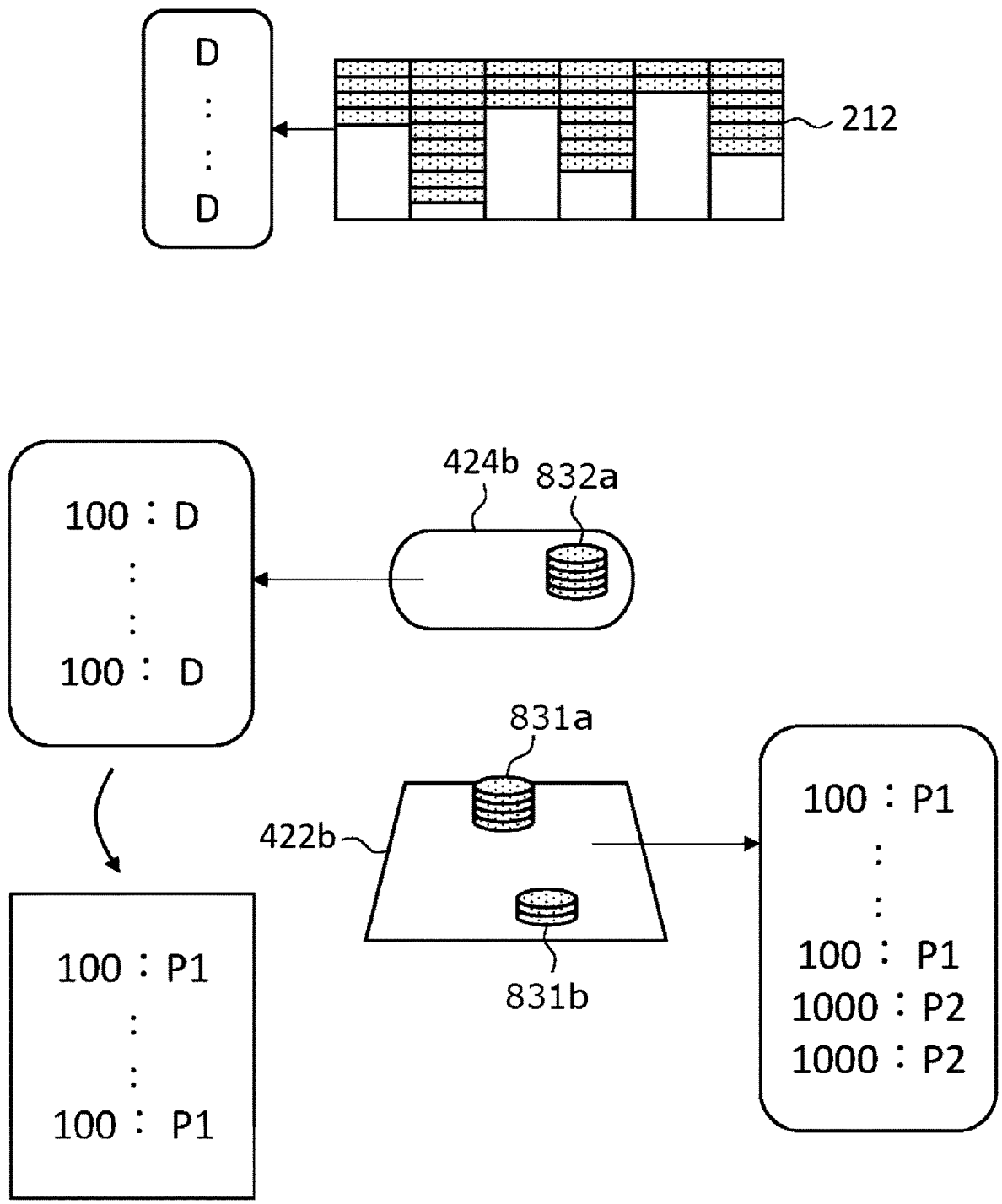
FIG. 51 is a view explaining the example of the update of the variable information in the ninth example according to the fourth embodiment of the present invention.

When both players 282a and 282b win as the game result, the dealer pays out (payout) the bet chips 831a and 831b, respectively, in order. As shown in FIG. 51, first, for the betting chips 831a, when paying out the betting chips 832a, the dealer places the payout chips 832a in the pay area 424b.

At this time, the RF control device 254 reads the payout chip 283 in the pay area 424b to read that there are five payout chips 283 with amount "100," and outputs this information to the management control device 256. The management control device 256 calculates the sum of the amounts of the payout chips 832a read in the pay area 424b to detect the payout amount.

The management control device 256 compares the payout amount of the payout chips 832a and the bet amount for each player in the bet area 422b to identify the player whose bet amount matches the payout amount. In the case of FIG. 51, the five payout chips 832a with amount "100" are read from the pay area 424b, and it is detected that the payout amount is "500." The management control device 256 judges that this payout amount "500" matches the bet amount "500" of the betting chips 831a with user ID "P1" to rewrite the user ID of the payout chips 832a to "P1."

Figure 52:
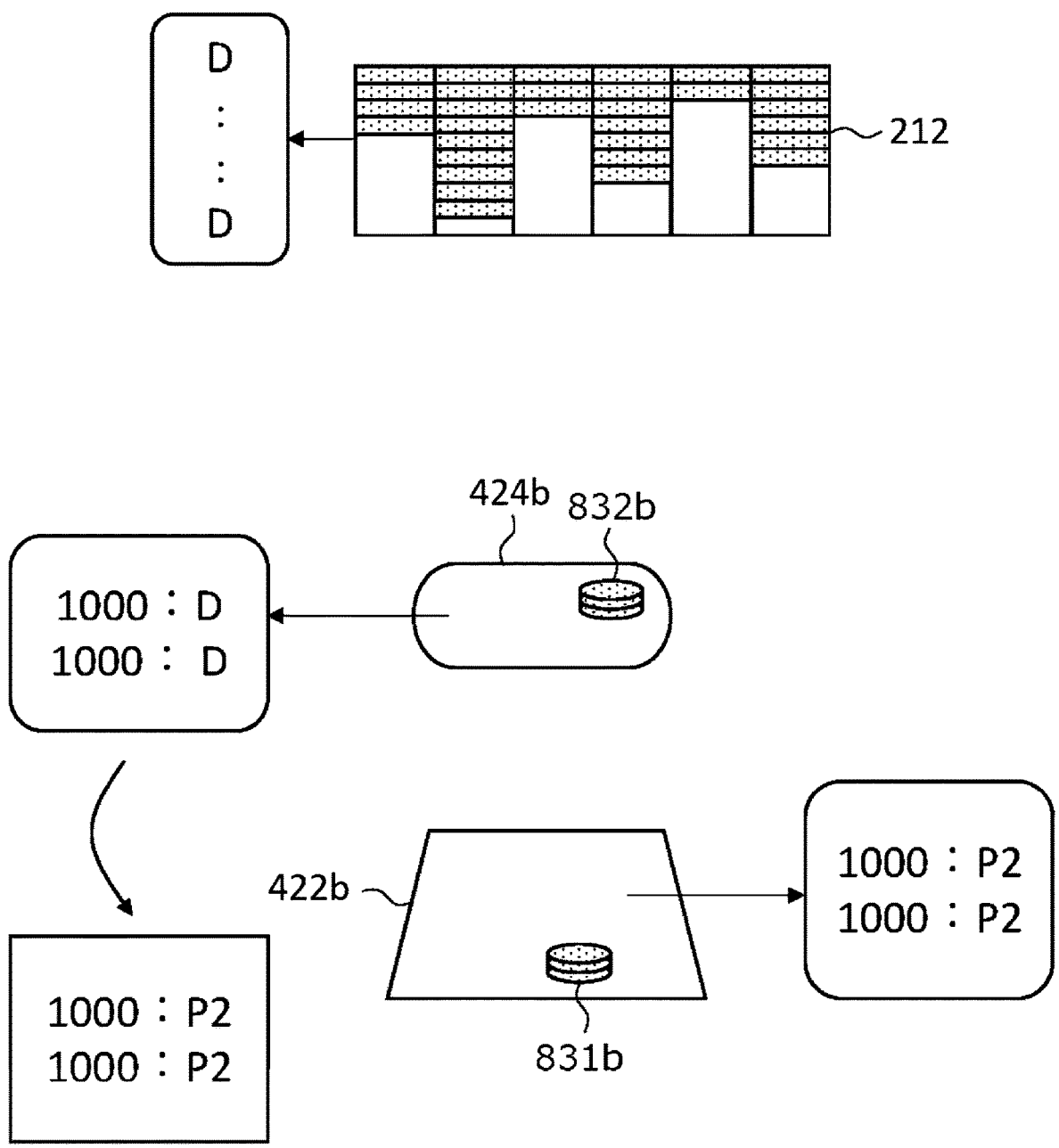
FIG. 52 is a view explaining the example of the update of the variable information in the ninth example according to the fourth embodiment of the present invention.

Then, when the player 282a takes the payout chips 832a and the bet chips 831a, the bet chip 831b of the player 282b remains in the bet area 422b, as shown in FIG. 52. When the dealer places the payout chips 832b to be paid out for this bet chips 831b in the pay area 424b, the management control device 256 calculates the sum of the amounts of this payout chips 832b to detects the amount of payout chips 832b.

The management control device 256 compares the payout amount of payout chips 832b and the bet amount for each player in the bet area 422b to identify the player whose bet amount matches the payout amount. In the case of FIG. 52, the two payout chips 832b with amount "1000" are read from the pay area 424b, and it is detected that the payout amount is "2000." The management control device 256 judges that this payout amount "2000" matches the bet amount "2000" of the betting chips 831b with user ID "P2" to rewrite the user ID of the payout chips 832b to "P2."

As described above, in this example management system 190, even when the plurality of players bet on the same bet area 422, and when their bet amounts differ, it is judged based on the bet amount and the payout amount of the payout chip which player the payout chip is paid out to.

In the first to ninth examples above, when the player 282 is a non-member who is not registered as a member, since no user ID is assigned to such non-member, it is impossible by the player identification system to identify the player 282. Moreover, as described above, since it is impossible to store the valid user ID cannot in the RFID tag or the database 57 for the gaming substitute currency 283 owned by the non-member, "Unknown" is recorded as the user ID.

When the management system pays out the payout chips 832 to the non-member player, it sets the user IDs of that payout chips 832 to "Unknown," and when it collects the betting chips 831 from the non-member player, it sets the user IDs of that betting chips 831 to "D."

When the player who is the member and the player who is the non-member bet on the same bet area 422, and when both players win the game, the dealer may pay out under a rule that the dealer always pay out from the non-member, or always pay out from the member.

For example, when the rule is in operation that always pays out the non-members first, the management system rewrites the user ID to "Unknown" for the payout chips 832s first paid out, and rewrite to the user ID of the player who is the member for the later payout chip 832s using the above example.

For example, when the rule is in operation that always pays out the members first, the management system rewrites the user ID to the user ID identified from the betting chips 831 for the first payout chips 832, and rewrites the user ID to "Unknown" for the later payout chips 832.

When identifying the player using the card certificating system, the dealer scans the membership card 281 by own and so can grasp which player is the member, but when the player is identified by the face recognition system, the dealer cannot grasp which player is the member. Therefore, as a result of the recognition by the face recognition system, visual information indicating the playing position or the bet area in which the user ID is recognized may be shown to the dealer on a monitor or the like.

Figure 53:
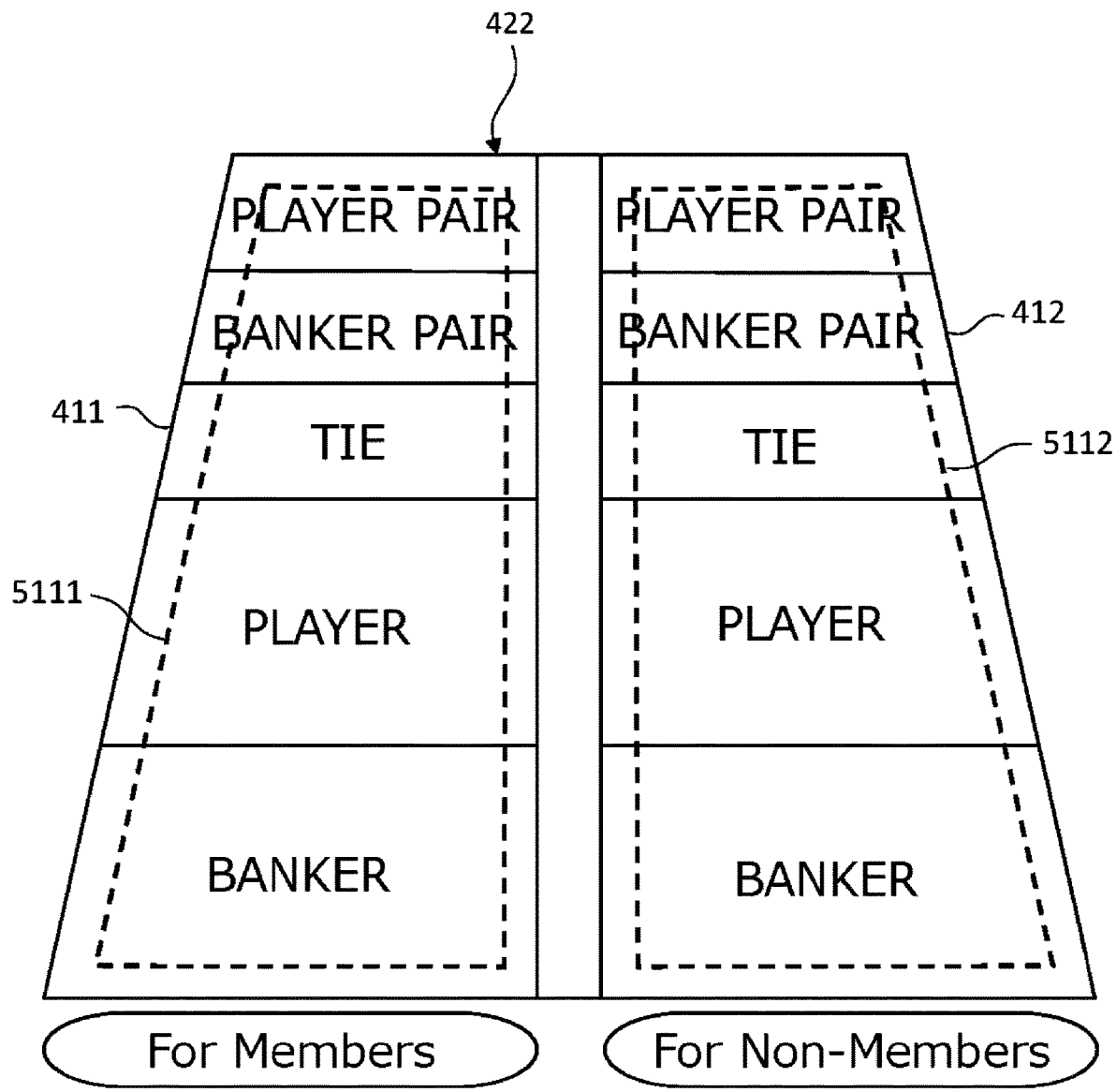
FIG. 53 is a view showing an example of a bet area in an eleventh example according to the fourth embodiment of the present invention.

FIG. 53 is a view showing an example of a bet area in an eleventh example according to the fourth embodiment. In this example, the bet area 422 for each playing position is divided into bet area for member 411 and the bet area for non-member 412, and the antennas are also divided into antenna for member 511 and antenna for non-member 5112.

The management control device 256 controls the RF control device 254 to rewrite the user ID of the gaming substitute currency 283 for the betting chips 831 bet on the bet area for member 411, as in the first to ninth examples above, and rewrite the user ID of the payout chi 832 paid out for the betting chip 831 in the bet area for non-member 412 to "Unknown."

By this example, since the gaming substitute currency 283 in which the user ID assigned to the player is stored in itself or in database 57 and the gaming substitute currency 283 in which the user ID assigned to the player is not stored in itself or in database 57 (the user ID is "Unknow") are not mixed and read, and it is possible to effectively trace the gaming substitute currency 283 in which the user ID assigned to the player is stored in itself or in database 57.

In this example, instead of antennas 511 and 5112, one antenna may be provided across the bet area for member 411 and the bet area for non-member 412. In this case, when the gaming substitute currencies 283 are bet on the bet area for member 411 and the bet area for non-member 412, respectively, the dealer can recognize which betting chips 831 the member possess and which betting chips 831 the non-member possess.

Then, when performing the payout for both of the betting chips 831, the dealer may payout under the operation rule of paying out for the betting chips 831 of the member first. Thereby, the management system can confirm that the payout chips 832 paid out first is paid out to the member. The dealer may also perform the payout under the operation rule of paying out for the betting chips 831 of the non-member first. In this case, the management system can confirm that the first payout chip 832 is paid out to the non-member.

Figure 54A:
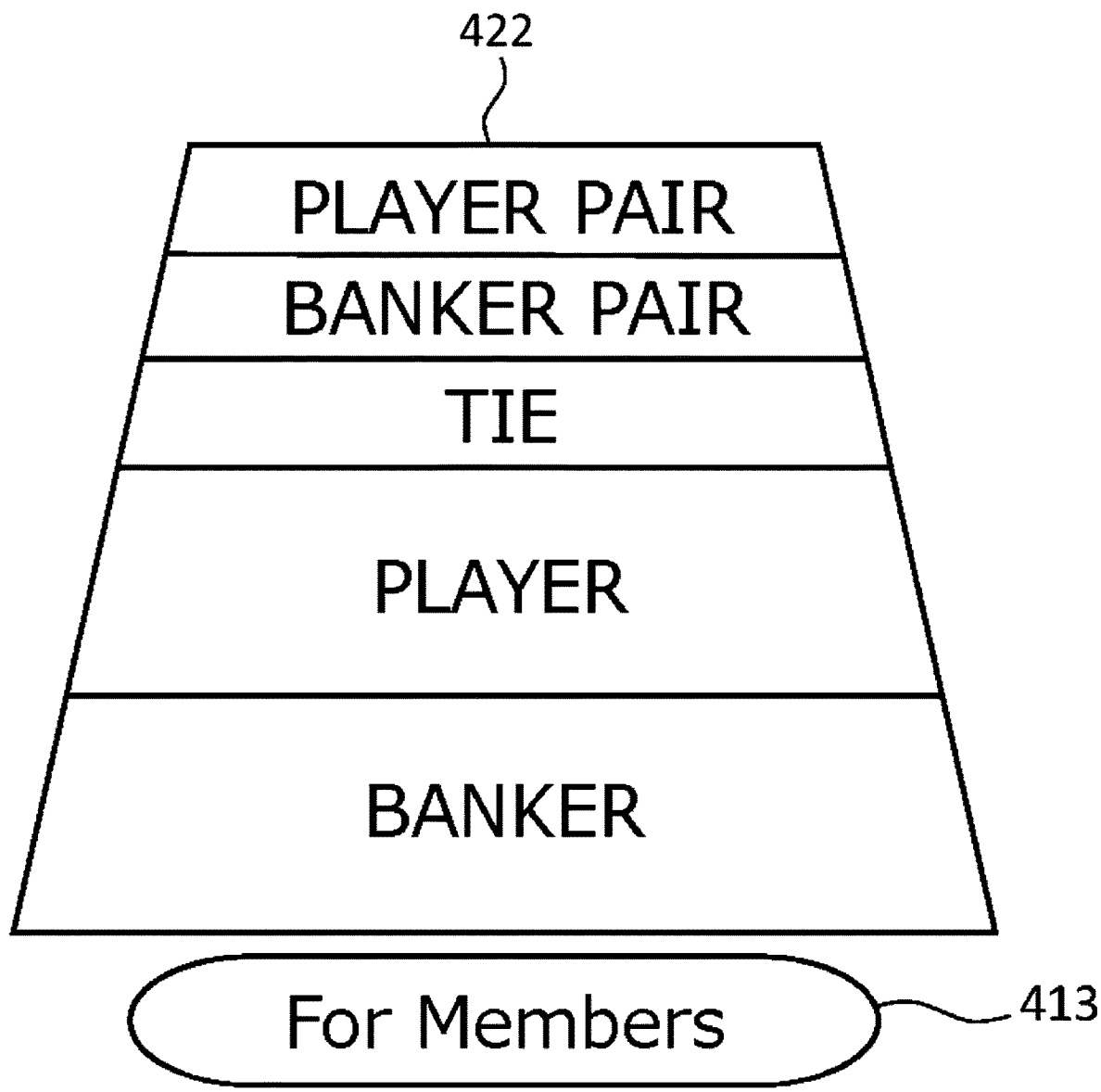
FIG. 54A is a view showing another example of a bet area in an eleventh example according to the fourth embodiment of the present invention.
Figure 54B:
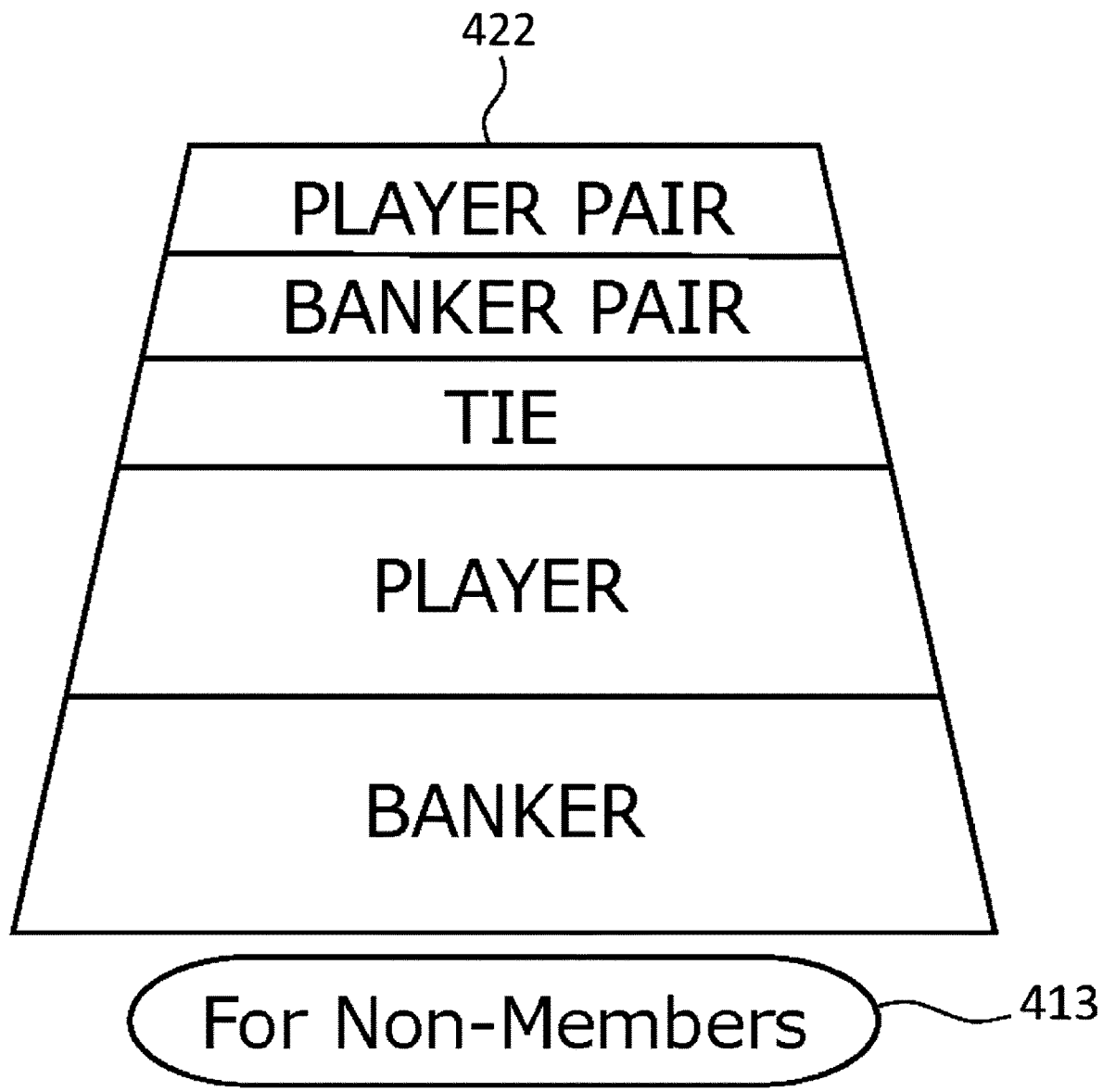
FIG. 54B is a view showing another example of the bet area in the eleventh example according to the fourth embodiment of the present invention.

FIGS. 54A and 54B are views showing another example of a bet area in an eleventh example according to the fourth embodiment. In this example, the bet area 422 for each playing position is selectively set to a bet area for member 422, as shown in FIG. 54A, or a bet area for non-member 422, as shown in FIG. 54B.

A display 413 is provided near each of the bet areas 422, which variably indicates whether the bet area 422 is set up for the member or the non-member, respectively. This display 413 is installed under a raxa of the game table 4004, so that the displayed information is visible to the player through the raxa.

The unit for visually indicating whether each bet area 422 is set for the member or the non-member is not limited to the display 413 embedded under the raxa of the game table 4004. For example, a monitor installed on the game table 4004 so as to be visible to the player may indicate whether each bet area 422 is set for the member or the non-member.

The management control device 256 controls the RF control device 254 to rewrite the user ID of the gaming substitute currency 283 as in the first to ninth examples above for the betting chips 831 bet thereon when the bet area 422 is set for the member, and rewrite the user ID of the payout chip 832 paid out for the betting chips 831 bet thereon to "Unknown" when the bet area 422 is set for the non-member.

By this example, since the gaming substitute currency 283 in which the user ID assigned to the player is stored in itself or in database 57 and the gaming substitute currency 283 in which the user ID assigned to the player is not stored in itself or in database 57 (the user ID is "Unknow") are also not mixed and read, and it is possible to effectively trace the gaming substitute currency 283 in which the user ID assigned to the player is stored in itself or in database 57.

In the first to ninth examples above, it is possible to trace the possessor of the gaming substitute currency 283 even when the exchange of the gaming substitute currency 283 is performed between the dealer and the player at the game table 4004. In this case, the management system includes a progress status judging unit for judging the progress status of the game (that is, during betting, during game, or during settlement). The card distribution device 4003 can be used as such progress status judging unit, but any other unit may be used.

In this example management system, during the betting, the management control device 256 controls the RF control device 254 to make each antenna perform readings periodically at predetermined time intervals. During the betting, the management control device 256 judges that the exchange of the gaming substitute currency 283 is performed when the gaming substitute currency 283 in which the user ID is "D" is read in any of the bet areas 422 or any of the pay areas 424 (hereinafter referred to as "reading area of game table 4004") and when the gaming substitute currency 283 in which the user ID is the user ID assigned to the member is read in the chip tray 212.

This is because, due to the operation of the baccarat, during the betting, it is not other than the exchange that the gaming substitute currency 283 moves from the chip tray 212 onto the game table 4004, and the gaming substitute currency 283 of the player on the game table 4004 moves to the chip tray 212. When the progress status of the game is "during the game," such movement of the gaming substitute currency 283 is an illicit action, and so the management control device 256 may output an alarm when detecting such movement of the gaming substitute currency 283 as described above during the game.

During the betting, the management control device 256 judges that the gaming substitute currency 283 whose user ID is the user ID assigned to the member or "Unknown" is read by the chip tray 212, the management control device 256 judges that the gaming substitute currency 283 is the gaming substitute currency 283 (pre-exchange chip) that is put out by the player to the game table 4004 for the exchange between the chips.

Specifically, in the case where the user ID is stored in the substitute currency 283 itself, the management control device 256 judges that it is the exchanged when the user ID assigned to the member or "Unknown" is read from the chip tray 212 during the betting, and in the case where the user ID is stored in the database 57, judges that the exchange is performed when the number of gaming substitute currencies 283 read from the chip tray 212 decreases during the betting. Alternatively, in the case where the user ID is stored in the database 57, it may be judged that the exchange is performed when the number of gamin substitute currencies 283 read from the chip tray increases during the betting.

Moreover, when the gaming substitute currency 283 whose user ID is "D" indicating that it is possessed by the casino or the dealer is read in the reading area of the game table 4004 during the betting, the management control device 256 judges that the gaming substitute currency 283 is a gaming substitute currency 283 (post-exchange chip) given to the player corresponding to a pre-exchange chip.

Specifically, in the case where the user ID is stored in the substitute currency 283 itself, the management control device 256 judges that it is the exchange when the user ID "D" is read from the reading area of the game table 4004 during the betting, and in the case where the user ID is stored in the database 57, the management control device 256 periodically reads the reading area of the game table 4004 during the betting and refers to the database 57 for each reading to judge that the gaming substitute currency 283 whose user ID is "D" is read from the reading area of the game table 4004.

The management control device 256 rewrites the user ID of the pre-exchange chip to "D" representing the casino or the dealer, and the user ID of the post-exchange chip to the user ID of the pre-change chip. Specifically, in the case where the user ID is stored in the RFID tag of the gaming substitute currency 283, the management control device 256 controls the RF control device 254 to rewrite the user ID stored in the relevant pre-exchange chip and the relevant post-exchange chip, and in the case where the user ID is associated with the chip ID and stored in the database 57, the management control device 256 rewrites the user ID associated with the relevant chip ID in the database 57.

After identifying the pre-exchange chip and the post-exchange chip, the management control device 256 may control the RF control device 254 to exchange their user IDs (in the case where the user ID is stored in the gaming substitute currency 283) or update the database 57 (when the user ID is stored in the database 57).

In the above embodiment, the membership card 281 is the magnetic card and the card reader 253 is the magnetic card reader configured to read the information from the magnetic stripe of the membership card 281, but alternatively, an RFID tag may be embedded in the membership card 281 and the user ID may be recorded in the RFID tag. In this case, an RFID reader formed of an antenna and an RF control device 254 is used as the card reader 253. Such antenna may be provided at each playing position. In this case, the player does not hand his/her own membership card 281 to the dealer, but read it at each playing position. The user ID read from the membership card 281 is transmitted from each antenna to the RF control device 254 together with information identifying the playing position. Furthermore, the antenna 515 provided in the bet area 422 and the RF control device 254 may be used as the RFID reader configured to read the membership card 281. In this case, the player can place the membership card 281 in the bet area 422 at his/her own playing position to make the antenna 515 read the user ID.

The various embodiments of the present invention are described above, but it is a matter of course that the above embodiments are variable by those skilled in the art within the scope of the present invention, and the devices of the present embodiments may be suitably validated in accordance with needs in a game to which it is applied.

The invention claimed is:

1. A management system at a game table for performing a game using a gaming chip including a built-in RFID tag, wherein the game table includes: a chip tray configured to accommodate the gaming chip of a dealer, a bet area on which the gaming chip to be bet in the game is to be placed, a collection area, and a payout area, wherein the collection area and the payout area are different from the bet area and the chip tray, respectively, and wherein the management system comprises:
   a collection reading unit configured to read, at the collection area, the RFID tag of the gaming chip, which is to be collected in the chip tray when the gaming chip is being collected; and
   a payout reading unit configured to read, at the payout area, the RFID tag of the gaming chip, which is taken out from the chip tray when the gaming chip is being paid out.

2. The management system according to claim 1, wherein:
   the collection area and the payout area are arranged between the bet area and the chip tray,
   the collection reading unit is configured to read the RFID tag of the gaming chip collected from the bet area before the gaming chip is placed in the chip tray, and
   the payout reading unit is configured to read the RFID tag of the gaming chip taken out from the chip tray before the gaming chip is paid out to the bet area.

3. The management system according to claim 1, further comprising a collection judging unit configured to judge whether or not the gaming chip which should be collected from the bet area is collected from the bet area and read by the collection reading unit.

4. The management system according to claim 3, further comprising:
   a bet judging unit provided in the game table and configured to judge a bet target and a bet amount of the gaming chip bet in the game; and
   a game result judging unit configured to judge a game result, wherein:
   the RFID tag is configured to store information for identifying an amount of gaming chip, and
   the collection judging unit is configured to judge whether an amount of gaming chip read by the collection reading unit matches with a collection amount determined based on the bet target and the bet amount judged by the bet judging unit, and the game result judged by the game result judging unit.

5. The management system according to claim 4, wherein:
   the collection reading unit is configured to read at the collection area the RFID tag of the gaming chip to be collected for each bet lost in the game, and the collection judging unit is configured to judge whether or not an amount of gaming chip read by the collection reading unit for each bet lost in the game matches with the bet amount of a player.

6. The management system according to claim 4, wherein the collection judging unit is configured to judge whether or not a total amount of gaming chips read by the collection reading unit for a plurality of bet lost in the game matches with a total bet amount of a plurality of players.

7. The management system according to claim 1, wherein:
the RFID tag is configured to store information for identifying an amount of gaming chip, and
the management system further comprises a payout judging unit configured to judge whether or not an amount of gaming chip which should be paid out is read by the payout reading unit.

8. The management system according to claim 7, further comprising:
a bet judging unit provided in the game table and configured to judge a bet target and a bet amount of the gaming chip bet in the game; and
a game result judging unit configured to judge a game result,
wherein the payout judging unit is configured to judge whether or not an amount of gaming chip read by the payout reading unit matches with a payout amount determined based on the bet target and the bet amount judged by the bet judging unit, and the game result judged by the game result judging unit.

9. The management system according to claim 1, further comprising an exchange judging unit configured to judge that exchanging is performed based on that the RFID tags of the gaming chips are read by the collection reading unit and the payout reading unit.

10. The management system according to claim 9, wherein the exchange judging unit is configured to judge that the exchanging is performed when judging that there are gaming chips in the collection area and the payout area at the same time based on timings at which the RFID tags of the gaming chips are read by the collection reading unit and the payout reading unit.

11. The management system according to claim 9, wherein:
the RFID tag is configured to store information for identifying an amount of gaming chip, and
the exchange judging unit is configured to judge whether or not a total amount of gaming chips read by the collection reading unit matches with a total amount of gaming chips read by the payout reading unit when judging that the exchanging is performed.

12. The management system according to claim 9, wherein the exchange judging unit is configured to judge whether or not the gaming chips read by the collection reading unit and the payout reading unit, respectively, are the gaming chip offered by a player and the gaming chip paid out from the chip tray when judging the exchanging is performed.

13. The management system according to claim 11, further comprising an alert device configured to, when judging that the total amount of gaming chips read by the collection reading unit does not match with the total amount of gaming chips read by the payout reading unit, output an alert indicating it.

14. The management system according to claim 12, further comprising an alert device configured to, when the gaming chips read by the collection reading unit and the payout reading unit, respectively, are not the gaming chip offered by the player and the gaming chip paid out from the chip tray, output an alert indicating it.

15. The management system according to claim 1, wherein:
the collection reading unit comprises a collection antenna arranged in the collection area and a collection reading device configured to control the collection antenna and decode a signal received by the collection antenna, and
the payout reading unit comprises a payout antenna arranged in the payout area and a payout reading device configured to control the payout antenna and decode a signal received by the payout antenna.

16. The management system according to claim 15, wherein the collection reading device and the payout reading device are configured to perform reading, respectively, at independent times.

17. The management system according to claim 15, wherein the collection reading device and the payout reading device are the same device.

18. The management system according to claim 17, wherein the same device is configured to use alternately the collection antenna and the payout antenna to perform alternately readings of the collection area and the payout area.

19. The management system according to claim 15, further comprising a jamming antenna configured to restrict the collection antenna from reading the RFID tag of the gaming chip at the payout area and/or a jamming antenna configured to restrict the payout antenna from reading the RFID tag of the gaming chip at the collection area.

20. The management system according to claim 1, wherein the collection area and the payout area are arranged at a distance apart from each other such that the collection reading unit does not read the RFID tag of the gaming chip at the payout area and/or the payout reading unit does not read the RFID tag of the gaming chip at the collection area.

* * * * *